(12) United States Patent
Williams et al.

(10) Patent No.: US 11,958,974 B2
(45) Date of Patent: Apr. 16, 2024

(54) REJUVENATION OF VACUUM TOWER BOTTOMS THROUGH BIO-DERIVED MATERIALS

(71) Applicant: Iowa State University Research Foundation, Inc., Ames, IA (US)

(72) Inventors: Ronald Christopher Williams, Ames, IA (US); Joseph Herbert Podolsky, Ames, IA (US); Nacu Hernandez, Ames, IA (US); Eric W. Cochran, Ames, IA (US)

(73) Assignee: IOWA STATE UNIVERSITY RESEARCH FOUNDATION, INC., Ames, IA (US)

( * ) Notice: Subject to any disclaimer, the term of this patent is extended or adjusted under 35 U.S.C. 154(b) by 132 days.

(21) Appl. No.: 17/140,465

(22) Filed: Jan. 4, 2021

(65) Prior Publication Data

US 2021/0130616 A1 May 6, 2021

Related U.S. Application Data

(62) Division of application No. 15/445,307, filed on Feb. 28, 2017, now Pat. No. 10,961,395.

(Continued)

(51) Int. Cl.
*C08L 95/00* (2006.01)
*E01C 7/18* (2006.01)
(Continued)

(52) U.S. Cl.
CPC .............. *C08L 95/00* (2013.01); *E01C 7/187* (2013.01); *E01C 7/22* (2013.01); *E01C 7/262* (2013.01);
(Continued)

(58) Field of Classification Search
CPC .................................. C08L 95/00; E01C 7/22
See application file for complete search history.

(56) References Cited

U.S. PATENT DOCUMENTS 2,782,216 A 2/1957 Hayes et al.
3,070,608 A 12/1962 Kuester et al.
(Continued)

FOREIGN PATENT DOCUMENTS

CA 2 902 935 A1 4/2017
CN 101041574 A 9/2007
(Continued)

OTHER PUBLICATIONS

International Preliminary Report on Patentability for PCT/US2020/051588 (dated Mar. 15, 2022).
(Continued)

*Primary Examiner* — Dah-Wei D. Yuan
*Assistant Examiner* — Andrew J Bowman
(74) *Attorney, Agent, or Firm* — Troutman Pepper Hamilton Sanders LLP (Rochester)

(57) ABSTRACT

The present invention relates to an asphalt product. The asphalt product includes an asphalt binder and a bio-oil blend comprising a mixture of a non-hydrogenated bio-oil and a partially hydrogenated bio-oil, where the bio-oil blend is mixed with the asphalt binder to form an asphalt product having a shear stiffness of 0.20 kPa to 11,000 kPa at a temperature ranging from 25° C. to 85° C. and/or a viscosity of 0.15 Pa·s to 1.50 Pa·s at a temperature ranging from 120° C. to 165° C. The present invention further relates to methods of producing an asphalt product and methods of applying an asphalt product to a surface.

36 Claims, 41 Drawing Sheets

Related U.S. Application Data

(60) Provisional application No. 62/301,092, filed on Feb. 29, 2016.

(51) Int. Cl.
  *E01C 7/22* (2006.01)
  *E01C 7/26* (2006.01)

(52) U.S. Cl.
  CPC ....... *C08L 2555/52* (2013.01); *C08L 2555/64* (2013.01); *C08L 2555/84* (2013.01)

(56) References Cited

U.S. PATENT DOCUMENTS

| | | |
|---|---|---|
| 3,755,226 A | 8/1973 | Christiansen et al. |
| 4,597,799 A | 7/1986 | Schilling |
| 4,806,166 A | 2/1989 | Schilling et al. |
| 4,836,857 A | 6/1989 | Hopkins |
| 4,966,490 A | 10/1990 | Hodson |
| 5,023,282 A | 6/1991 | Neubert |
| 5,221,703 A | 6/1993 | Ostermeyer |
| 5,271,767 A | 12/1993 | Light, Sr. et al. |
| 5,437,717 A | 8/1995 | Doyle et al. |
| 5,473,000 A | 12/1995 | Pinomaa |
| 6,495,074 B1 | 12/2002 | Carr |
| 6,749,677 B2 | 6/2004 | Freisthler |
| 6,764,542 B1 | 7/2004 | Ackey et al. |
| 6,797,753 B2 | 9/2004 | Benecke et al. |
| 7,074,266 B2 | 7/2006 | Hawkins et al. |
| 7,420,008 B2 | 9/2008 | Bloom |
| 7,662,225 B2 | 2/2010 | Antoine et al. |
| 7,842,746 B2 | 11/2010 | Bloom et al. |
| 7,951,238 B2 | 5/2011 | Deneuvillers et al. |
| 7,951,766 B1 | 5/2011 | Frenkel et al. |
| 7,951,862 B2 | 5/2011 | Bloom et al. |
| 7,994,107 B2 | 8/2011 | Bloom |
| 8,034,172 B2 | 10/2011 | Naidoo et al. |
| 8,137,451 B2 | 3/2012 | Aerts et al. |
| 8,198,223 B2 | 6/2012 | Bloom |
| 8,198,224 B2 | 6/2012 | Bloom |
| 8,257,483 B2 | 9/2012 | Aerts et al. |
| 8,703,849 B2 | 8/2014 | Hagberg et al. |
| 8,808,445 B2 | 8/2014 | Coe |
| 8,814,464 B2 | 8/2014 | McDade et al. |
| 8,821,064 B1 | 9/2014 | Morris et al. |
| 8,926,742 B2 | 1/2015 | Coe |
| 9,000,196 B2 | 4/2015 | Hagberg et al. |
| 9,115,295 B2 | 8/2015 | Deneuvillers et al. |
| 9,139,733 B2 | 9/2015 | McDade et al. |
| 9,347,187 B2 | 5/2016 | Coe |
| 9,416,274 B2 | 8/2016 | Frank |
| 10,030,145 B2 | 7/2018 | Severance et al. |
| 10,119,026 B2 | 11/2018 | Gonzalez Leon et al. |
| 10,316,192 B2 | 6/2019 | Kurth et al. |
| 10,336,927 B2 | 7/2019 | Bahr |
| 10,570,286 B2 | 2/2020 | Williams et al. |
| 10,604,655 B2 | 3/2020 | Williams et al. |
| 10,899,928 B2 | 1/2021 | McCurdy et al. |
| 10,961,395 B2 | 3/2021 | Williams et al. |
| 11,193,243 B2 | 12/2021 | Chesky |
| 11,370,918 B2 | 6/2022 | Williams et al. |
| 2002/0026884 A1 | 3/2002 | Raad |
| 2004/0025745 A1 | 2/2004 | Freisthler |
| 2004/0086335 A1 | 5/2004 | Thomas et al. |
| 2005/0038147 A1 | 2/2005 | Andersen |
| 2005/0148714 A1 | 7/2005 | Neimann |
| 2009/0137705 A1 | 5/2009 | Faucon Dumont et al. |
| 2010/0034586 A1 | 2/2010 | Bailey et al. |
| 2010/0040832 A1 | 2/2010 | Herbert |
| 2010/0275817 A1* | 11/2010 | Williams ............... C04B 26/26 106/246 |
| 2010/0292492 A1 | 11/2010 | Geng et al. |
| 2012/0167802 A1 | 7/2012 | Huh |
| 2013/0022823 A1 | 1/2013 | Franks, Sr. |
| 2013/0160674 A1 | 6/2013 | Hong et al. |
| 2013/0171899 A1 | 7/2013 | Kalkanoglu et al. |
| 2013/0186302 A1 | 7/2013 | Naidoo et al. |
| 2013/0239850 A1 | 9/2013 | Naidoo et al. |
| 2013/0295394 A1 | 11/2013 | Hong et al. |
| 2014/0000479 A1 | 1/2014 | Stevens et al. |
| 2014/0033951 A1 | 2/2014 | Ech et al. |
| 2014/0261076 A1 | 9/2014 | Quinn et al. |
| 2014/0270955 A1 | 9/2014 | Coe |
| 2015/0225358 A1 | 8/2015 | Howard et al. |
| 2015/0337078 A1 | 11/2015 | Cochran et al. |
| 2016/0289971 A1 | 10/2016 | Becker, IV |
| 2016/0297969 A1* | 10/2016 | Naidoo ................... C08L 95/00 |
| 2016/0376440 A1 | 12/2016 | Naidoo et al. |
| 2017/0247542 A1 | 8/2017 | Williams et al. |
| 2017/0283615 A1 | 10/2017 | Williams et al. |
| 2018/0023259 A1 | 1/2018 | Kurth et al. |
| 2018/0030193 A1 | 2/2018 | Bloom et al. |
| 2018/0057686 A1 | 3/2018 | Williams et al. |
| 2018/0148575 A1 | 5/2018 | Kurth et al. |
| 2018/0171147 A1 | 6/2018 | Allen et al. |
| 2018/0209102 A1 | 7/2018 | Baumgardner et al. |
| 2018/0334603 A1 | 11/2018 | Bahr et al. |
| 2018/0340068 A1 | 11/2018 | McCurdy et al. |
| 2019/0048148 A1 | 2/2019 | Lalgudi |
| 2019/0152850 A1 | 5/2019 | Warner et al. |
| 2019/0242069 A1 | 8/2019 | Fennell et al. |
| 2019/0300714 A1 | 10/2019 | Watson et al. |
| 2020/0165459 A1 | 5/2020 | Williams et al. |
| 2021/0079224 A1 | 3/2021 | Cochran et al. |
| 2021/0115679 A1 | 4/2021 | Isazawa et al. |
| 2022/0033305 A1 | 2/2022 | Cochran et al. |
| 2022/0112130 A1 | 4/2022 | Williams et al. |
| 2023/0399514 A1 | 12/2023 | Cochran et al. |

FOREIGN PATENT DOCUMENTS

| | | |
|---|---|---|
| CN | 101694083 A | 4/2010 |
| CN | 101696097 A | 4/2010 |
| CN | 102092988 A | 6/2011 |
| CN | 102443271 A | 5/2012 |
| CN | 102702760 A | 10/2012 |
| CN | 102786806 A | 11/2012 |
| CN | 102838317 A | 12/2012 |
| CN | 102838874 A | 12/2012 |
| CN | 102964858 A | 3/2013 |
| CN | 102977620 A | 3/2013 |
| CN | 103102703 A | 5/2013 |
| CN | 103497521 A | 1/2014 |
| CN | 103602087 A | 2/2014 |
| CN | 103709415 A | 4/2014 |
| CN | 103788665 A | 5/2014 |
| CN | 103788667 A | 5/2014 |
| CN | 103980147 A | 8/2014 |
| CN | 104250520 A | 12/2014 |
| DE | 19519539 A1 | 12/1995 |
| DE | 195 01 212 A1 | 6/1996 |
| DE | 196 01 495 A1 | 7/1997 |
| EP | 0568757 A1 | 11/1993 |
| EP | 0999237 A1 | 5/2000 |
| EP | 1524300 A1 | 4/2005 |
| EP | 1696002 A1 | 8/2006 |
| EP | 1717275 A1 | 11/2006 |
| EP | 2083050 A1 | 7/2009 |
| EP | 2245090 A1 | 11/2010 |
| FR | 2963354 A1 | 7/2010 |
| GB | 584344 | 1/1947 |
| GB | 610629 | 10/1948 |
| JP | 3158251 B2 | 7/2000 |
| JP | 2012046641 A | 3/2012 |
| JP | 5341892 B2 | 11/2012 |
| KR | 101166155 B1 | 7/2012 |
| KR | 101487180 B1 | 1/2015 |
| RU | 2461594 C1 | 9/2012 |
| WO | 91/09907 | 7/1991 |
| WO | 93/00406 A1 | 1/1993 |
| WO | 97/35940 A1 | 10/1997 |
| WO | 00/20538 A1 | 4/2000 |
| WO | 2003093404 A1 | 11/2003 |
| WO | 2006/107179 A2 | 10/2006 |

(56) References Cited

FOREIGN PATENT DOCUMENTS

| WO | 2007/062158 A2 | 5/2007 |
|---|---|---|
| WO | 2009/102877 A1 | 8/2009 |
| WO | 2016/033603 A1 | 3/2016 |
| WO | 2016/033605 A1 | 3/2016 |
| WO | 2020/061030 A1 | 3/2020 |
| WO | 2020077213 A1 | 4/2020 |
| WO | 2020086558 A1 | 4/2020 |
| WO | 2021/055815 A1 | 3/2021 |
| WO | 2022081558 A1 | 4/2022 |

OTHER PUBLICATIONS

International Preliminary Report on Patentability for Application No. PCT/US2015/047798 (dated Mar. 9, 2017).
Office Action for U.S. Appl. No. 16/751,520 (dated Sep. 16, 2021).
Biresaw, G., et al., "Elastohydrodynamic Properties of Biobased Heat-Bodied Oils. Ind. Eng. Chem. Res. 53:16183-16195 (2014)Biresaw, G., et al.," Elastohydrodynamic Properties of Biobased Heat-Bodied Oils. Ind. Eng. Chem. Res. 53:16183-16195 (2014).
Erhan, S. Z., et al., "Vegetable Oil-based Printing Inks," J. Am. Oil Chem. Soc. 69:251-256 (1992).
Erhan, S. Z., et al., "Lithographic and Letterpress Ink Vehicles from Vegetable Oils," J. Am. Oil Chem. Soc. 68:635-638 (1991).
Mitchell, J., et al., "Ultraviolet Absorption Spectra of Linseed Oil: Determination of Bodied-in-Vacuo and Blown Linseed Oil in Mixtures with Raw Linseed Oil," Ind. Eng. Chem. Anal. Ed. 13:765-768 (1941).
Black, M. M. et al., "South African Fish Products. XXXI.—The Composition of Pilchard Oil and of Maasbanker Oil," J. Sci. Food Agric. 1:248-251 (1950).
Test Method for Viscosity of Transparent Liquids by Bubble Time Method. (ASTM International) (2017).
Paschke, et al., "Inter- and Intramolecular Polymerization in Heat-Bodied Linseed Oil," J. Am Oil Chem Soc. 31:208-211 (1954).
Test Method for Viscosity of Transparent Liquids by Bubble Time Method. (ASTM International), 1545-13R17 (see Iodine value. Wikipedia (2020) available at: https://en.wikipedia.org/w/index.php?title=Iodine_value&oldid=960069598. (Accessed: Sep. 8, 2020).
International Search Report and Written Opinion for Application No. PCT/US2015/047798 (dated Dec. 9, 2015).
Kim, Y.R., "Program Book of the 12th ISAP Conference on Asphalt Pavements," 12th ISAP Conference, Jul. 1, 2014, Raleigh, North Carolina.
Podolsky et al., "Investigation of Bio-derived Materials Including Isosorbide-based Materials as Bio-based Warm Mix Asphalt Additives," Poster Presentation ISAP 2014 Conference, Jun. 5, 2014, p. 1, Raleigh, North Carolina.
Preliminary Agenda and Abstracts of the 51st Petersen Asphalt Research Conference, Wyoming Conference Center (Jul. 16, 2014).
International Search Report and Written Opinion for corresponding Application No. PCT/US2015/047810 (dated Dec. 3, 2015).
Podolsky et al., "Comparative Performance of Bio-Derived/Chemical Additives in Warm Mix Asphalt at Low Temperature," 51st Annual Petersen Asphalt Research Conference, Iowa State University (Jul. 16, 2014).
Office Action for U.S. Appl. No. 15/507,475 (dated Apr. 11, 2019).
Restriction Requirement in U.S. Appl. No. 15/507,475 (dated Nov. 5, 2018).
Elkashef et al., "Improving Fatigue and Low Temperature Performance of 100% RAP Mixtures Using a Soybean-Derived Rejuvenator," Construction and Building Materials 151:345-352 (2017).
Elkashef et al., "Preliminary Examination of Soybean Oil Derived Material as a Potential Rejuvenator Through Superpave Criteria and Asphalt Bitumen Rheology," Construction and Building Materials 149:826-836 (2017).
Elkashef et al., "Instroducing a Soybean Oil-Derived Material as a Potential Rejuvenator of Asphalt Through Rheology, Mix Characterisation and Fourier Transform Infrared Analysis," Road Materials and Pavement Design 19(8):1750-1770 (2018).

Material Safety Data Sheet for Epoxidized Isoamyl Soyate, Revision Date: Feb. 5, 2010.
Material Safety Data Sheet for Glycerin Removal col. Bottoms, Revision Date: Feb. 29, 2012.
Material Safety Data Sheet for MONG, Revision Date: Oct. 11, 2012.
Material Safety Data Sheet for Mixed Short Chain Polyols, Revision Date: Mar. 25, 2011.
Material Safety Data Sheet for ADM CA118, Revision Date: Jun. 25, 2014.
Material Safety Data Sheet for Alinco Z-2 Z-3 Linseed Oil, Revision Date: Feb. 12, 2014.
Material Safety Data Sheet for OKO M-37 Linseed Oil, Issue Date: Jul. 10, 2002.
Material Safety Data Sheet for TOPLIN X-Z LINSEED Oil, Issue Date: Aug. 18, 2005.
Office Action for U.S. Appl. No. 15/691,295 (dated Apr. 4, 2019).
Sharma et al., "Oxidation, Friction Reducing, and Low Temperature Properties of Epoxy Fatty Acid Methyl Esters," Green Chemistry 9:469-474 (2007).
Perkins E.G "Chapter 2. Composition of Soybeans and Soybean Products," Practical Handbook of Soybean Processing and Utilization, AOCS Press, p. 9-28 (1995).
Sahoo et al., "Toughened Bio-Based Epoxy Blend Network Modified With Transesterified Epoxidized Soybean Oil: Synthesis and Characterization," RSC Adv. 5:13674-13691 (2015).
International Search Report and Written Opinion for corresponding Application No. PCT/US2019/051490 (dated Jan. 14, 2020).
International Preliminary Report on Patentability for Application No. PCT/US2019/051490 (dated Mar. 25, 2021).
"Oxirane Oxygen in Epoxidized Materials," American Oil Chemists' Society (2017).
International Search Report and Written Opinion for corresponding Application No. PCT/US2020/051588 (dated Dec. 23, 2020).
International Preliminary Report on Patentability for corresponding Application No. PCT/US2015/047810 (dated Feb. 28, 2017).
U.S. Appl. No. 17/275,500 to Cochran et al. filed on Mar. 11, 2021, first named inventor Eric W. Cochran.
Office Action for U.S. Appl. No. 15/445,307 (dated Jan. 11, 2019).
Office Action for U.S. Appl. No. 15/445,307 (dated Jul. 25, 2019).
Office Action for U.S. Appl. No. 15/445,307 (dated Mar. 6, 2020).
Office Action for U.S. Appl. No. 17/025,625 (dated Dec. 21, 2022).
Kuang et al., "Diffusibility Enhancement of Rejuvenator by Epoxidized Soybean Oil and Its Influence on the Performance of Recycled Hot Mix Asphalt Mixtures," Materials 11:833 (2018).
Yang and You, "New Predictive Equations for Dynamic Modulus and Phase Angle Using a Nonlinear Least-Squares Regression Model," Journal of Materials in Civil Engineering 27(3):04014131-1 thru 04014131-8 (2015).
Yan et al., "Gel Point Suppression in RAFT Polymerization of Pure Acrylic Cross-Linker Derived from Soybean Oil," Biomacromolecules 17:2701-2709 (2016).
Wang et al., "Investigating the Interactions of the Saturate, Aromatic, Resin, and Asphaltene Four Fractions in Asphalt Binders by Molecular Simulations," Energy Fuels 29:112-121 (2015).
Tadros, "Emulsion Formation, Stability, and Rheology," Wiley-VCH Verlag GmbH and Co. (2013).
"Roads," Infrastructure Report Card, pp. 76-80 (2017).
Podolsky et al., "Effect of Bio-Derived/Chemical Additives on Warm Mix Asphalt Compaction and Mix Performance at Low Temperature," Cold Regions Science and Technology 136:52-61 (2017).
Pellinen and Witczak, "Stress Dependent Master Curve Construction for Dynamic (Complex) Modulus," School of Engineering, Purdue University pp. 281-309 (2002).
Li et al., "Mechanistic-based Comparisons for Freeze-thaw Performance of Stabilized Unpaved Roads," Cold Regions Science and Technology 141:97-108 (2017).
Booij and Thoone, "Generalization of Kramers-Kronig Transforms and Some Approximations of Relations Between Viscoelastic Quantities," Rheol. Acta 21:15-24 (1982).
Barnes, "Rheology of Emulsions—A Review," Colloids Surfaces A: Physicochem. Eng. Aspects 91:89-95 (1994).

(56) References Cited

OTHER PUBLICATIONS

"Alternatives to Seal Coats," Transportation Research Synthesis, Local Road Research Board, Minnesota Department of Transportation TRS 1602 pp. 1-44 (Feb. 2016).
International Search Report and Written Opinion for PCT/US2021/54549 (dated Feb. 14, 2022).
PubChem-CID-5280934 (Sep. 16, 2004).
Invitation to Pay Additional Fees for PCT/US2021/54549 (dated Dec. 15, 2021).
Chiu et al., "Effectiveness of Seal Rejuvenators for Bituminous Pavement Surfaces," Journal of Testing and Evaluation 34(5):390-394 (2006).
Muncy, Steven G. "Classification of Emulsified Recycling Agents," Asphalt Emulsions, ASTM International, p. 36-43 (1990).
Khosla, N. P. "Effect of Emulsified Modifiers on the Characteristics of Recycled Mixtures," Association of Asphalt Paving Technologists Proceedings 51:522-539 (1982).
Zeng et al., "Effects of Various Rejuvenator Sealer Materials on Rheological Properties of Aged SBS Modified Asphalt," Key Engineering Materials 599:155-158 (2014).
King et al., "Spray Applied Polymer Surface Seals," Final Report, Foundation for Pavement Preservation/Federal Highway Administration, Washington, DC (2007).
Babashamsi et al., "Recycling Toward Sustainable Pavement Development: End-of-Life Considerations in Asphalt Pavement," Jurnal Teknologi 78(7-2):25-32 (2016).
Jordan, W. S., "Laboratory Evaluation of Surface Treatments to Asphaltic Pavements in Mississippi," Thesis, Mississippi State University (2010).
Ji et al., "Effectiveness of Vegetable Oils as Rejuvenators for Aged Asphalt Binders," Journal of Materials in Civil Engineering 29(3):D4016003 (2016).
Bailey et al., "The Use of Vegetable Oil in Asphalt Mixtures, in the Laboratory and Field, " The 5th Eurasphalt & Eurobitume Congress (2012).
Brownridge, J. "Fog Seal, Scrub Seal, Rejuvenator: Benefits and Differences," (2016).
Ghosh et al., "Evaluation of Bio-Fog Sealants for Pavement Preservation," Minnesota Department of Transportation (2016).
International Preliminary Report on Patentability for PCT/US2021/054549 (dated Apr. 27, 2023).
Office Action for European Patent Application No. 20786155.0 (dated Apr. 24, 2023).
Invitation to Pay Additional Fees for PCT/US2023/030218 (mailed Nov. 6, 2023).
Office Action for Brazil Patent Application No. 1120220049358 (Oct. 17, 2023).
International Search Report and Written Opinion for PCT/US2023/030218 (Jan. 18, 2024).

\* cited by examiner

| Level | | Least Sq Mean |
|---|---|---|
| VTB,PAV | A | 5.60 |
| 5%HBO+5%PHBO,PAV | B | 5.36 |
| 3%HBO+3%PHBO,PAV | B C | 5.27 |
| VTB,RTFO | C D | 5.15 |
| 6% CM,PAV | D | 5.01 |
| VTB,Unaged | E | 4.82 |
| 5%HBO+5%PHBO,RTFO | E F | 4.71 |
| 3%HBO+3%PHBO,RTFO | E F | 4.70 |
| 10% CM,PAV | F G | 4.59 |
| 6% CM,RTFO | G H | 4.50 |
| 3%HBO+3%PHBO,Unaged | H | 4.35 |
| 5%HBO+5%PHBO,Unaged | I | 4.12 |
| 10% CM,RTFO | I | 4.08 |
| 6% CM,Unaged | I | 4.05 |
| 10% CM,Unaged | J | 3.63 |

Figure 40

REJUVENATION OF VACUUM TOWER
BOTTOMS THROUGH BIO-DERIVED
MATERIALS

This application is a divisional of U.S. patent application Ser. No. 15/445,307, filed Feb. 28, 2017, which claims the benefit of U.S. Provisional Patent Application No. 62/301,092, filed Feb. 29, 2016, which is hereby incorporated by reference in its entirety.

FIELD OF THE INVENTION

The present application relates to the rejuvenation of vacuum tower bottoms through use of bio-derived materials and methods of making and using the vacuum tower bottoms.

BACKGROUND OF THE INVENTION

The process of oil refining distills crude oil into different fractions as part of the manufacturing for many products. Asphalt binder is one of the heaviest fractions produced during refining of petroleum crude, and is a co-product of the oil refining process. The lighter petroleum crude fractions are used for making higher economic value products such as gasoline and specialty chemicals, and their value is tied to the price of oil. When the price of oil increases, lighter component products such as gasoline increase in price, thus incentivizing increased production of said lighter components during petroleum crude refining. To increase production of higher economic value lighter components, refineries equipped with vacuum tower equipment run vacuum distillation to extract more from crude oil. From this process vacuum tower distillation bottoms ("VTB") are produced. VTB is very stiff due to the loss of saturates from the vacuum tower distillation process to produce more lighter components, and thus is not typically used wholly for paving a roadway as an asphalt binder and can be terminally blended for producing the appropriate asphalt binder grade.

There are many different terms used for materials that restore an aged binder rheological properties similar to its original unaged state. These terms are used interchangeably as rejuvenators, recycling agents, softening agents, fluxes, and extenders. These materials are then named interchangeably as either modifiers or additives. Restoration is achieved through the renewal of the volatiles and oils generally improving flexibility and adhesion properties.

During the construction and service life of a pavement asphalt binder material properties change in such a way that asphalt binders become stiffer and less resistive to fatigue/low temperature cracking. This is because a binder's volatile components evaporate and oxidize from the time it is constructed to the end of its service life. Oxidation of the binder over its service life causes polymerization to occur. Polymerization is the process by which the binder becomes more viscous at high temperatures and less viscous at low temperatures, thus called aging (Gerardu, J. & Hendriks, C. F., "Recycling of Road Pavement Materials in the Netherlands," In: Road Engineering division of Rijkswaterstaat, Delft.). The main determinant of an asphalt's viscosity is based on the amount of asphaltenes in the binder because they are more viscous than both resins and oils (Airey, G. D., "Rheological Properties of Styrene Butadiene Styrene Polymer Modified Road Bitumen," Fuel 82:1709-19 (2003); Wu et al. "Investigation of Temperature Characteristics of Recycled Hot Mix Asphalt Mixtures," Resour. Conserv. Recycl. 51:610-20 (2007). From oxidation the oil component in asphalt is converted to resins and the resin component is converted to asphaltenes. This is the reason hardening occurs in asphalt over time (Wu et al. "Investigation of Temperature Characteristics of Recycled Hot Mix Asphalt Mixtures," Resour. Conserv. Recycl. 51:610-20 (2007); Kandhal et al., "Performance of Recycled Hot Mix Asphalt Mixtures," National Center for Asphalt Technology Auburn (1995)). Rejuvenators are materials that contain saturates/oils and through a certain method of application are able to restore partially to fully the oxidized asphalt binder properties to its original viscoelastic state (Brownridge, J., "The Role of an Asphalt Rejuvenator in Pavement Preservation: Use and Need for Asphalt Rejuvenation," In: Compendium of Papers From the First International Conference on Pavement Preservation, Newport Beach, CA. p. 351-64).

Several studies have been published investigating the use of rejuvenators with laboratory-aged asphalt binder, recovered binder from recycled asphalt pavement ("RAP") and by applying rejuvenators on high-RAP mixtures. Rejuvenators act to restore an aged asphalt binder's rheological properties. Asphalt binder restoration is the process in which volatiles and oils are renewed while still keeping the adhesion properties stable. The intent is for a rejuvenator to return the ratio of asphaltenes/maltenes (resigns and oils) in an aged asphalt binder to its original (i.e., virgin, unaged) state (Asli et al., "Investigation on Physical Properties of Waste Cooking Oil—Rejuvenated Bitumen Binder," Constr. Build Mater. 37:398-405 (2012); Chen et al., "Physical, Chemical and Rheological Properties of Waste Edible Vegetable Oil Rejuvenated Asphalt Binders," Constr. Build Mater. 66:286-298 (2014); Chen et al., "High Temperature Properties of Rejuvenating Recovered Binder with Rejuvenator, Waste Cooking and Cotton Seed Oils," Constr. Build Mater. 59:10-16 (2014); D'Angelo et al., "Asphalt Binder Modification with Re-Refined Heavy Vacuum Distillation Oil (RHVDO)," Fifty-Seventh Annual Conference of the Canadian Technical Asphalt Association (CTAA) (2012); Johnson & Hesp, "Effect of Waste Engine Oil Residue on the Quality and Durability of SHRP MRL Binders," Transportation Research Board 93rd Annual Meeting (2014); Romera et al., "Rheological Aspects of the Rejuvenation of Aged Bitumen," Rheol Acta 45:474-478 (2006); Zargar et al., "Investigation of the Possibility of Using Waste Cooking Oil as a Rejuvenating Agent for Aged Bitumen," J. Hazard Mater. 233-234, 254-258 (2012)).

Currently, the increased use of recycled asphalt pavement ("RAP") in hot mix asphalt ("HMA") mixtures has caused use of rejuvenators to increase (Shen et al., "Effects of Rejuvenating Agents on Superpave Mixtures Containing Reclaimed Asphalt Pavement," J. Mater. Civ. Eng. 19:376-384 (2007)). Literature shows that as the dosage of rejuvenators in RAP extracted and recovered binder increase, both high and low temperature performance grade ("PG") temperatures decrease linearly (Shen et al., "Effects of Rejuvenating Agents on Superpave Mixtures Containing Reclaimed Asphalt Pavement," J. Mater. Civ. Eng. 19:376-384 (2007); Ma et al., "Compound Rejuvenation of Polymer Modified Asphalt Binder," Journal of Wuhan University of Technology, Mater Sci. Ed. 25:1070-1076 (2010); Shen et al., "Effects of Rejuvenating Agents on Superpave Mixtures Containing Reclaimed Asphalt Pavement," J. Mater. Civ. Eng. 19:376-384 (2007); Shen & Ohne, "Determining Rejuvenator Content for Recycling Reclaimed Asphalt Pavement by SHRP Binder Specifications," Int. J. Pavement Eng. 3:261-268 (2002); Tran et al., "Effect of Rejuvenator on Performance Properties of HMA Mixtures with High RAP and RAS Contents," Auburn, AL: National Center for Asphalt Technology (2012); Zaumanis et al., "Determining Optimum Rejuvenator Dose for Asphalt Recycling Based on Superpave Performance Grade Specifications," *Constr. Build. Mater.* 69:159-166 (2014)). However, this decrease assists in restoring the RAP extracted and recovered binder PG to virgin unaged PG grade or better (Zaumanis et al., "Determining Optimum Rejuvenator Dose for Asphalt Recycling Based on Superpave Performance Grade Specifications," *Constr. Build. Mater.* 69:159-166 (2014)). Due to the restorative properties of rejuvenators to RAP and RAP extracted and recovered binder, evaluation of waste products such as recycled motor oil ("RO") for use as a rejuvenator has also been evaluated (Romera et al., "Rheological Aspects of the Rejuvenation of Aged Bitumen," *Rheol Acta* 45:474-478 (2006)). In the work by Romera et al., "Rheological Aspects of the Rejuvenation of Aged Bitumen," *Rheol Acta* 45:474-478 (2006), it was found that by adding 20% RO to an aged asphalt binder (pen grade 0-10) they were able to achieve the same penetration grade as a commercially used pen grade 60/70. If RO can be successfully used as a rejuvenator of RAP binders, then the same idea could work with vacuum tower bottoms (VTB) through the use of bio-derived materials ("BDMs").

Vacuum tower distillation bottoms ("VTBs"), is an asphalt material produced from coking in petroleum refineries to increase production of higher economic value lighter components such as gasoline and jet fuel. Due to the loss of saturates from this process, VTBs are very stiff and are heavily limited for use in paving.

When considering what rejuvenator to use in aged asphalt binder an important item to examine is the effect of the rejuvenator on the oxidative aging of the restored binder. Asphalt oxidation occurs when an asphalt's molecules are exposed over time to "polar, oxygen-containing chemical functionalities" causing the asphalt to harden (Petersen, J. C., "A Review of the Fundamentals of Asphalt Oxidation: Chemical, Physicochemical, Physical Property, and Durability Relationships," *Transportation Research E-Circular* (E-C140) (2009)). Depending on how an asphalt binder is affected by oxidation it could shorten a pavement's service life because of substantial premature fatigue cracking. The chemical makeup of asphalt is categorized into four fractions: asphaltenes, saturates, aromatics, and resins. Changing the proportions of the four fractions in an asphalt binder will change the performance grade either making it stiffer or softer. Asphaltenes (heavier component) are the portion of asphalt that gives asphalt its stiffness, while the other three fractions—maltenes (saturates, aromatics, and resins), the lighter components give asphalt its softening effect (Petersen, J. C., "A Review of the Fundamentals of Asphalt Oxidation: Chemical, Physicochemical, Physical Property, and Durability Relationships," *Transportation Research E-Circular* (E-C140) (2009)).

For simulating field aging of asphalt binder in the laboratory there are three stages of aging; unaged, short-term aged, and long-term aged testing. During short-term aging, the binder hardens due to oxidation and volatilization of the lighter components to simulate manufacture and laydown of pavement in the field, while long-term aging is caused by oxidation at in-service temperatures. Over both stages of aging the asphaltene content increases and the maltene content decreases, but at different rates. In short-term aging, more of the maltene phase is lost due to volatilization than due to chemical changing into asphaltenes. In long-term aging more maltenes are changed chemically into asphaltenes from oxidation than those lost to volatilization. As asphaltene content increases, flocculation and gelation of the colloidal structure are increased, thus leading to higher viscosity/greater stiffening effect. As stated earlier the role of rejuvenators is to reverse the effect of aging by returning the ratio of maltenes to asphaltenes in the aged binder to its original state (Romera et al., "Rheological Aspects of the Rejuvenation of Aged Bitumen," *Rheol Acta* 45:474-478 (2006)).

Another impact from asphalt binder rejuvenation is that mixing and compaction temperatures as determined through rotational viscosity testing decrease. Mix and compaction temperatures are important because they dictate what temperatures should be used in a hot mix asphalt plant during the drying and mixing of aggregates with asphalt binder as well as the laydown temperatures at the field site. Effects from reduced temperatures are seen in the form of reduced fuel usage, cost savings, as well as reductions in greenhouse gas (GHG) emissions—$CO_2$, $NO_X$, $SO_X$, and CO. Like rejuvenators, warm mix asphalt technologies have similar effects on mixing and compaction temperatures of asphalt mix. There have been numerous studies done on warm mix asphalt (WMA) primarily concerned with the reduction in production temperatures, fuel usage, and emissions, as well as the cost savings associated with these reductions (Almeida-Costa et al., "Economic and Environmental Impact Study of Warm Mix Asphalt Compared to Hot Mix Asphalt," *J. Clean. Prod.* 112:2308-2317. Part 4. (2016); Harder et al., "Energy and Environmental Gains of Warm and Half-Warm Asphalt Mix: Quantitative Approach," In: *Transportation Research Board 87th Annual Meeting* (2008); and Rubio et al., "Warm Mix Asphalt: An Overview," *J. Clean. Prod.* 24, 76-84 (2012)). The extreme of WMA is half warm mix asphalt (HWMA) which is produced at even lower temperatures than those used for WMA. Rubio et al., "Comparative Analysis of Emissions From the Manufacture and Use of Hot and Half-Warm Mix Asphalt," *J. Clean. Prod.* 41:1-6 (2013) showed that production of HWMA at temperatures between 60° C. and 100° C., reduced $CO_2$ and $SO_2$ emissions by 58.5% and 99.9% when compared to the emission levels of a HMA control produced between 150° C. and 190° C.

The present invention is directed to overcoming these and other deficiencies in the art.

SUMMARY OF THE INVENTION

One aspect of the present invention relates to an asphalt product. The asphalt product includes an asphalt binder and a bio-oil blend comprising a mixture of a non-hydrogenated bio-oil and a partially hydrogenated bio-oil, where the bio-oil blend is mixed with the asphalt binder to form an asphalt product having a shear stiffness of 0.20 kPa to 11,000 kPa at a temperature ranging from 25° C. to 85° C. and/or a viscosity of 0.15 Pa·s to 1.50 Pa·s at a temperature ranging from 120° C. to 165° C.

Another aspect of the present invention relates to a method of producing an asphalt product. The method includes providing an asphalt binder, where the binder is a vacuum tower distillation bottom; providing a bio-oil blend comprising a mixture of a non-hydrogenated bio-oil and a partially hydrogenated bio-oil. The asphalt binder is mixed with the bio-oil blend under conditions effective to produce an improved asphalt product having a shear stiffness of 0.20 kPa to 11,000 kPa at a temperature ranging from 25° C. to 85° C. and/or a viscosity of 0.15 Pa·s to 1.50 Pa·s at a temperature ranging from 120° C. to 165° C.

Another aspect relates to a method of applying an asphalt product to a surface. The method includes (a) providing an asphalt product, (b) heating the asphalt product to a temperature of 145° C. to 155° C. to coat the mineral aggregate and produce an asphalt material which has improved rheological properties compared to that of an asphalt material absent the bio-derived material; (c) applying the heated asphalt material to a surface to be paved to form an applied paving material; and (d) compacting the applied paving material.

The present invention creates a value added product by rejuvenating VTB with bio-derived materials ("BDM"), by creating a blend of BDM and VTB that will meet asphalt grade requirements for use in paving. There are two systems for measuring the grade of asphalt binder (bitumen), penetration grade (European standard) and performance grade (United States standard). The objective of the present invention is to use bio-derived materials ("BDMs") to modify VTB to obtain asphalt properties that are optimal for paving. BDMs are used in combination for reducing VTB stiffness. The original VTB material has a penetration grade of 20-30 and a performance grade ("PG") 76-10.

Material evaluation included high temperature evaluation in a dynamic shear rheometer ("DSR") as well as low temperature evaluation in a bending beam rheometer ("BBR") on short term and long term aged binders. A comprehensive experimental plan consisting of replicate samples was used for grading according to American Association of State Highway and Transportation Officials ("AASHTO") test methods. Material evaluation included both high and low temperature properties in a dynamic shear rheometer and bending beam rheometer, respectively after the requisite short and long-term aging. A total of eighteen groups including the control VTB with performance grade (PG) 76-10 were used in the evaluation of the BDMs. VTBs blended with two BDMs achieved a PG 70-22 and a 64-22; both are commonly used grades in the United States. The dosage combinations of two BDMs, head bodied linseed oil ("HBO" or "HBL") and partially hydrogenated heat bodied linseed oil ("PHBO" or "PHBL") were analyzed using multiple regression to help quantify the benefit. Findings from the multiple regression show that both BDMs must be used in combination for achieving the final performance grade. The multiple regression model showed that combined dosage rates of the two BDMs can be used to adequately estimate the performance grade for the asphalt. The model estimations will assist in streamlining the use of similar biomaterials into VTB. Using the binder performance results, statistical modeling was done to optimize formulations to achieve a PG 70-22 and a PG 64-22. The measured viscosity results were used in a cost-benefits analysis of the control VTB and rejuvenated VTB at PG 70-22 and PG 64-22, reductions in energy consumption, and greenhouse gas emissions ($CO_2$, $NO_X$, $SO_X$, and CO) were seen.

Aging included both rolling thin film oven ("RTFO") and pressure aging vessel ("PAV") aging which simulate short and long-term aging of the asphalt, respectively. Mass loss of the binder was measured after RTFO testing. All binder testing followed AASHTO M320. The binder specific gravity results showed minor changes when the vegetable (linseed) oil derivatives were added in dosage level combinations from 0.5% to 10%. Mass loss was the lowest with the control group. However, the mass loss for all the dosage combinations still met the mass loss criteria of 1% or less. Rotational viscosity tests show that as the dosage level combination increased the viscosity decreased significantly. Separation testing was performed and test results show no statistical evidence of separation in the groups with dosage level combinations: 4% HBL+4% PHBL, 5% HBL+5% PHBL, 2% HBL+6% PHBL, and 6% HBL+2% PHBL. Material evaluation included high temperature evaluation in a DSR using short-term aged binder as well as low temperature evaluation in the bending beam rheometer ("BBR") using long-term aged binder. The blended materials achieved a performance grade of 70-22 and a performance grade of 64-22, both of which are typical grades used in the United States and represent an improvement for broader use than the original performance grade 76-10.

Linseed oil based bio-derived materials ("BDMs") improve the low temperature performance of the stiff VTB compared to softer paving grade asphalts through rejuvenation. Mix performance of VTB modified with BDM used as rejuvenators at low and intermediate temperatures is examined and compared against the performance of a VTB control group, and VTB modified with a commercially available rejuvenator using the semi-circular bend ("SCB") test and the dynamic modulus test at low and intermediate temperatures. Findings show that heat bodied linseed oil ("HBO" or "HBL") and partially hydrogenated heat bodied linseed oil ("PHBO" or "PHBL") combined make for a successful rejuvenator of VTB. 5% HBO and 5% PHBO combined perform equally and better than the commercial rejuvenator and better than the VTB control group by lowering stiffness and increasing fracture energy at low temperature, while performing the same at intermediate temperatures. In particular, BDM from linseed oil was used to modify VTB to obtain asphalt properties optimal for paving. BDMs are used in several combinations to optimally reduce VTB stiffness. Material evaluation was performed at high and low in-service pavement temperatures using a dynamic shear rheometer ("DSR") and bending beam rheometer ("BBR"), respectively. Prior to DSR testing, the VTB-BTM material is aged in a rolling thin film oven ("RTFO") to simulate aging that occurs during construction. Similarly, prior to BBR testing, the VTB-BDM material undergoes long-term aging in a pressure-aging vessel to simulate material properties 7-10 years post-construction. The un-modified VTB material has a penetration grade of 20-30 and a performance grade ("PG") of 76-10. To achieve the objectives, VTB are used in combination with BDMs and the results are analyzed using a multiple regression model to help quantify the economic benefit of using the bio-materials. The developed model can assist in the incorporation of bio-materials into VTB formulations.

Bio-derived materials ("BDMs") from linseed oil have been shown to be a softer material that can add value to very stiff VTB. The objective of the present invention is to modify performance of VTB modified with BDM from linseed oil used as rejuvenators at low and intermediate temperatures and compare the performance against that of a control group, and VTB modified with a commercially available rejuvenator. Testing methods used were the semi-circular bend ("SCB") test and the dynamic modulus test at low and intermediate temperatures.

BRIEF DESCRIPTION OF THE DRAWINGS

FIG. 40 is a table showing log 10|Gb*| Tukey HSD least square means difference for interaction group name by age.

DETAILED DESCRIPTION OF THE INVENTION

Figure 1:
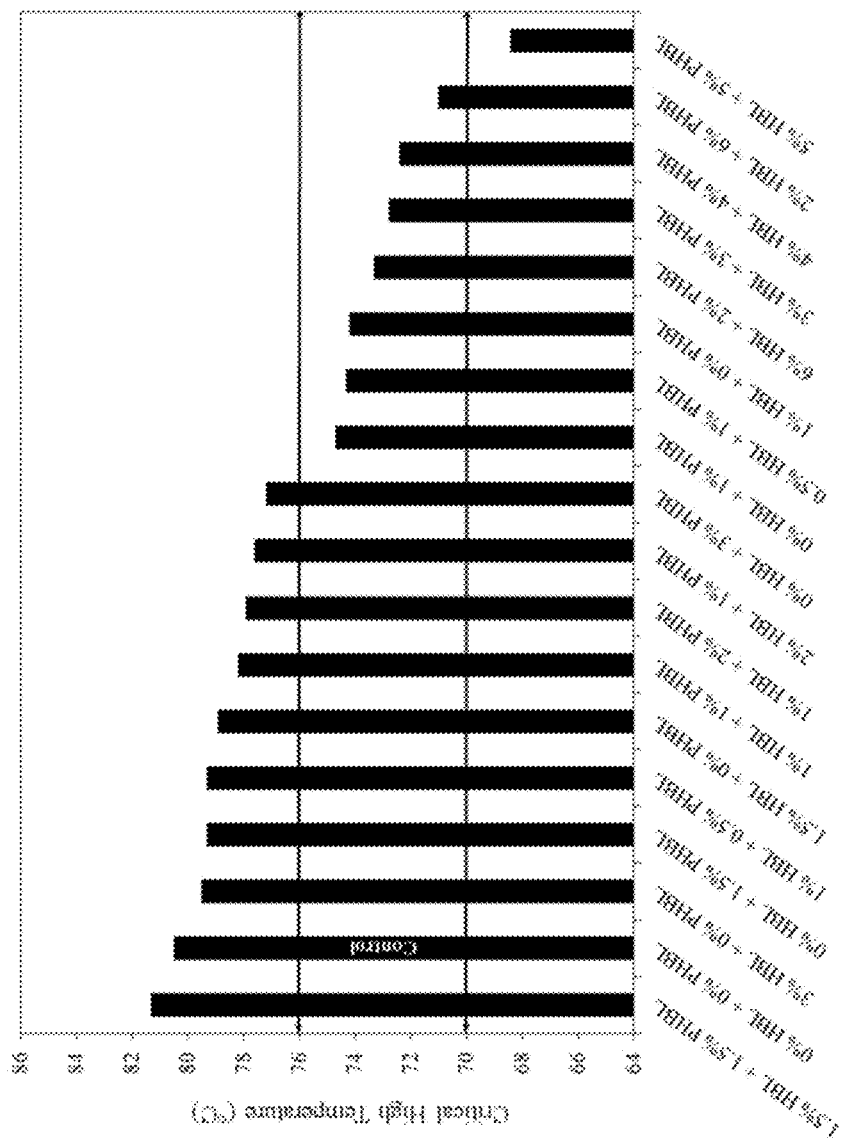
FIG. 1 shows the average critical high temperature of three tested RTFO DSR specimens for each of the eighteen BDM combination groups.

One aspect of the present invention relates to an asphalt product. The asphalt product includes an asphalt binder and a bio-oil blend comprising a mixture of a non-hydrogenated bio-oil and a partially hydrogenated bio-oil, where the bio-oil blend is mixed with the asphalt binder to form an asphalt product having a shear stiffness of 0.20 kPa to 11,000 kPa at a temperature ranging from 25° C. to 85° C. and/or a viscosity of 0.15 Pa·s to 1.50 Pa·s at a temperature ranging from 120° C. to 165° C.

One route to convert lignocellulosic biomass to produce chemicals and fuels that has gained serious attention more recently is a fast pyrolysis platform. Fast pyrolysis is the rapid thermal decomposition of organic compounds in the absence of oxygen to produce liquids, gases, and chars. The distribution of products depends on the biomass composition, particle size, and rate and duration of heating. Liquid yields as high as 78% are possible. The liquid product can substitute for fuel oil in static heating or electricity generation application. In addition, the liquid can also be used to produce a range of specialty and commodity chemicals, such as levoglucosene, fertilizers, and hydrogen. Depending on its original lignocellulosic biomass source, bio-oil contains between 10 to 30% lignin by weight.

In the fast pyrolysis process, biomass is heated rapidly in a high temperature environment, yielding a mix of liquid fuel (bio-oil), combustible gases, and solid char. Pyrolysis is an independent conversion technology, as well as a part of the gasification process. Gasification can be separated into two main stages: 1) solid devolatilization (pyrolysis) and 2) char conversion (combustion and gasification). Fast pyrolysis converts biomass into liquid form, which has higher bulk density and heating value. Thus, it is easier and more economical to store and/or transport compared to the bulky biomass. The liquid product resulting from biomass pyrolysis is commonly referred to as "pyrolysis oil," "bio-fuel oil," or simply "bio-oil."

Bio-oil is a dark-brown, mobile liquid derived from the thermo-chemical processing of biomass. Bio-oils generally contain water and lignin. Lignin is a highly-available, well-studied bio-polymer known for its antioxidant properties. For asphalt pavements, oxidation can cause deterioration via long-term aging and eventually result in cracking. The present invention relates to lignin-containing bio-oil as an antioxidant additive for utilization in asphalt binders, and optimization of the bio-oil formulation by adding other additives. Using bio-oil as an antioxidant in asphalt production represents an economical alternative to conventional methods while being conscious of the environment and increasing the longevity and performance of asphalt pavements. As a pavement ages, it becomes stiffener and more susceptible to failure. The use of bio-oil as an asphalt additive is an attractive way to increase the longevity and enhance the performance of asphalt pavements.

Asphalt includes material in which the predominating constituents are bitumens, which occur in nature or are obtained in petroleum processing. Bitumens include solid, semisolid, or viscous substances, natural or manufactured, composed principally of high molecular weight hydrocarbons. The asphalt used in the present invention is not particularly limited, and various kinds of asphalts may be used. Examples of the asphalt include straight asphalts such as petroleum asphalts for pavements, as well as polymer-modified asphalts produced by modifying asphalt with a polymer material including a thermoplastic elastomer such as styrene/butadiene block copolymers ("SBS"), styrene/isoprene block copolymers ("SIS"), and ethylene/vinyl acetate copolymers ("EVA"), as further described below.

In one embodiment of the present invention, bio-oil formulated as an asphalt binder can include asphalt. Suitable grades of asphalt include the following: PG52-22, PG58-22, PG64-22, PG67-22, PG70-22, PG76-22, PG82-22, PG52-28, PG58-28, PG64-28, PG67-28, PG70-28, PG76-28, PG52-34, PG58-34, PG64-34, PG64-16, PG67-16, PG70-16, PG76-16, PG64-10, PG67-10, PG70-10, PG76-10, pen grade 40-50, pen grade 60-70, pen grade 85-100, pen grade 120-150, AR4000, AR8000, AC10 grade, AC20 grade, and AC30 grade. F. Roberts et al., "Hot Mix Asphalt Materials, Mixture Design, and Construction," *NAPA Research and Education Foundation* (2nd ed.) (1996), which is hereby incorporated by reference in its entirety.

The residuum of the vacuum distillation process, vacuum tower distillation bottoms ("VTB"), is a very stiff form of asphalt produced from through vacuum tower distillation processing in petroleum refineries (e.g., coking) and has limited use alone for paving. VTB is very stiff due to the loss of saturates from the coking process to produce more lighter components. VTB is used to increase production of higher economic value lighter components such as gasoline and jet fuel. Due to the loss of saturates from this process, VTB are very stiff and are heavily limited for use in paving.

In one embodiment of the present invention, the binder is a vacuum tower distillation bottom or vacuum tower bottom. Such vacuum tower distillation and vacuum tower bottoms are known to those skilled in the art.

Preferably, the asphalt product contains up to about 40% by weight bio-oil blend, up to about 50% by weight bio-oil blend, up to about 60% by weight bio-oil blend, up to about 70% by weight bio-oil blend, up to about 80% by weight bio-oil blend, up to about 90% by weight bio-oil blend, or up to 99% by weight bio-oil blend. The asphalt may alternatively contain from about 3% to about 40% by weight bio-oil blend. In one embodiment, the asphalt binder may contain about 3%, about 6%, about 9%, about 10%, about 15%, about 25%, about 30%, or about 40% by weight bio-oil blend. Bio-oil, when mixed with asphalt and heated to a temperature of from about 120° C. to about 170° C., polymerizes with the asphalt, as furfural and phenol compounds in the bio-oil chemically react and form a polymer in the asphalt binder. In one embodiment, the asphalt product comprises 0.1 to 10.0 wt. % of the bio-oil blend. In another embodiment, the asphalt product comprises 6.0 to 10.0 wt. % of the bio-oil blend.

The bio-oil of the present invention may be from an oil derived from a source selected from the group consisting of fish, animal, vegetable, synthetic and genetically-modified plant oils, and mixtures thereof. Renewable source derived fats and oils include algal oil, animal fat, beef tallow, borneo tallow, butterfat, camelina oil, candlefish oil, canola oil, castor oil, cocoa butter, cocoa butter substitutes, coconut oil, cod-liver oil, colza oil, coriander oil, corn oil, cottonseed oil, false flax oil, flax oil, float grease from wastewater treatment facilities, hazelnut oil, hempseed oil, herring oil, illipe fat, jatropha oil, kokum butter, lanolin, lard, linseed oil, mango kernel oil, marine oil, meadowfoam oil, menhaden oil, microbial oil, milk fat, mowrah fat, mustard oil, mutton tallow, neat's foot oil, olive oil, orange roughy oil, palm oil, palm kernel oil, palm kernel olein, palm kernel stearin, palm olein, palm stearin, peanut oil, phulwara butter, pile herd oil, pork lard, radish oil, ramtil oil, rapeseed oil, rice bran oil, safflower oil, sal fat, salicornia oil, sardine oil, sasanqua oil, sesame oil, shea fat, shea butter, soybean oil, sunflower seed oil, tall oil, tallow, tigernut oil, tsubaki oil, tung oil, triacylglycerols, triolein, used cooking oil, vegetable oil, walnut oil, whale oil, white grease, yellow grease, and derivatives, conjugated derivatives, genetically-modified derivatives, and mixtures of any thereof. The bio-oil from plant or animal oil of the present invention may be polymerized. The polymerized plant oil or animal oil can be subsequently partially or fully saturated via a catalytic hydrogenation post-polymerization. The monomeric oils used in the epoxidized fatty acid esters can be any triglycerides or triglyceride mixtures that are radically polymerizable. These triglycerides or triglyceride mixtures are typically plant oils. The bio-oil blend of the present invention may be modified or unmodified, partially or fully epoxidized, or partially, fully, or non-hydrogenated. In one embodiment, the bio-oil blend is methylated and/or hydrogenated.

The bio-oil blend of the present invention may be derived from a vegetable source such as high erucic acid rapeseed, soybean, safflower, canola, castor, sunflower, palm, and linseed. In particular, suitable plant oils may include a variety of vegetable oils such as butterfat, cocoa butter, cocoa butter substitutes, illipe fat, kokum butter, milk fat, mowrah fat, phulwara butter, sal fat, shea fat, borneo tallow, lard, lanolin, beef tallow, mutton tallow, tallow, animal fat, camelina oil, canola oil, castor oil, coconut oil, colza oil, coriander oil, corn oil, cottonseed oil, flax seed oil, false flax oil, hazelnut oil, hempseed oil, jatropha oil, linseed oil, mango kernel oil, meadowfoam oil, mustard oil, neat's foot oil, olive oil, palm oil, palm oil, peanut oil, ramtil oil, rapeseed oil, rice bran oil, safflower oil, salicornia oil, sasanqua oil, sesame oil, shea butter, soybean oil, sunflower seed oil, tall oil, tigernut oil, tsubaki oil, tung oil, vegetable oils, marine oils, menhaden oil, candlefish oil, cod-liver oil, orange roughy oil, pile herd oil, sardine oil, walnut oil, whale oils, herring oils, triacylglycerols, diacylglycerols, monoacylglycerols, triolein, palm olein, palm stearin, palm kernel olein, palm kernel stearin, triacylglycerols of medium chain fatty acids, and derivatives, conjugated derivatives, genetically-modified derivatives and mixtures thereof. According to certain embodiments of the hot melt adhesive, where the hydrogenated polymerized oil is a partially hydrogenated polymerized oil, the partially hydrogenated polymerized oil in the binder may undergo an oxidative curing. In a preferred embodiment, the bio-oil is linseed oil.

In another embodiment, the composition further comprises one or more non-hydrogenated, hydrogenated, or partially hydrogenated vegetable oils. The one or more hydrogenated vegetable oils are derived from a group of vegetable oils consisting of high erucic acid rapeseed, soybean, safflower, canola, castor, sunflower and linseed oils. In one embodiment, the hydrogenated vegetable oil is derived from high erucic acid rapeseed, soy or castor oil and the hydrogenated polymerized oil is derived from linseed oil. In this embodiment, the non-hydrogenated, hydrogenated, or partially hydrogenated vegetable oils and the vegetable oil are respectively present in a range of ratios where the final product has the desired properties. Such properties may be affected by the relative ratios of the above ingredients and can vary depending on the composition's end-use.

Heat polymerized oils, often referred to as heat bodied oils, are prepared from unsaturated oils. Linseed, safflower and soybean oils are commonly used as the starting materials for this process. In addition, fish oils are commonly heat polymerized. Depending on the oil used, the temperature is held between about 288° C. to about 316° C. until a product with a desired viscosity is obtained. Longer reaction times are used to reach a higher viscosity product. The viscosity of polymerized oils is described using a scale with values ranging from P to $Z_9$. During the heat-polymerization reaction, the unsaturated triacylglycerols react to form polymers. As polymerization takes place, new carbon-carbon bonds are formed between triacylglycerol units at sites occupied by double bonds in the original triacylglycerols. Ester bonds between glycerol and fatty acids in the original triacylglycerols remain intact.

The product of the present aspect may be a semi-solid or wax-like material. The state of the composition will depend on the degree of hydrogenation. The hardness or softness of the material may be a result of the level of hydrogenation. Thus, when a material having a different consistency is desired, the oil(s) comprising the composition may be hydrogenated fully or partially to yield the desired consistency. Depending on the material's hardness or softness preferred, the oil(s) comprising the composition may be hydrogenated to the extent desired. The term "hydrogenated" thus encompasses varying degrees of partial and full hydrogenation. See U.S. Pat. No. 7,951,862 to Bloom et al., which is hereby incorporated by reference in its entirety.

In one embodiment, the bio-oil blend is a mixture of heat-bodied linseed oil ("HBL") and partially hydrogenated heat-bodied linseed oil ("PHBL"). More particularly, the asphalt product, in one embodiment, may have an HBL concentration of 0.5%-6.0% and a PHBL concentration of 0.5%-6.0%. In another embodiment, the asphalt product may have an HBL concentration of 3.0%-5.0% and a PHBL concentration of 3.0%-5.0%. For example the HBL and PHBL concentrations may be 0.5%, 1.0%, 1.5%, 2.0%, 2.5%, 3.0%, 3.5% 4.0%, 4.5%, 5.0%, 5.5% and 6.0%.

The linseed oil is a heat-bodied linseed oil ("HBL") and, in different embodiment, the linseed oil is a partially hydrogenated heat-bodied linseed oil ("PHBL"). The asphalt product may have an HBL concentration of 0.5%-3.0% or a PHBL concentration of 0.5%-3.0%. For example the HBL concentration may be 0.5%, 1.0%, 1.5%, 2.0%, 2.5%, and 3.0% or, alternatively, the PHBL concentration may be 0.5%, 1.0%, 1.5%, 2.0%, 2.5%, and 3.0%.

In another embodiment, the composition may include a hydrogenated polymerized oil that further includes a fatty acid ester of triglycerol (triglycerol: CA number 56090-54-1). The fatty acid ester of triglycerol can be a mono-, di-, tri-, tetra-, or penta-ester. In still other embodiments, the fatty acid ester is behenic acid ester. Such esters can be added to modify the micro-crystallinity of wax-like solids or otherwise enhance the desired physical characteristics describe above. See U.S. Pat. No. 7,951,862 to Bloom et al., which is hereby incorporated by reference in its entirety.

In another embodiment, the mixture of non-hydrogenated bio-oil and partially hydrogenated oil further comprises a fatty acid ester of triglycerol and a refined, bleached and deodorized ("RBD") vegetable oil. In such a composition, it may be desirable that the mixture of non-hydrogenated bio-oil and partially hydrogenated oil, the RBD vegetable oil and the fatty acid ester are respectively present in a range of ratios where the final product has the desired properties. Such properties may be affected by the relative ratios of the above ingredients and can vary depending on the composition's end-use, which are described herein. In certain embodiments, the RBD oil is selected from the group of vegetable oils consisting of high erucic acid rapeseed, soybean, safflower, canola, castor, sunflower and linseed oils. In another embodiment, the hydrogenated polymerized oil is derived from soy oil, the RBD oil is soy oil, and the fatty acid ester is behenic acid ester. In any of these embodiments, the ratios of non-hydrogenated bio-oil and partially hydrogenated oil to RBD vegetable oil to fatty acid ester can be modified to yield the desired product consistency in accord with the final disposition of the product. The respective amount of any of the above primary ingredients can be adjusted from between about 1% to about 99% of the composition. See U.S. Pat. No. 7,951,862 to Bloom et al., which is hereby incorporated by reference in its entirety.

In yet another embodiment, the one or more vegetable oils described above are blended to form a first oil mixture, which is then admixed with the mixture of non-hydrogenated bio-oil and partially hydrogenated oil. The first oil mixture can be admixed with the mixture of non-hydrogenated bio-oil and partially hydrogenated oil at a ratio of between about 1:1 to about 1:100 first oil mixture to mixture of non-hydrogenated bio-oil and partially hydrogenated oil. The ratio can be adjusted accordingly to suit the desired end-use of the composition or as needed for any reason. In certain embodiments, the first oil mixture is a blend of heat-bodied linseed oil and partially hydrogenated heat-bodied linseed oil. The ratio forms a blend that is useful as a crystal modifier, but the ratio can be adjusted accordingly to suit the desired end-use of the composition or as needed for any reason. Such a first oil mixture can be added to any hydrogenated polymerized oil at a ratio described above. See, e.g., U.S. Pat. No. 7,951,862 to Bloom et al., which is hereby incorporated by reference in its entirety.

The composition comprising a mixture of non-hydrogenated bio-oil and partially hydrogenated oil can further include a fatty acid ester of triglycerol. The hydrogenated vegetable oil(s) can be blended with said fatty acid ester of triglycerol at a ratio of between about 1:1 to about 100:1 hydrogenated vegetable oil(s) to said fatty acid ester to form a first blend. The ratio of oil and ester in the first blend can be adjusted accordingly to suit the desired end-use of the composition or as needed for any reason. The first blend can be admixed with the hydrogenated polymerized oil at a ratio of between about 1:1 to about 100:1 hydrogenated polymerized oil to said first blend to form the composition. In this embodiment, the hydrogenated polymerized oil, one or more hydrogenated vegetable oils and the fatty acid ester are respectively present in a range of ratios where the final product has the desired properties. Such properties may be affected by the relative ratios of the above ingredients and can vary depending on the composition's end-use, which are described above. In one embodiment, the hydrogenated polymerized oil is derived from linseed or soy oil; the hydrogenated vegetable oil is derived from soy oil; and the fatty acid ester is a behenic acid ester. See U.S. Pat. No. 7,951,862 to Bloom et al., which is hereby incorporated by reference in its entirety.

According to other embodiments, the partially hydrogenated polymerized oils of the present disclosure may be interesterified with triacylglycerol oils, for example, vegetable oils, which may be non-hydrogenated, partially hydrogenated, and fully hydrogenated. As used herein, the terms "interesterified" and "interesterification" refer to a chemical reaction in which the ester functional groups in the two or more components exchange the acyl portion of the at least one of the esters of triacylglycerols in vegetable oils (including hydrogenated and polymerized vegetable oils), as shown in equation 1. See U.S. Pat. No. 7,951,862 to Bloom et al., which is hereby incorporated by reference in its entirety.

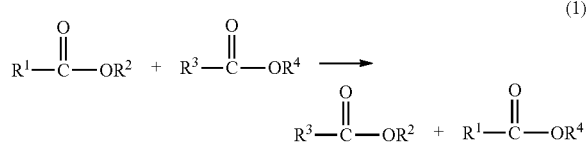

(1)

For example, the hydrogenated heat-bodied or polymerized oils of the present disclosure may be interesterified with hydrogenated HEAR oil to produce a composition having a high monoester content. Suitable procedures for interesterification include, but are not limited to, those described in U.S. Pat. No. 2,442,531 to Eckey, U.S. Pat. No. 2,442,532 to Eckey, and U.S. Pat. No. 6,723,863 to Lee et al., each of which is hereby incorporated by reference its entirety, including enzymatic interesterification, acid mediated interesterification, and base mediated interesterification. According to certain embodiments, interesterification of the partially hydrogenated heat-bodied or polymerized oil with other vegetable oils, such as hydrogenated HEAR oil may be used to produce a microcrystalline wax material. The microcrystalline wax material may be composed of primarily bio-based products. See U.S. Pat. No. 7,951,862 to Bloom et al., which is hereby incorporated by reference in its entirety.

According to other embodiments, one or more carbon-carbon double bonds in the molecular structure of the polymerized oils and partially hydrogenated polymerized oils of the present invention may be subjected to epoxidation. Epoxidation, either by a chemical epoxidation or an enzymatic epoxidation, converts the one or more carbon-carbon double bonds on the polymerized oil to an epoxide. According to various embodiments, at least one up to all of the remaining carbon-carbon double bonds of the polymerized oil may be converted to epoxides. The resulting epoxy systems may react with nucleophiles, such as amines/polyamides and hydroxyls. In other embodiments, the epoxidized polymerized oils may be used as acid scavengers (such as HCl scavengers) or as plasticizers, lubricants, or additives in PVC or other plastic compounding application. See U.S. Pat. No. 7,951,862 to Bloom et al., which is hereby incorporated by reference in its entirety. The polymerized oils described herein may contain one or more epoxide (oxirane) rings, and unless specified otherwise, it is intended that the compounds include both cis- or trans-isomers and mixtures thereof. When the polymerized oils described herein contain olefinic double bonds or other centers of geometric asymmetry, and unless specified otherwise, it is intended that the compounds include both E and Z geometric isomers.

The fracture energy of the asphalt product described herein may, in one embodiment, be between 5% to 100% greater than that of an asphalt product without the bio-oil blend. For example, the fracture energy may be 5%, 10%, 15%, 20%, 25%, 30%, 35%, 40%, 45%, 50%, 55%, 60%, 65%, 70%, 75%, 80%, 85%, 90%, 95% or even 100% greater than when the bio-oil blend is not present in the asphalt material. A semi-circular bend ("SCB") test carried out in accordance with AASHTO TP 105-13 is one method for determining fracture energy and may be used herein. See Chong et al., "New Specimen for Fracture Toughness Determination for Rock and Other Materials," *International Journal of Fracture* 26(2): R59-R62 (1984); *Semi-Circular Bending Test: A Practical Crack Growth Test Using Asphalt Concrete Cores*. RILEM PROCEEDINGS, CHAPMAN & HALL (1996); Li et al., "Using Semi Circular Bending Test to Evaluate Low Temperature Fracture Resistance for Asphalt Concrete," *Experimental Mechanics* 50(7):867-76 (2010); Li et al., "Evaluation of the Low Temperature Fracture Resistance of Asphalt Mixtures Using the Semi Circular Bend Test (with Discussion)," *Journal of the Association of Asphalt Paving Technologists* 73 (2004); Lim et al., "Stress Intensity Factors for Semi-Circular Specimens under Three-Point Bending," *Engineering Fracture Mechanics* 44(3):363-82 (1993); Marasteanu et al., "National Pooled Fund Study—Phase Ii: Final Report—Investigations of Low Temperature Cracking in Asphalt Pavements," MN/RC 2012-23, (2012); *Low Temperature Fracture Test for Asphalt Mixtures. Fifth International RILEM Conference on Reflective Cracking in Pavements* (2004) RILEM Publications SARL; and Teshale et al., "Low-Temperature Fracture Behavior of Asphalt Concrete in Semi-Circular Bend Test," University of Minnesota (2012), all of which are hereby incorporated by reference in their entirety.

The stiffness of the asphalt product of the present aspect may be between 5% to 100% less than that of an asphalt material without the bio-oil blend. For example, the stiffness may be 5%, 10%, 15%, 20%, 25%, 30%, 35%, 40%, 45%, 50%, 55%, 60%, 65%, 70%, 75%, 80%, 85%, 90%, 95%, or even 100% less than when the bio-oil blend is absent from the asphalt product. A semi-circular bend ("SCB") test carried out in accordance with AASHTO TP 105-13 is one method for determining stiffness and may be used herein.

For example, the asphalt binder, when combined with the bio-oil blend, may produce a shear stiffness of 0.20 kPa to 11,000 kPa at a temperature ranging from 25° C. to 85° C. For example, the shear stiffness at a temperature ranging from 25° C. to 85° C. may be up 0.20 kPa; between 0.20 kPa and 11,000 kPa; between 0.50 kPa and 11,000 kPa; between 1.00 kPa and 11,000 kPa; between 1.50 kPa and 11,000 kPa; between 2.00 kPa and 11,000 kPa; between 2.50 kPa and 11,000 kPa; between 3.00 kPa and 11,000 kPa; between 3.50 kPa and 11,000 kPa; between 4.00 kPa and 11,000 kPa; between 4.50 kPa and 11,000 kPa; between 5.00 kPa and 11,000 kPa; between 5.50 kPa and 11,000 kPa; between 6.00 kPa and 11,000 kPa; between 6.50 kPa and 11,000 kPa; between 7.00 kPa and 11,000 kPa; between 7.50 kPa and 11,000 kPa; between 8.00 kPa and 11,000 kPa; between 8.50 kPa and 11,000 kPa; between 9.00 kPa and 11,000 kPa; between 9.50 kPa and 11,000 kPa; between 10.00 kPa and 11,000 kPa; between 25.00 kPa and 11,000 kPa; between 50.00 kPa and 11,000 kPa; between 100.00 kPa and 11,000 kPa; between 200.00 kPa and 11,000 kPa; between 300.00 kPa and 11,000 kPa; between 400.00 kPa and 11,000 kPa; between 500.00 kPa and 11,000 kPa; between 1,000 kPa and 11,000 kPa; between 2,500 kPa and 11,000 kPa; between 5,000 kPa and 11,000 kPa; between 7,500 kPa and 11,000 kPa; and between 10,000 kPa and 11,000 kPa. The temperature may be, for example, 25° C.; between 25° C. and 85° C.; between 30° C. and 85° C.; between 35° C. and 85° C.; between 40° C. and 85° C.; between 45° C. and 85° C.; between 50° C. and 85° C.; between 55° C. and 85° C.; between 60° C. and 85° C.; between 65° C. and 85° C.; between 70° C. and 85° C.; between 75° C. and 85° C.; between 80° C. and 85° C.; and 85° C. For example, in one embodiment, the asphalt product has a shear stiffness of 0.20 kPa to 11,000 kPa at a temperature ranging from 25° C. to 85° C. and a viscosity of 0.15 Pa·s to 1.50 Pa·s at a temperature ranging from 120° C. to 165° C. In another embodiment, the asphalt product has a shear stiffness for an unaged binder ranging from 0.21 kPa to 7.45 kPa at a temperature ranging from 64° C. to 82° C. In yet another embodiment, the asphalt product has a shear stiffness for a short term aged binder ranging from 0.45 kPa to 23.25 kPa at a temperature ranging from 64° C. to 82° C. Alternatively, in another embodiment, the asphalt product may have a shear stiffness for a long term aged binder ranging from 659.04 kPa to 10,883.63 kPa at a temperature ranging from 31° C. to 40° C.

The asphalt product of the present aspect may have a viscosity of between 0.15 Pa·s to 1.50 Pa·s at a temperature ranging from 120° C. to 165° C. For example, the viscosity at a temperature ranging from 120° C. to 165° C. may be 0.15 Pa·s, up to 0.20 Pa·s, between 0.15 and 0.2 Pa·s; between 0.15 and 0.3 Pa·s; between 0.15 and 0.4 Pa·s; between 0.15 and 0.5 Pa·s; between 0.15 and 0.6 Pa·s; between 0.15 and 0.7 Pa·s; between 0.15 and 0.8 Pa·s; between 0.15 and 0.9 Pa·s; between 0.15 and 1.0 Pa·s; between 0.15 and 1.1 Pa·s; between 0.15 and 1.2 Pa·s; between 0.15 and 1.3 Pa·s; between 0.15 and 1.4 Pa·s; and between 0.15 and 1.5 Pa·s. The temperature may be, for example, 120° C., between 120° C. and 140° C., between 120° C. and 150° C., between 120° C. and 160° C., or between 120° C. and 165° C. In one embodiment, the asphalt product has a viscosity of 0.18 Pa·s to 1.35 Pa·s at a temperature ranging from 135° C. to 165° C. In another embodiment, the asphalt product has a viscosity of 0.6469 Pa·s to 1.33 Pa·s at a temperature of 135° C. In yet another embodiment, the asphalt product has a viscosity of 0.3244 Pa·s to 0.5435 Pa·s at a temperature of 150° C. Alternatively, in another embodiment, the asphalt product has a viscosity of 0.1808 Pa·s to 0.2825 Pa·s at a temperature of 165° C.

In one embodiment, the product has a specific gravity of between 1.019-1.052. For example, the specific gravity may be, but is not limited to, 1.019, 1.020, 1.025, 1.030, 1.035, 1.040, 1.045, 1.050, and 1.052.

In one embodiment, the asphalt product further includes a mineral aggregate. A mineral aggregate may be added to the asphalt product to modify its rheology and temperature susceptibility. The bio-oil blend may bind to the mineral aggregate at an air void content of from about 1% to about 50% according to procedures known to one of skill in the art. The mineral aggregate may include, but is not limited to, sand, gravel, limestone, quartzite, crushed stone, slag, and mixtures thereof. The mineral aggregate particles of the present invention can include calcium based aggregates, for example, limestone, siliceous based aggregates and mixtures thereof. Aggregates can be selected for asphalt paving applications based on a number of criteria, including physical properties, compatibility with the bitumen to be used in the construction process, availability, and ability to provide a finished pavement that meets the performance specifications of the pavement layer for the traffic projected over the design life of the project. The product may be free of deletrious materials such as those within an aggregate stockpile that are weak, reactive, or unsound as well as free of substantial voids within the aggregate.

In one embodiment, the product is in the form of asphalt concrete used in pavement. In another embodiment, the asphalt product is in the form of an asphalt mixture. The asphalt mixture may further include fiberglass and a mineral aggregate including at least one of lime dust and granular ceramic material. Mineral aggregates of the present invention may include elements of less than 0.063 mm and optionally aggregates originating from recycled materials, sand with grain sizes between 0.063 mm and 2 mm and optionally grit, containing grains of a size greater than 2 mm, and optionally alumino-silicates. Aluminosilicates are inorganic compounds based on aluminium and sodium silicates or other metal such as potassium or calcium silicates. Aluminosilicates reduce the viscosity of the warm-mix and are in the form of a powder and/or granulates. The term granulates refers to mineral and/or synthetic granulates, especially coated material aggregates, which are conventionally added to bituminous binders for making mixtures of materials for road construction.

In another embodiment, the asphalt product is used in roofing shingles. For a roofing-grade asphalt product, roofing granules can be applied to a surface of a coated base material. The roofing granules can be used for ultraviolet radiation protection, coloration, impact resistance, fire resistance, another suitable purpose, or any combination thereof. The roofing granules may include inert base particles that are durable, inert inorganic mineral particles, such as andesite, boehmite, coal slag, diabase, metabasalt, nephaline syenite, quartzite, rhyodacite, rhyolite, river gravel, mullite-containing granules, another suitable inert material, or any combination thereof. See U.S. Patent Publ. No. 2013/0160674 to Hong et al., which is hereby incorporated by reference in its entirety.

Roofing granules may also include one or more surface coatings over the shingle. The surface coating can cover at least approximately 75% of the surface of the shingle, and may cover at least approximately 90% of the surface of the shingle and may or may not have a uniform thickness. If more than one surface coating is used, a surface coating closer to the shingle can include a binder that can be inorganic or organic. An inorganic binder can include a silicate binder, a titanate binder, a zirconate binder, an aluminate binder, a phosphate binder, a silica binder, another suitable inorganic binder, or any combination thereof. An organic binder can include a polymeric compound. In a particular embodiment, an organic binder can include an acrylic latex, polyurethane, polyester, silicone, polyamide, or any combination thereof. One or more additional organic binders of the same or different composition can be used.

A surface coating may also or alternatively include a solar reflective material that helps to reflect at least some of the solar energy. For example, UV radiation can further polymerize or harden the asphalt within roofing product being fabricated. A solar reflective material can include titanium dioxide, zinc oxide, or the like. Alternatively, the solar reflective material can include a polymeric material. In one embodiment, a polymer can include a benzene-modified polymer (e.g., copolymer including a styrene and an acrylate), a fluoropolymer, or any combination thereof. Other solar reflective materials are described in U.S. Pat. No. 7,241,500 to Shiao et al. and U.S. Publ. Nos. 2005/0072110 to Shiao et al. and 2008/0220167 to Wisniewski et al., all of which are incorporated by reference for their teachings of materials that are used to reflect radiation (e.g., UV, infrared, etc.) from the sun.

A surface coating can also or alternatively include an algaecide or another biocide to help reduce or delay the formation of algae or another organic growth. The algaecide or other biocide can include an organic or inorganic material. The algaecide or other biocide can include a triazine, a carbamate, an amide, an alcohol, a glycol, a thiazolin, a sulfate, a chloride, copper, a copper compound, zinc, a zinc compound, another suitable biocide, or any combination thereof. In a particular embodiment, the algaecide or other biocide can be included within a polymeric binder. The polymeric binder can include polyethylene, another polyolefin, an acid-containing polyolefin, ethylene vinyl acetate, an ethylene-alkyl acrylate copolymer, a polyvinylbutyral, polyamide, a fluoropolymer, an acrylic, a methacrylate, an acrylate, polyurethane, another suitable binder material, or any combination thereof. The algaecide or other biocide can be an inorganic material that is included within an inorganic binder, for example, within an alkali metal silicate binder. An exemplary inorganic algaecide or other biocide can include a metal (by itself), a metal oxide, a metal salt, or any combination thereof. The metallic element used within the metal, metal oxide, or salt may include copper, zinc, silver, or the like. The metal salt can include a metal sulfate, a metal phosphate, or the like.

A surface coating can include a colorant or another material to provide a desired optical effect. The colorant or other material can include a metal oxide compound, such as titanium dioxide (white), zinc ferrite (yellow), red iron oxides, chrome oxide (green), and ultramarine (blue), silver oxide (black), zinc oxide (dark green), or the like. In another embodiment, the colorant or other material may not be a metal-oxide compound. For example, the colorant may include carbon black, zinc or aluminum flake, or a metal nitride.

The asphalt product can also include manufactured sand, e.g., crushed and washed mined aggregate, and also a blend of ceramic material and manufactured sand. Likewise, the product may include modified asphalt containing a Fischer-Tropsch wax, polyethylene wax, and/or oxidized polyethylene wax. Wax modifiers that can be usefully employed in the context of the present invention include, but are not limited to, waxes of vegetable (e.g. carnuba wax), animal (e.g beeswax) mineral (e.g. Montan™ wax from coal, Fischer Tropsch wax from coal) or petroleum (e.g. paraffin wax, polyethylene wax, Fischer-Tropsch wax from gas) origin including oxidized waxes; amide waxes (e.g. ethylene bis stearamide, stearyl amide, stearyl stearamide); fatty acids and soaps of waxy nature (e.g., aluminum stearate, calcium stearate, fatty acids); other fatty materials of waxy nature (fatty alcohols, hydrogenated fats, fatty esters etc) with the ability to stiffen asphalt, and the like. The above products are basically soluble in the asphalt at warm mix temperatures, to make a homogeneous binder, and/or will melt at the temperature of the mix and the ingredients will disperse/dissolve into the mixture. The wax and resin ingredients will generally act to improve cohesion properties of the asphalt, while the adhesion promoter will improve the adhesion of the asphalt to the aggregate. Together the ingredients provide improved resistance to water damage. The present invention may employ a Fischer Tropsch Wax derived from coal or natural gas or any petroleum feedstock. The process entails the gasification of the above feedstock by partial oxidation to produce carbon monoxide under high temperature and pressure and reaction of the resultant carbon monoxide with hydrogen under high temperature and pressure in the presence of a suitable catalyst (such as iron compound or cobalt compound) for example as in the case of processes employed by Shell and Sasol. The congealing point of the wax is between 68° C. and 120° C. with a Brookfield viscosity at 135° C. in the range of 8 to 20 cPs. For example, the congealing point of the wax may be between 80° C. and 120° C. Alternatively, the congealing point of the wax may be between 68° C. and 105° C. See U.S. Patent Publ. No. 2013/0186302 to Naidoo et al., which is hereby incorporated by reference in its entirety.

In an embodiment of the present invention, asphalt binder may be combined with bio-oil blend to form a substantially homogeneous mixture. The homogenous material can be graded according to AASHTO MP3 and used as an asphalt binder in paving projects.

The asphalt binder modifier can, in one embodiment, include a carboxyl additive. Examples of carboxyl additives include, but are not limited to, tall oil and vegetable oils, such as linseed oil and soybean oil and the like. The carboxyl may be added at a concentration of up to about 10% by weight of the asphalt binder or, more preferably, the carboxyl is added at a concentration of from about 0.18% to about 10% by weight of the asphalt binder. The bio-oil and tall oil are added to an asphalt binder at a temperature ranging from about 120° C. to about 170° C. utilizing mechanical agitation/mixing.

The asphalt product may optionally include a polymer additive. Any suitable polymer or mixture of different polymers can be used in producing polymer-modified asphalt. The asphalt binder can include, for example, a polymer additive such as polyethylenes, oxidized polyethylenes, polyolefins, PE homopolymers, styrene/butadiene/styrene triblock copolymer, styrene/ethylene-butylene/styrene triblock copolymer, epoxy modified acrylate copolymer, ethylene/vinyl acetate copolymer, or mixtures thereof. The polymer additive can include low molecular weight polymers, such as low, medium, or high density polyethylenes having a maximum viscosity of 1000 cps at 140° C. Other suitable polymers would include ethylenes and polypropylenes with melting points below 140° C. In one embodiment, the binder may further include a styrene-butadiene type polymer. Styrene-butadiene type polymers may, in certain embodiments, include SB rubber, SBS linear type, SBS radial type, and SB sulphur linked type polymers, and the like. Polymers, such as styrene butadiene polymers, can be used to adjust or manipulate certain characteristics of the resulting hardened asphalt product. Styrene butadiene modified asphalts may demonstrate greater ability to withstand temperature extremes. For example, styrene butadiene modified asphalt is more viscous at high temperatures and therefore resistant to rutting or shoving, and more ductile at low temperatures and therefore less brittle, more resistant to fatigue cracking, and provide a more adhesive binder. According to certain embodiments, the binder materials of the present disclosure comprising the at least partially hydrogenated polymerized oil may be used as a binder material in asphalt applications. See U.S. Pat. No. 7,951,862 to Bloom et al., which is hereby incorporated by reference in its entirety.

The polymer additive in the asphalt binder may be added at a concentration of up to about 1%, up to about 5%, up to about 10%, up to about 15%, up to about 20%, up to about 25%, and up to about 50% of the asphalt binder. The polymer additive is added to the bio-oil at a temperature ranging from about 100° C. to about 130° C. utilizing mechanical agitation/mixing.

The asphalt binder may include from about 99% to about 1% by weight asphalt (and when the asphalt contains a polymer-modified asphalt, from 0% to about 25% by weight styrene-butadiene type polymer), about 1% to about 99% by weight bio-oil blend, and optionally from about 0.10% to about 10% by weight carboxyl bio-oil additive.

In an embodiment, the asphalt binder can be mixed with water and a surfactant and mechanically agitated in, for example, a shear mill, to form an emulsion. Suitable emulsion-forming surfactants are known to those of skill in the art. The emulsified asphalt binder can be used as weatherproofing sealant or as an adhesive bonding layer between two surfaces.

Another aspect of the present invention relates to a method of producing an asphalt product. The method includes providing an asphalt binder, where the binder is a vacuum tower distillation bottom; providing a bio-oil blend comprising a mixture of a non-hydrogenated bio-oil and a partially hydrogenated bio-oil. The asphalt binder is mixed with the bio-oil blend under conditions effective to produce an improved asphalt product having a shear stiffness of 0.20 kPa to 11,000 kPa at a temperature ranging from 25° C. to 85° C. and/or a viscosity of 0.15 Pa·s to 1.50 Pa·s at a temperature ranging from 120° C. to 165° C.

The asphalt binder and bio-oil blend of this aspect of the present invention are in accordance with the previously described aspects of the invention. In one embodiment, the asphalt used in carrying out this aspect of the present invention may be the above described polymer modified asphalt product.

The mixing step may be carried out in a high speed shear mill at a temperature of, for example, 160° C., 159° C., 158° C., 157° C., 156° C., 155° C., 154° C., 153° C., 152° C., 151° C., 150° C., or any temperature in between. In one embodiment, mixing is carried out in a high speed shear mill at 150° C. to 160° C.

Another aspect relates to a method of applying an asphalt product to a surface. The method includes (a) providing an asphalt product, (b) heating the asphalt product to a temperature of 145° C. to 155° C. to coat the mineral aggregate and produce an asphalt material which has improved rheological properties compared to that of an asphalt material absent the bio-derived material; (c) applying the heated asphalt material to a surface to be paved to form an applied paving material; and (d) compacting the applied paving material.

The asphalt product, asphalt material, and bio-derived material of this aspect of the present invention are in accordance with the previously described aspects of the invention. In one embodiment, the asphalt used in carrying out this aspect of the present invention may be the above described polymer modified asphalt product.

The heating step of the present aspect may be carried at a temperature of, for example, 145° C., 146° C., 147° C., 148° C., 149° C., 150° C., 151° C., 152° C., 153° C., 154° C., 155° C., or any temperature in between. In one embodiment, mixing is carried out in a high speed shear mill at 145° C. to 155° C. Whichever temperature is used, it is adequate for the asphalt product to coat a mineral aggregate including the mineral aggregates described above and to produce an asphalt product with improved rheological properties compared to an asphalt product absent BDMs.

The asphalt material may be applied to any surface to be paved to form an applied paving material consistent with paving materials and applications described above. While the surface to be paved is specific to a particular paving environment, other applications of the invention will become apparent to those skilled in the art. Accordingly, an applied paving material should be interpreted broadly to include all varieties of asphalt, cement, concrete, soil, sand, stones, bituminous material and all other forms of in-place material.

According to the present invention, the asphalt product may have a compaction force index of up to 600 at a temperature ranging from 100° C. to 140° C. The asphalt may alternatively have a compaction force index of under 2000 at a temperature ranging from 100° C. to 140° C. Compaction energy may be evaluated through use of a Pine AFG2 gyratory compactor and may include moment, height, pressure, and angle of gyration. Abed, A. H., "Enhanced Aggregate-Asphalt Adhesion and Stability of Local Hot Mix Asphalt," *Engineering and Technical Journal* 29(10):2044-59 (2011); DelRio-Prat et al., "Energy Consumption During Compaction with a Gyratory Intensive Compactor Tester. Estimation Models," *Construction and Building Materials* 25(2): 979-86 (2011); Faheem et al., "Estimating Results of a Proposed Simple Performance Test for Hot-Mix Asphalt from Superpave Gyratory Compactor Results," *Transportation Research Record: Journal of the Transportation Research Board* 1929:104-13 (2005); Mo et al. "Laboratory Investigation of Compaction Characteristics and Performance of Warm Mix Asphalt Containing Chemical Additives," *Construction and Building Materials* 37:239-47 (2012); Sanchez-Alonso et al., "Evaluation of Compactability and Mechanical Properties of Bituminous Mixes with Warm Additives," *Construction and Building Materials* 25(5):2304-1 (2011), all of which are hereby incorporated by reference in its entirety.

The above disclosure generally describes the present invention. A more specific description is provided below in the following examples. The examples are described solely for the purpose of illustration and are not intended to limit the scope of the present invention. Changes in form and substitution of equivalents are contemplated as circumstances suggest or render expedient. Although specific terms have been employed herein, such terms are intended in a descriptive sense and not for purposes of limitation.

EXAMPLES

The following examples are intended to illustrate, but by no means are intended to limit, the scope of the present invention as set forth in the appended claims.

Example 1—Materials and Methods

In this research work, one source of vacuum tower bottoms ("VTBs") from an Illinois refinery was used. VTBs are a very stiff form of asphalt binder, and typically have a penetration grade of 20-30 and a performance grade (PG) of PG 76-10. Two bio-derived materials from linseed oil were used-Heat Bodied Linseed Oil ("HBL" or "HBO") and Partially Hydrogenated Heat Bodied Linseed Oil ("PHBL" or "PHBO")—at addition rates between 0% and 6% to create a total of eighteen combination groups. The properties for the HBL and PHBL bio-derived materials ("BDMs") are shown in Table 1.

TABLE 1

Properties of BDMs HBL and PHBL

|  | HBL | PHBL |
|---|---|---|
| Physical Form | Amber liquid | Solid paste |
| Specific Gravity at 25° C. (77° F.) | 1.02 | 1.05 |
| Molecular Weight (Mn) [Da] | 3,400 | 3,400 |
| $T_g$ [° C.] | −17.91 | −24.89, 16.25 |
| Melting Temp. [° C.] | — | 42.92 |

|  | Shear Rate (1/S) | | | Shear Rate (1/S) | | |
|---|---|---|---|---|---|---|
| Viscosity (Pa · S) | 50 | 100 | 150 | 50 | 100 | 150 |
| at 25° C. (77° F.) | 3.57 | 3.56 | 3.54 | 52.6 | 42.24 | 36.35 |
| at 35° C. (95° F.) | 2.11 | 2.09 | 2.06 | 27.92 | 21 | 17.75 |
| at 45° C. (113° F.) | 1.2 | 1.19 | 1.18 | 9.26 | 7.09 | 6.23 |
| at 55° C. (131° F.) | 0.84 | 0.82 | 0.8 | 1.19 | 0.86 | 0.8 |
| at 65° C. (149° F.) | 0.48 | 0.48 | 0.47 | 0.06 | 0.14 | 0.16 |

Example 2—Sample Preparation and Experimental Testing Plan

Sample Preparation—To prepare samples for testing, BDMs were blended with the VTB at 155° C.±10° C. at 3000 rpm for one hour using a Silverson shear mill. After all blending combinations were created, the materials were then short term aged in a Rolling Thin Film Oven ("RTFO") and material was reserved for Dynamic Shear Rheometer ("DSR") testing to determine the high-temperature grade. The remaining material was aged in a pressure aging vessel ("PAV") for subsequent testing in a BBR for determining the low-temperature grade.

The high temperature grade of asphalt is important, because it measures the stiffness of the binder at high in-service temperatures. Adequate high-temperature binder properties are required to prevent permanent deformation or rutting. More specifically, the DSR characterizes the viscous and elastic behavior of high and intermediate temperatures for asphalt binders. DSR tests are conducted on unaged (original), short-term aged, and long term aged asphalt binder samples. The work initially focused on short-term aged binder testing with a DSR to identify the more viable combinations for subsequent testing and evaluation. Asphalt binders are known to be viscoelastic. This means they can experience material behavior like an elastic solid (recoverable deformation) and a viscous liquid (non-recoverable deformation) due to loading and unloading at the same time. Measurements gained from DSR testing are a specimen's complex shear modulus (G*) or stiffness and phase angle (δ). The complex shear modulus (G*) or stiffness is a measure of a specimen's total resistance to deformation, while the phase angle (δ) is the lag between the applied shear stress and the resulting shear strain experienced by said specimen. As the phase angle nears 90 degrees the material is more viscous, but as the phase angle edges closer to 0 degrees the material acts more elastic. The parameters G* and δ when used together as G*/sin(δ) are used to predict whether an asphalt binder will experience rutting. For short-term aged binder, rutting is the main concern (American Association of State Highway and Transportation Officials, (AASHTO), "Determining the Rheological Properties of Asphalt Binder Using a Dynamic Shear Rheometer (DSR)," T 315-10, Washington, D C (2011); American Association of State Highway and Transportation Officials, (AASHTO), "Performance-Graded Asphalt Binder," M 320-10, Washington, D C (2011); and American Association of State Highway and Transportation Officials, (AASHTO), "Standard Practice for Grading or Verifying the Performance Grade of an Asphalt Binder," R 29-08, Washington, DC (2011), all of which are hereby incorporated by reference in their entirety).

Pavements with stiff binders are more susceptible to low temperature cracking. As a binder ages, oxidation occurs that stiffens the binder. The long-term aging in the PAV simulates 7-10 years of in-situ aging. This aged material is poured into molds for testing in a BBR. For BBR testing the asphalt beam is immersed in a cold liquid bath for 60 minutes and is then tested as a simply supported beam. A load is applied to the center of the beam and the deflection measurements against time are obtained. Stiffness is calculated based on measured deflection and the beam dimensions used. The m-value is a measure of how the asphalt binder relaxes the load induced stresses when time is equal to 60 seconds. The BBR estimates the critical failure low temperature of the binder using AASHTO R 49-09. See American Association of State Highway and Transportation Officials, (AASHTO), "Determination of Low-Temperature Performance Grade (PG) of Asphalt Binders R 49-09," Washington, DC (2009), which is hereby incorporated by reference in its entirety. Testing was conducted at 0° C., −6° C. and −12° C. with each group being tested in triplicate. See American Association of State Highway and Transportation Officials, (AASHTO), "Determination of Low-Temperature Performance Grade (PG) of Asphalt Binders R 49-09," Washington, D C (2009); American Association of State Highway and Transportation Officials, (AASHTO), "Performance-Graded Asphalt Binder," M 320-10, Washington, D C (2011); and American Association of State Highway and Transportation Officials, (AASHTO), "Standard Practice for Grading or Verifying the Performance Grade of an Asphalt Binder," R 29-08, Washington, DC (2011), all of which are hereby incorporated by reference in their entirety. The overall experimental testing plan is shown in Table 2.

TABLE 2

Experimental Testing Plan for Vacuum Tower Bottoms

| | RTFO | BBR | | |
|---|---|---|---|---|
| Name of Additive | DSR | 0° C. | −6° C. | −12° C. |
| None | XXX | XXX | XXX | XXX |
| 3% HBL | XXX | XXX | XXX | XXX |
| 1.5% HBL + 1.5% PHBL | XXX | XXX | XXX | XXX |
| 3% PHBL | XXX | XXX | XXX | XXX |
| 1.5% PHBL | XXX | XXX | XXX | XXX |
| 1.5% HBL | XXX | XXX | XXX | XXX |
| 3% HBL + 3% PHBL | XXX | XXX | XXX | XXX |
| 1% PHBL | XXX | XXX | XXX | XXX |
| 1% HBL | XXX | XXX | XXX | XXX |
| 1% HBL + 1% PHBL | XXX | XXX | XXX | XXX |
| 1% HBL + 0.5% PHBL | XXX | XXX | XXX | XXX |
| 0.5% HBL + 1% PHBL | XXX | XXX | XXX | XXX |
| 2% HBL + 1% PHBL | XXX | XXX | XXX | XXX |
| 1% HBL + 2% PHBL | XXX | XXX | XXX | XXX |
| 4% HBL + 4% PHBL | XXX | XXX | XXX | XXX |
| 5% HBL + 5% PHBL | XXX | XXX | XXX | XXX |
| 2% HBL + 6% PHBL | XXX | XXX | XXX | XXX |
| 6% HBL + 2% PHBL | XXX | XXX | XXX | XXX |

*Note:
X symbolizes 1 test specimen

Example 3—Statistical Transformations of Data and Multiple Regression Modeling

In order to ensure a full factorial experiment did not need to be carried out when rejuvenating VTBs, multiple regression models were developed to predict the final performance grade at both high and low temperatures.

To conduct a thorough statistical analysis towards the end goal of creating a reliable multiple regression model for predicting the high and low temperature performance grade of VTB blended with two BDMs, the data was examined in its unmodified state as well as transformed. The data was evaluated in its unmodified state, logarithm base 10 transformed state, and root square transformed state. The transformations were examined by comparing the calculated coefficient of determination and the adjusted coefficient of determinations for the finished multiple regression models for each set of transformed data. This was done for both high temperature performance grade DSR data as well as done for the low temperature performance grade BBR data. One model was selected for the prediction of the high temperature performance grade and another was chosen for the prediction of the low temperature performance grade.

Multiple Regression Modeling—To create a final multiple regression model, step-down regression was used. The first step in this process was to create a full model as shown in equation 2. The factors X1, X2, and X3 are known as HBL percentage, PHBL percentage, and temperature (Celsius), respectively. The coefficient α is the intercept of the predicted expression while $\beta_1$ through $\beta_{14}$ are coefficients determined through line fitting. The values of α, $\beta_1 \ldots \beta_{14}$ make the residual sum of squares and the resulting equation is known as the least-squares fit. After the full model was created, one by one the variable with the highest p-value or least significance was eliminated from the model until the model was only left with variables that are statistically significant in terms of 95% confidence. This created a partial model which was used as the final model for prediction of the high temperature grade or for the prediction of the low temperature grade of VTB blended with two BDMs at various dosage rates.

$$Y = \alpha + \beta_1 \times X1 + \beta_2 \times X2 + \beta_3 \times X3 + \beta_4 \times X1 \times X2 + \beta_5 \times X1 \times X3 + \beta_6 \times X2 \times X3 + \beta_7 \times X1 \times X2 \times X3 + \beta_8 \times X1^2 + \beta_9 \times X2^2 + \beta_{10} \times X3^2 + \beta_{11} \times X1^2 \times X2^2 + \beta_{12} \times X1^2 \times X3^2 + \beta_{13} \times X2^2 \times X3^2 + \beta_{14} \times X1^2 \times X2^2 \times X3^2 + \varepsilon \quad (2)$$

For the high temperature grade the limiting criteria of 2.2 kPa for $G^*/\sin(\delta)$ was used. If a combination with various dosage rates of HBL and PHBL in VTB passed the limiting criteria at 64° C., but failed at 70° C., the high temperature grade was 64. If a combination passed at 70° C., but failed at 76° C. then a high temperature grade of 70 was achieved. The limiting criteria for determining the low temperature grade was the minimum value of 0.30 for the m-value and the maximum value of 300 MPa for stiffness. If a combination with various dosage rates of HBL and PHBL in VTB passed at -22° C., but failed at -28° C., the m-value must be at least equal to 0.30 at -22° C. with the stiffness value being less than 300 MPa. If this situation were to occur this binder would have a low temperature performance grade of -22° C. The use of this model should only be employed within the temperatures tested.

Example 4—Dynamic Shear Rheometer Methods

To assess the viability of using a modified VTB instead of a neat asphalt binder a full investigation of binder properties was done based on Superpave binder design standards. The standards were used to optimize the dosage of LO combination materials for improved VTB performance. The findings of this invention and the statistical analysis of the results are shown in the following examples. The relationship between the invention's findings and sustainability are also discussed in the context of a broader literature review.

The dynamic shear rheometer (DSR) is used for characterizing the viscous and elastic behavior of asphalt binders between intermediate to high temperatures. DSR tests are conducted on unaged (original), RTFO aged, and PAV aged asphalt binder samples. Asphalt binders are viscoelastic which means they act as both an elastic solid (recoverable deformation) and a viscous liquid (non-recoverable deformation) due to loading and unloading. The DSR measures a specimen's complex shear modulus ($G^*$) and phase angle (δ). The complex shear modulus ($G^*$) is a sample's total resistance to deformation, and the phase angle (δ) is the lag between the applied shear stress and the resulting shear strain. Therefore, when the phase angle is closer to 90 degrees the material is more viscous, while when the phase angle is closer to 0 degrees the material is more elastic. The parameters $G^*$ and δ are used to predict whether the asphalt mix will experience rutting and/or fatigue cracking. For unaged (original) and short-term aged binder, rutting is the main concern; while for long-term aged binder, fatigue cracking is the main concern.

Example 5—Dynamic Shear Rheometer Analysis of Results, and Discussion

Short-Term Aged Dynamic Shear Rheometer Results—FIG. 1 shows the average critical high temperature of three tested RTFO DSR specimens for each of the eighteen groups. From the figure, the VTB control group has a critical high temperature between 80° C. and 81° C. This implies the high temperature performance grade (PG) for the control group is 76. There appears to be slight differences between the effect of HBL and PHBL with increasing dosage rate on the VTB. When the two materials are added in combination at lower dosages the effects are much smaller on the critical high temperature. Once higher dosage combinations are used, the effect is much larger on the VTB. From the figure, it is apparent that if a stable drop in critical high temperature is wanted, then both materials need to be used for modification of the VTB at dosages between 2% and 6%. This is shown from the results of the five groups with 2%, 3%, 4%, 5%, 6% HBL and 6%, 3%. 4%, 5%, 2% PHBL whose high temperature PGs range from 64 to 70° C. Further testing was required to verify this trend at the low temperature performance grade.

Example 6—High Temperature Performance Grade Prediction Model

Figure 2:
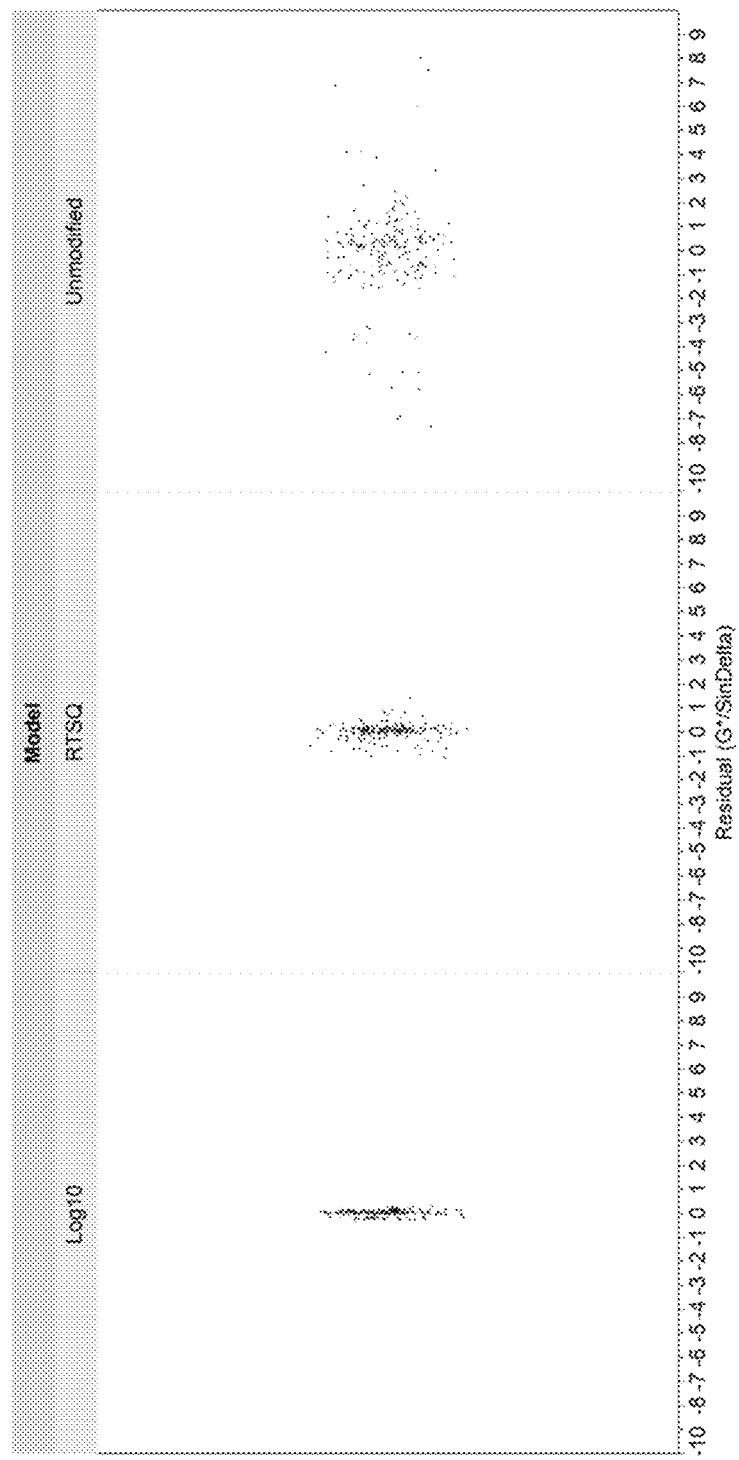
FIG. 2 shows high temperature residual comparison of the three final models.

To create the final multiple regression model, for use in predicting the optimum dosage rates of HBL and PHBL for rejuvenating VTB at high temperatures, a full statistical analysis using an ANOVA table was done. Three ANOVA models were created and analyzed. Data transformation was done to see which model had the highest adjusted coefficient of determination, $R^2_{Adjusted}$. Two transformations (log 10, RTSQ) and a control set (unmodified) were analyzed. To evaluate which model is best, the adjusted coefficient of determination for each of three models were compared in Table 3. The adjusted coefficient of determination for each set of data or model name is from the finalized form of that model. The finalized form of each model is created through step-down regression as discussed earlier. Before a model can be chosen for future use the residuals from each model must be examined to see the spread and how close they are to zero. This is shown in FIG. 2. From FIG. 2, it is observed that the Log 10 transformed data model gives the best fit for the predicted results when compared to the actual results.

TABLE 3

RTFO DSR model Coefficient of Determinations

| Model Name | $R^2$ | $R^2_{Adjusted}$ |
|---|---|---|
| Unmodified | 0.83818 | 0.833536 |
| Log 10 | 0.92779 | 0.926419 |
| RTSQ | 0.90327 | 0.900489 |

Figure 3:
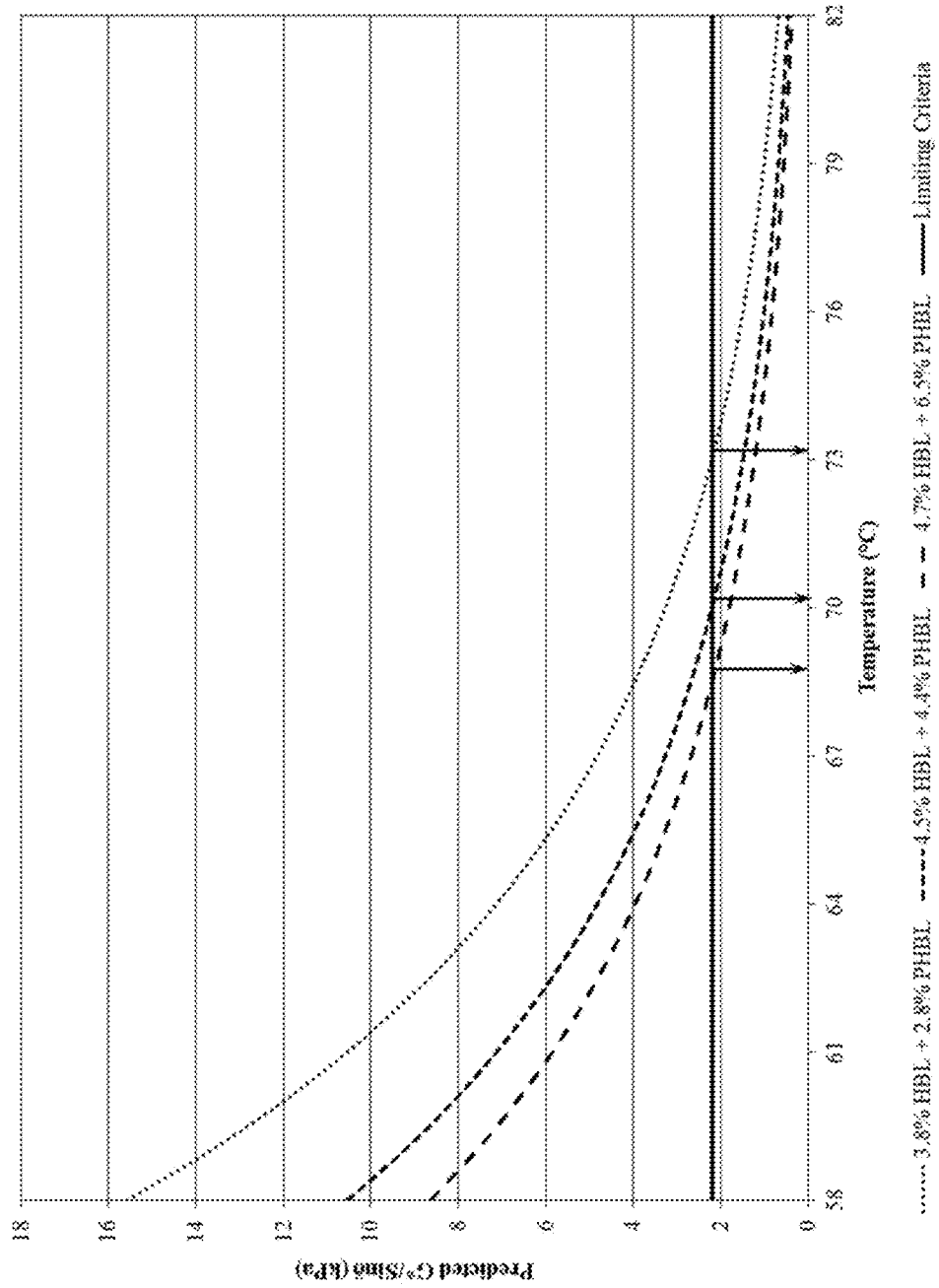
FIG. 3 shows example cases of predicted $G^*/\text{Sin}(\delta)$ using a best fit model.

From the comparison of final model residuals in FIG. 3 and the results shown in Table 4, it was concluded that the finalized multiple linear regression model using the log 10 transformed RTFO DSR data will be used for further analysis. The ANOVA results for the second model—log 10 transformed RTFO DSR data are shown in Table 4. Using the ANOVA statistical analysis of the finalized log 10 transformed RTFO DSR data model, the coefficients and their values were generated for the prediction equation, equation 3. These values are shown in Table 5.

TABLE 4

ANOVA of Log 10 modified RTFO DSR data model

| | Source | SS | MS Number | DF Number | F Ratio | Prob > F |
|---|---|---|---|---|---|---|
| Log 10 Data | Temperature (Celsius) - X3 | 31.078385 | 31.07838 | 1 | 2273.7 | <0.0001 |
| | X1 ^ 2 | 0.089726 | 0.08973 | 1 | 6.5645 | 0.0111 |
| | X1 * X2 | 1.319528 | 1.31953 | 1 | 96.538 | <0.0001 |
| | X1 ^ 2 * X2 ^ 2 | 0.191837 | 0.19184 | 1 | 14.035 | 0.0002 |

TABLE 5

Coefficients of Predicted RTFO DSR Expression

| Coefficients | Value |
|---|---|
| A | 4.77185094 |
| $\beta_3$ | −0.0565452 |
| $\beta_8$ | 0.00336935 |
| $\beta_4$ | −0.0392252 |
| $\beta_{11}$ | 0.00060913 |

$$\text{Predicted}(G^*/\text{Sin}\,\delta) = 10^{(\alpha + \beta_3 \times X3 + \beta_8 \times X1^2 + \beta_4 \times X1 \times X2 + \beta_{22} \times X1^2 \times X2^2)} \quad (3)$$

Using the values shown in Table 5 in combination with equation 3, the critical high temperature (X3) can be determined for various dosage levels of HBL (X1) and PHBL (X2). This is done by setting equation (3) equal to 2.2 kPa, which is the critical limit for rutting of asphalt binder. Three examples are show in Table 6 and FIG. 3. To achieve a critical high temperature performance grade (PG) of 70° C., Example 1, in Table 6, could be used where X1 and X2 are equal to 3.8% HBL and 2.8% PHBL, respectively. This is because the critical high temperature, X3 is 73° C. Even though Example 2 in Table 6 (X1 and X2 are equal to 4.5% HBL and 4.4% PHBL) meets the specification at 70° C., this case would be considered a high PG 64 due to reliability of results. Example 3 in Table 6 (X1 and X2 are equal to 4.7% HBL and 6.5% PHBL) has critical high temperature of 68.5° C. and, therefore, meets the requirement of a PG 64. From the analysis using the prediction equation, it was found that there must be HBL and PHBL materials blended with the VTB to reduce stiffness enough to achieve a PG 64 or a PG 70 high temperature grade.

TABLE 6

Predicted G*/SinDelta at Different Dosage Levels and Temperatures

| Example | X1 (% HBL) | X2 (% PHBL) | X3 (Temperature, ° C.) | Predicted G*/sin(δ), kPa |
|---|---|---|---|---|
| 1 | 3.8 | 2.8 | 73.0 | 2.20 |
| 2 | 4.5 | 4.4 | 70.0 | 2.20 |
| 3 | 4.7 | 6.5 | 68.5 | 2.20 |

Example 7—Bending Beam Rheometer Results

The Bending Beam Rheometer (BBR) test is used for measuring low temperature properties of long-term aged asphalt binder such as stiffness and relaxation. Stiffness and relaxation measurements are indicators of an asphalt binder's ability to resist low temperature cracking. The BBR is used to determine an asphalt binder's low temperature performance grade. Stiffness is calculated based on measured deflection and the standard beam dimensions used.

The m-value is a measure of how the asphalt binder relaxes the load induced stresses at 60 seconds of loading time.

Figure 4:
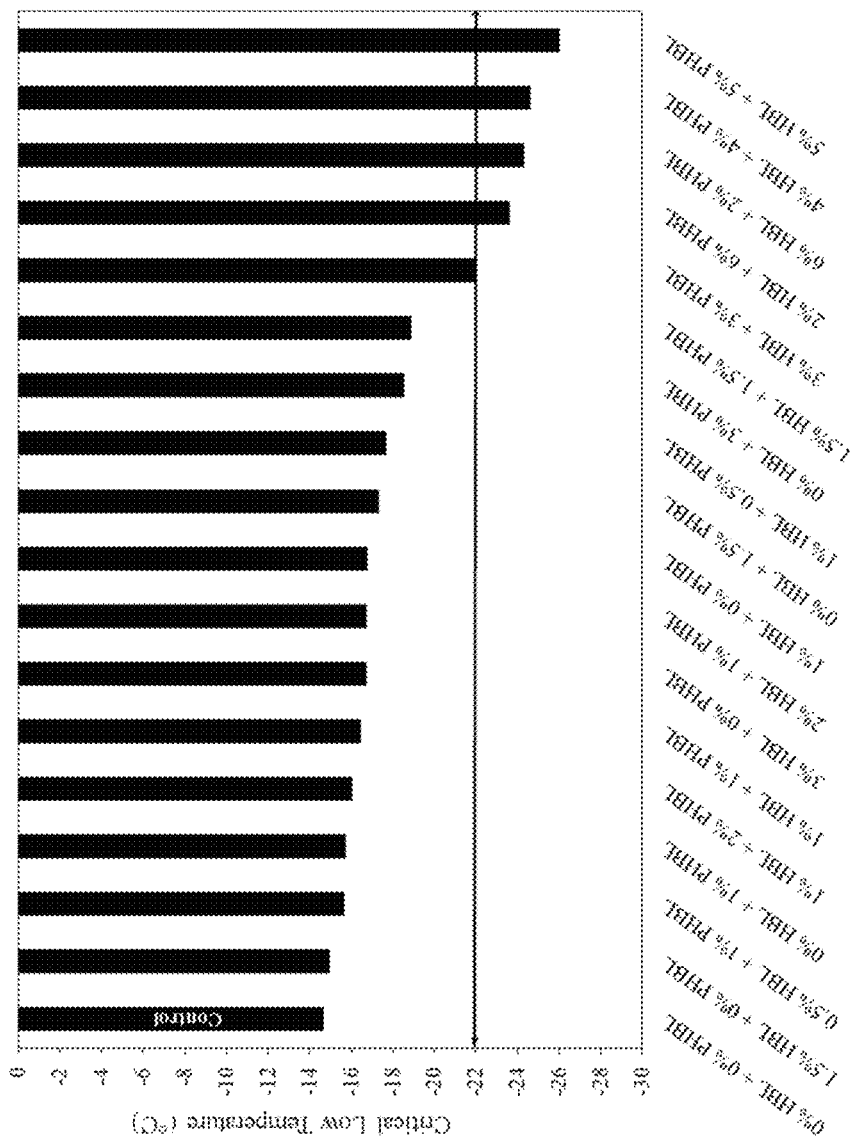
FIG. 4 shows critical low temperatures for all tested BDM combinations.
Figure 6:
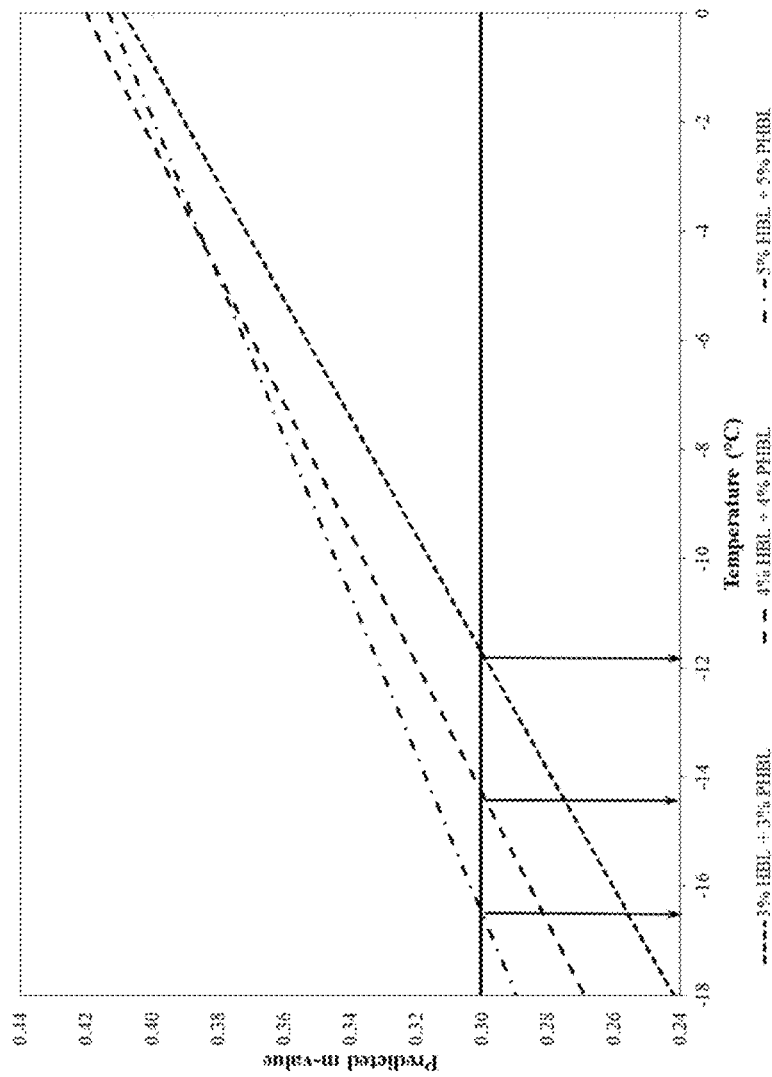
FIG. 6 shows example cases of predicted m-value using a best fit model.

The average critical low temperature determined using three beams each at three temperatures for each of the eighteen groups is shown in FIG. 4. The VTB control group has a critical low temperature between −14° C. and −15° C., low temperature performance grade (PG) for the control group is −10° C. There are slight differences between the performance of VTB when modified with smaller amounts of HBL and PHBL individually. Similar to what was observed in the high temperature test, when the two BDMs are added in combination at lower dosages the effects are greater on VTB performance than when each BDM is added on its own to VTB. Increased dosage combinations show large improvements to VTB low temperature performance. The data in FIG. 4 indicates if a stable jump in critical low temperature is preferred then both materials need to be used for modification of the VTB at dosages between 2% and 6%. This is shown by the results in FIG. 6 of the three groups with 3%, 4%, 5% HBL and 3%, 4%, 5% PHBL whose critical low temperatures range from −22° C. to −26° C.

Example 8—Low Temperature Performance Grade Prediction Model

Figure 5:
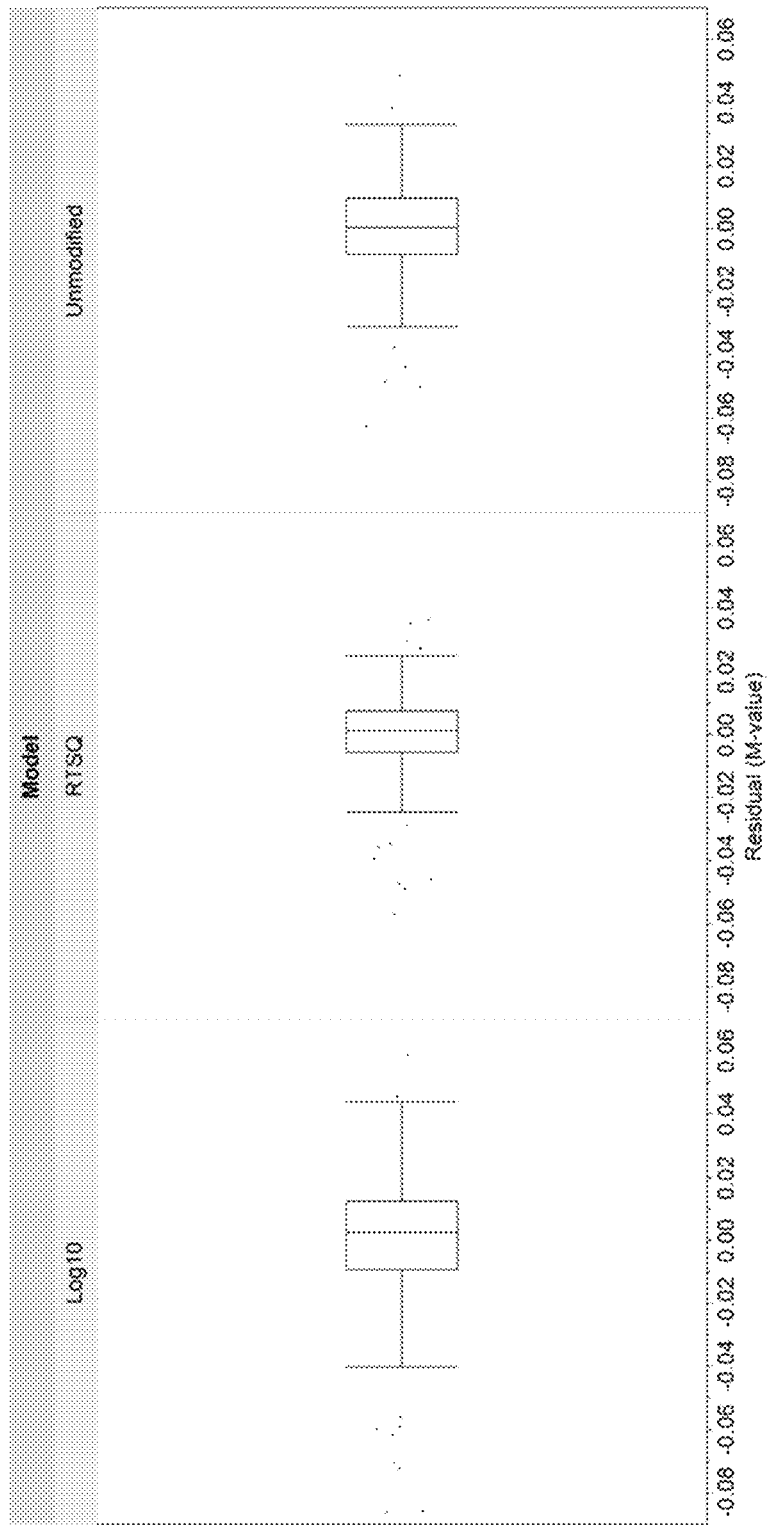
FIG. 5 depicts a low temperature residual comparison of three final models.

A multiple regression model was created for use in predicting the optimum dosage rates of HBL and PHBL for rejuvenating VTB at low temperature. Similar to the high temperature model development, a full statistical analysis using an ANOVA table was performed. Two transformations (log 10, RTSQ) and the non-transformed data set (Unmodified) were used in model development. The adjusted coefficients of determination are shown in Table 7. The finalized form of each model was created through the aforementioned step-down regression process. To choose a model for future use, the residuals for each finalized model must be examined to see the spread and how close they fall within the 95% confidence interval. This is shown in FIG. 5. From FIG. 5, it is observed that the unmodified data model has the least number of outliers outside the boxplot created with a spread of 95% confidence. Therefore, the unmodified data model provides the best fit for the predicted results when compared to the actual results.

TABLE 7

| BBR model Coefficient of Determinations | | |
|---|---|---|
| Model Name | $R^2$ | $R^2_{Adjusted}$ |
| Unmodified | 0.91686 | 0.912484 |
| Log 10 | 0.90497 | 0.901263 |
| RTSQ | 0.90984 | 0.906326 |

From the comparison of the final model residual boxplots in FIG. 5 and the $R^2_{Adjusted}$ values in Table 7, it was concluded that the finalized multiple linear regression model using the non-transformed BBR data will be used for further analysis. The ANOVA results for the selected model are shown in Table 8. Using the ANOVA statistical analysis of the finalized unmodified BBR data model the coefficients and their values were generated for the prediction equation, equation (4), infra. These values are shown in Table 9.

TABLE 8

| ANOVA of Unmodified BBR data model | | | | | | |
|---|---|---|---|---|---|---|
| | Source | SS | MS Number | DF Number | F Ratio | Prob > F |
| Unmodified Data | Dosage Rate HBL (%) - X1 | 0.00264824 | 0.0026482 | 1 | 9.9658 | 0.0019 |
| | Dosage Rate PHBL (%) - X2 | 0.02074087 | 0.0207409 | 1 | 78.052 | <0.0001 |
| | Temperature (Celsius) - X3 | 0.05315896 | 0.053159 | 1 | 200.05 | <0.0001 |
| | X1 ^ 2 | 0.00134383 | 0.0013438 | 1 | 5.0571 | 0.026 |
| | X1 * X3 | 0.00217473 | 0.0021747 | 1 | 8.1839 | 0.0048 |
| | X2 * X3 | 0.00109399 | 0.001094 | 1 | 4.1169 | 0.0442 |
| | X1 * X2 * X3 | 0.00254656 | 0.0025466 | 1 | 9.5831 | 0.0023 |
| | X1 ^ 2 * X2 ^ 2 | 0.00551461 | 0.0055146 | 1 | 20.752 | <0.0001 |

TABLE 9

| Coefficients of Predicted BBR Expression | |
|---|---|
| Coefficients | Value |
| A | 0.34042806 |
| $\beta_1$ | 0.00848827 |
| $\beta_2$ | 0.01420353 |
| $\beta_3$ | 0.00794801 |
| $\beta_8$ | 0.00095999 |
| $\beta_5$ | 0.00083395 |
| $\beta_6$ | 0.00059149 |
| $\beta_7$ | -0.0003285 |
| $\beta_{11}$ | -0.0001034 |

$$\text{Predicted } m\text{-value} = \alpha + \beta_1 \times X1 + \beta_2 \times X2 + \beta_3 \times X3 + \beta_8 \times X1^2 + \beta_5 \times X1 \times X3 + \beta_6 \times X2 \times X3 + \beta_7 \times X1 \times X2 \times X3 + \beta_{11} \times X1^2 \times X2^2 \quad (4)$$

Using the values shown in Table 9 in combination with equation 3, critical low temperature (X3) can be determined for various dosage levels of HBL (X1) and PHBL (X2). This is done by setting X1 and X2 as constant in equation (4). The critical limit for low temperature is an m-value equal to 0.30. By making X1 and X2 constant, changes in the m-value can be observed for various dosage level combinations with decreasing temperature. Three examples are shown in Table 10 and FIG. 6. Due to X1 and X2 being held constant for all three examples, the critical low temperature (−10° C.+X3) where the predicted m-value is equal to 0.30 can be determined for each example. The critical low temperatures for Examples 1, 2, and 3 in Table 10 are approximately −21.9° C., −24.4° C., and −26.6° C. based upon the predicted results shown in FIG. 4.

TABLE 10

| Predicted m-value at Different Dosage Levels | | | | |
|---|---|---|---|---|
| Example | X1 (% HBL) | X2 (% PHBL) | X3 (Temperature, ° C.) | Predicted m-value |
| 1 | 3.00 | 3.00 | −12 | 0.30 |
| 2 | 4.00 | 4.00 | −12 | 0.32 |
| 3 | 5.00 | 5.00 | −12 | 0.33 |

Figure 7:
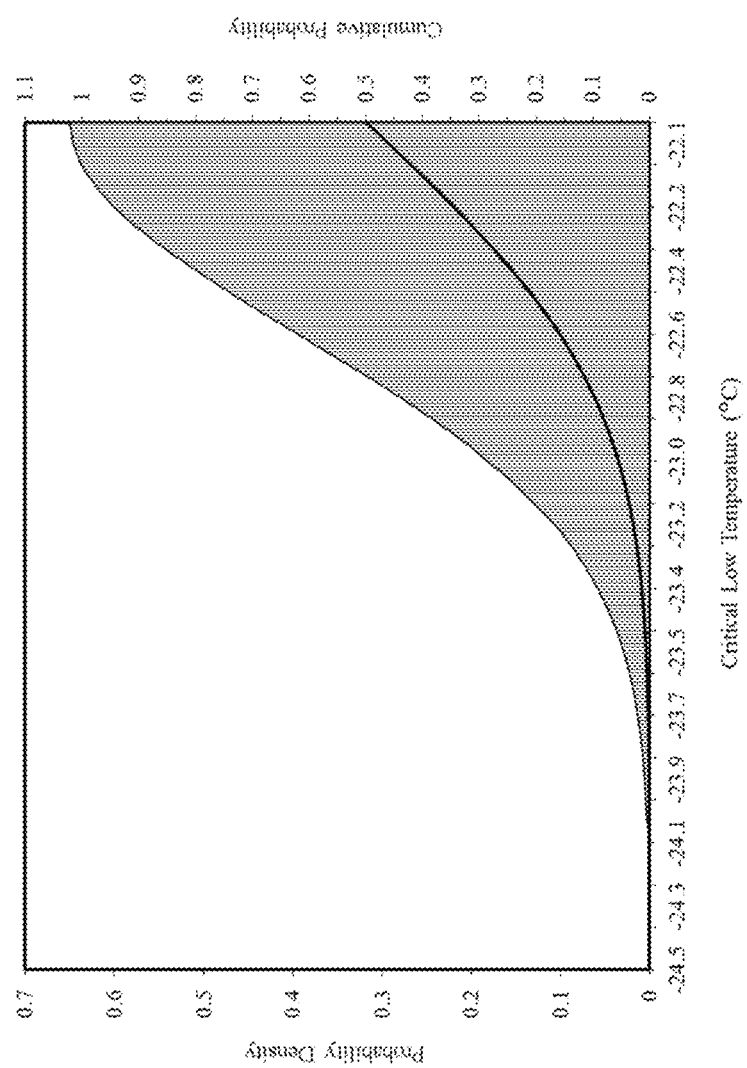
FIG. 7 depicts a half-gaussian Normal Distribution around −22° C.

Assuming there is a normal distribution around −22° C., the measured results from testing provide a standard deviation of 0.614° C. A half-Gaussian Normal Distribution plot was created using these results as shown in FIG. 7. From the distribution curve, a critical low temperature performance grade (PG) of −22 with 50% reliability, vacuum tower bottoms need to have a dosage levels approximately equal to 3% HBL and 3% PHBL. To achieve a critical low temperature PG of −22 with at least 95% reliability, the critical low temperature must be less than or equal to −23.3° C. For 99% reliability, the critical low temperature must be less than or equal to −23.8° C. Therefore, Examples 2 and 3 in Table 10 have dosage levels of HBL and PHBL that make it possible for VTB to achieve a critical low temperature performance grade (PG) of −22 with at least 99% reliability.

Example 9—Optimum Dosage Levels

Figure 8:
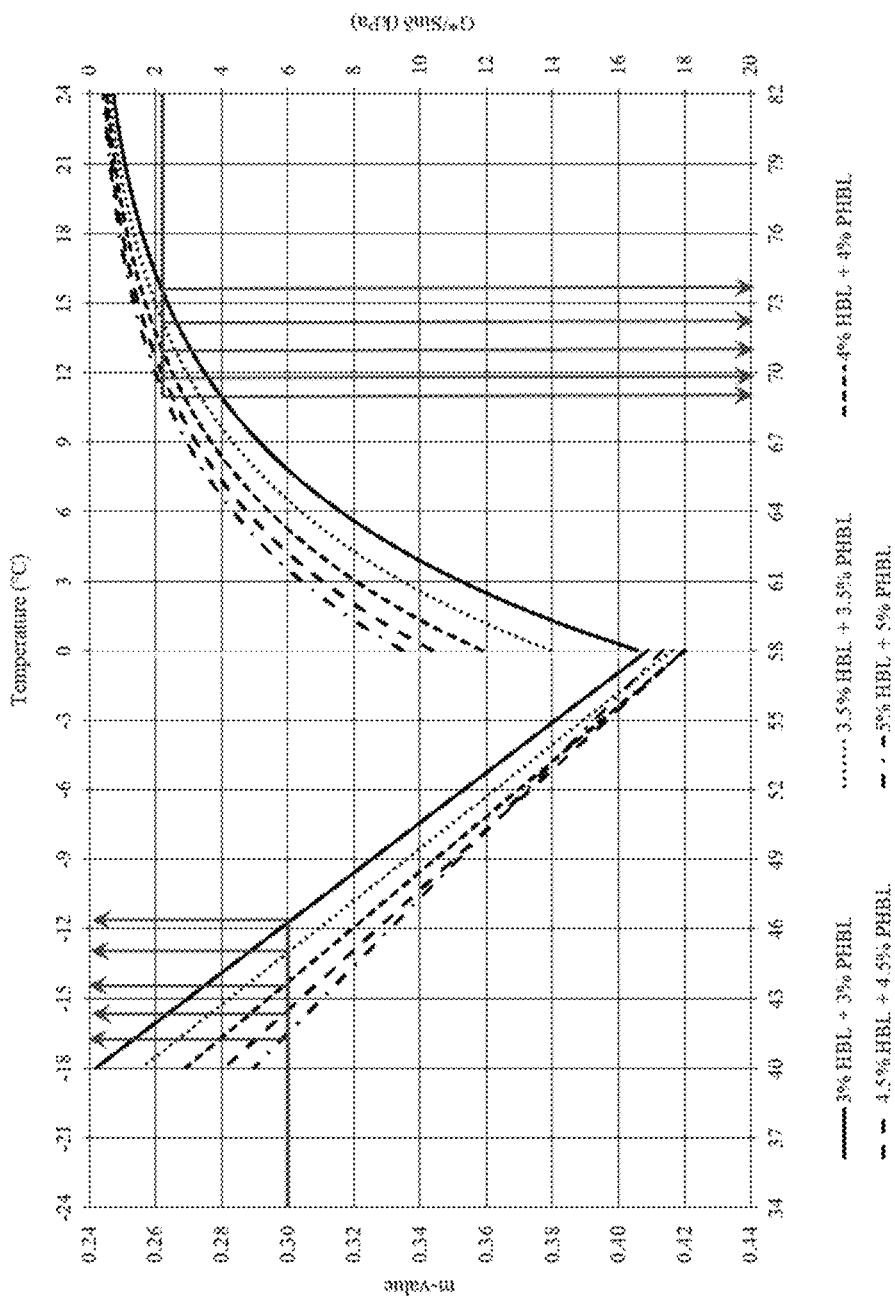
FIG. 8 illustrates a determination of optimum dosage levels for various performance grades (PG).
Figure 10:
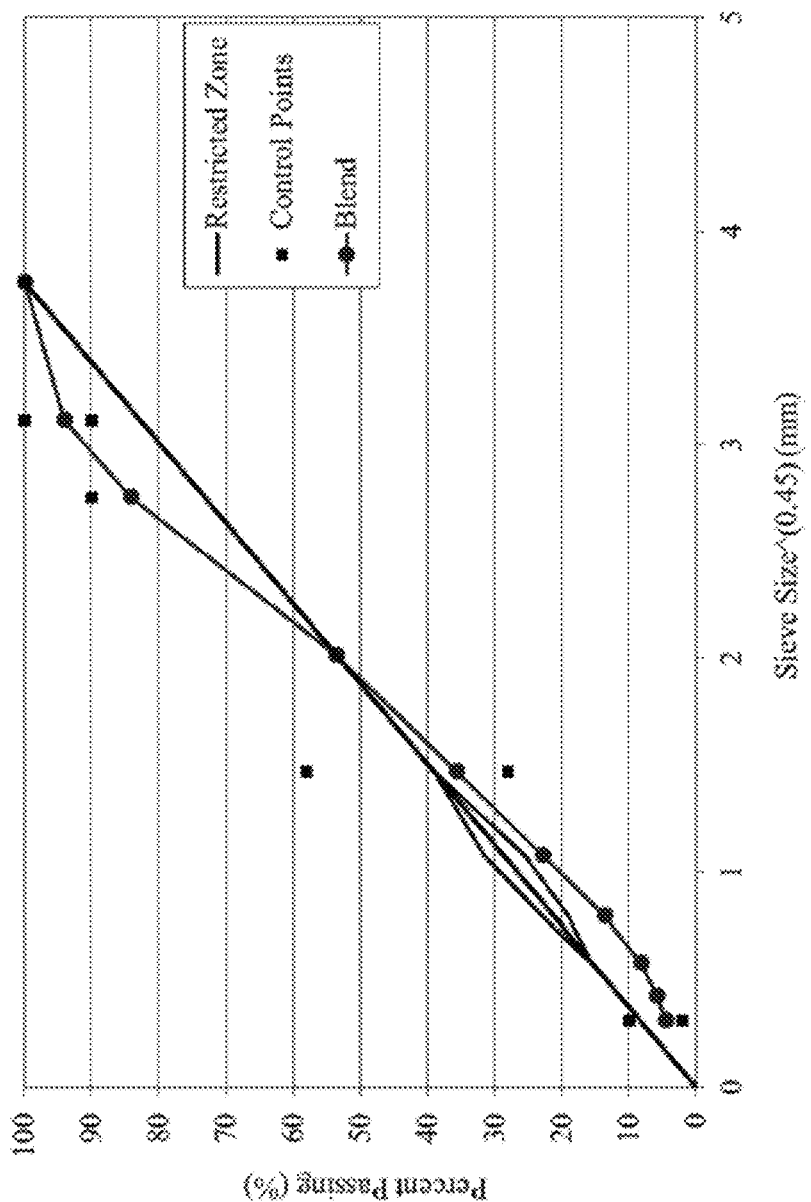
FIG. 10 shows mix design gradation for tested combinations.
Figures 11A, 11B:
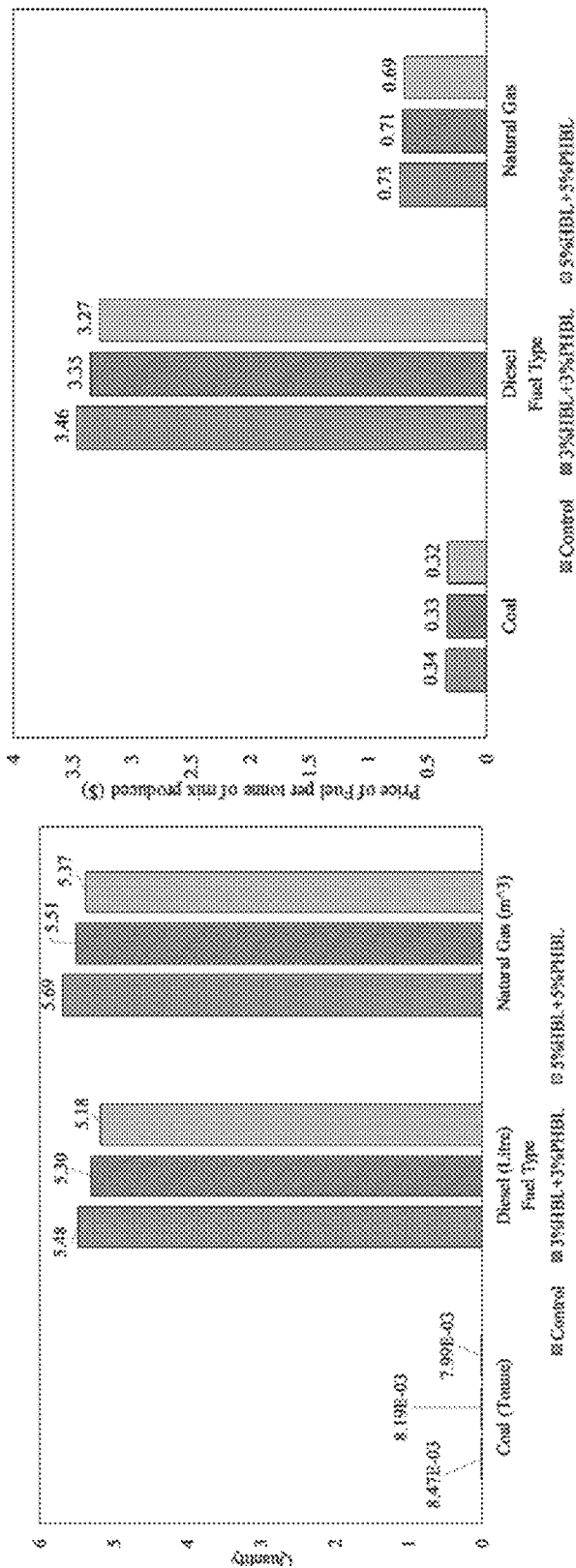
FIGS. 11A-11B show fuel quantities used (FIG. 11A) and prices to produce 1 tonne of mix (FIG. 11B).
Figures 12A, 12B:
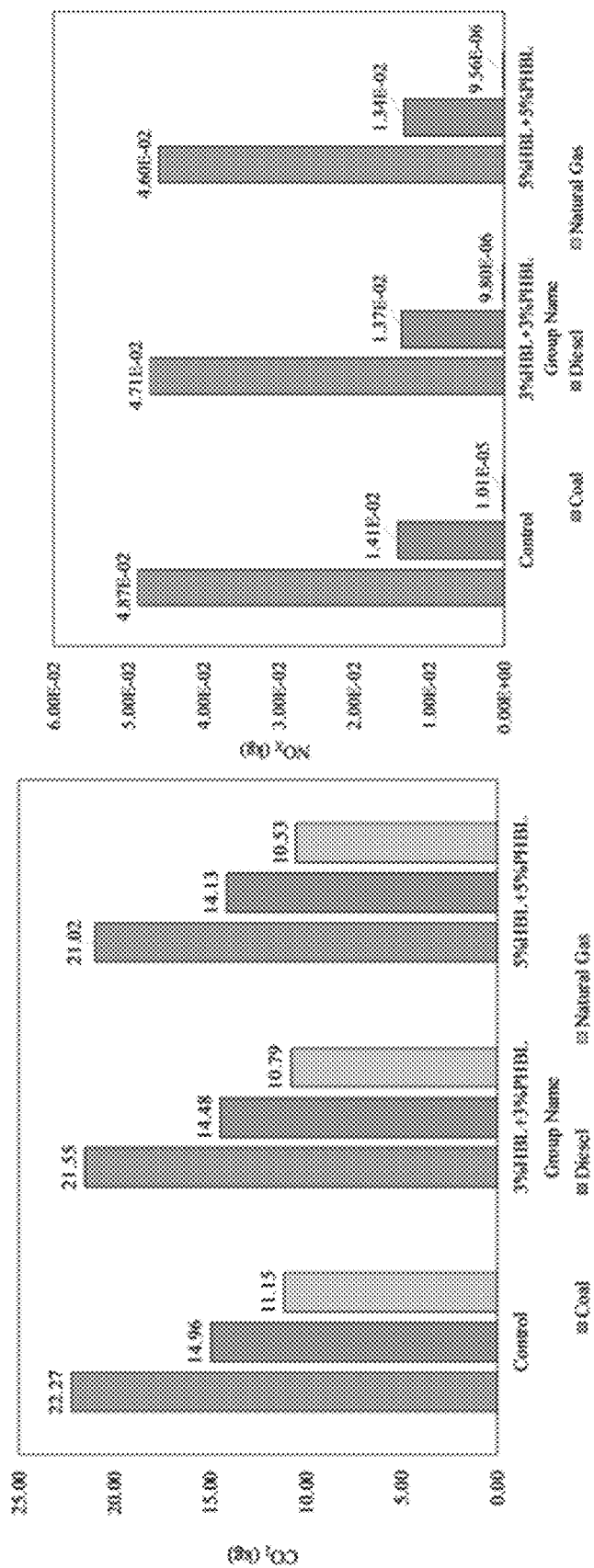
FIGS. 12A-12D depict emissions from production of 1 tonne of mix $CO_2$ (FIG. 12A), $NO_x$ (FIG. 12B), $So_x$ (FIG. 12C), and CO (FIG. 12D).
Figures 12C, 12D:
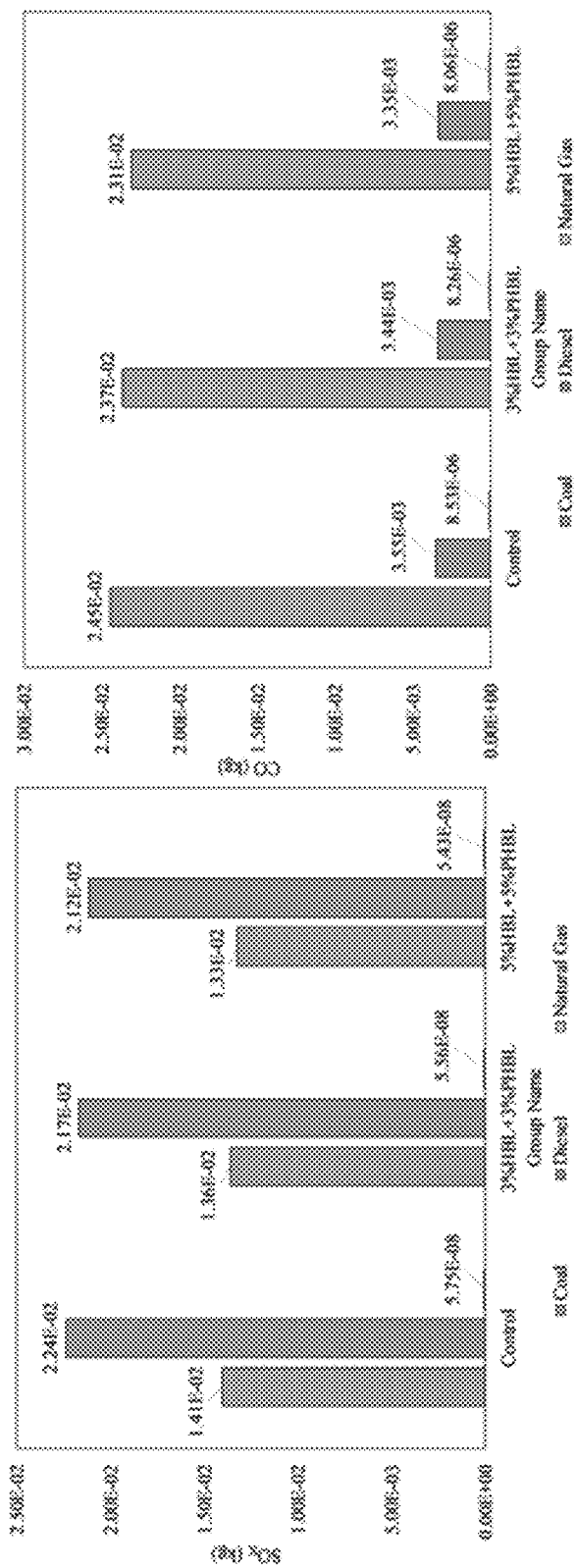

To determine the optimum dosage levels needed to achieve certain PG grades, both models need to be used in combination. This process is shown in FIG. 8. In FIG. 8, five cases are shown for dosage levels ranging from 3% HBL+3% PHBL to 5% HBL+5% PHBL in 0.5% intervals for both HBL and PHBL. To determine both the m-values at low temperature and G*/Sin δ values at high temperature equations (3) and (4) were used. Estimation of the critical temperatures was done by setting equation (3) equal to 2.2 kPa, and setting equation (4) equal to 0.30. The results of these five case estimations are tabulated in Table 11. From these results, it was found that the optimum dosage level needed to achieve a PG 70-22 binder was 3.5% HBL+3.5% PHBL. This combination gave estimated critical high and low temperatures of 72.2° C. and −23° C. To achieve a PG 64-22 binder the optimum dosage level needed is 4.5% HBL+4.5% PHBL. The estimated critical high and low temperature for this dosage combination is 69.9° C. and −26.1° C., respectively.

created as shown in FIG. 10 with an optimum binder content of 5.2% and mix density of 2.37 g/cm³. The makeup of this mix gradation was 72% limestone, 15% quartzite, and 13% sand. In addition, three commonly used asphalt mix plant fuel types (coal, diesel, and natural gas) were used for the cost-benefit analysis. The prices for these fuels are as follows: coal ($40.20/tonne), diesel ($0.63/litre), and natural gas ($0.13/m3) (Conti et al., "Annual Energy Outlook 2012 with Projections to 2035. United States of America Department of Energy," Office of Integrated and International Energy Analysis. (2012), which is hereby incorporated by reference in its entirety).

TABLE 11

Optimum Dosage Levels and their Predicted PGs

| Example | % HBL | % PHBL | Low Temperature (° C.) | m-value | High Temperature (° C.) | G*/Sinδ (kPa) | Predicted High/Low Temperatures (° C.) | Predicted PG |
|---|---|---|---|---|---|---|---|---|
| 1 | 3.00 | 3.00 | −11.9 | 0.3 | 73.5 | 2.2 | 73.5, −21.9 | 70-16 |
| 2 | 3.50 | 3.50 | −13 | 0.3 | 72.2 | 2.2 | 72.2, −23 | 70-22 |
| 3 | 4.00 | 4.00 | −14.9 | 0.3 | 70.9 | 2.2 | 70.9, −24.9 | 70-22 |
| 4 | 4.50 | 4.50 | −16.1 | 0.3 | 69.9 | 2.2 | 69.9, −26.1 | 64-22 |
| 5 | 5.00 | 5.00 | −17.2 | 0.3 | 69.2 | 2.2 | 69.2, −27.2 | 64-22 |

Example 10—Energy and Green House Gas (GHG) Emissions

Figure 9:
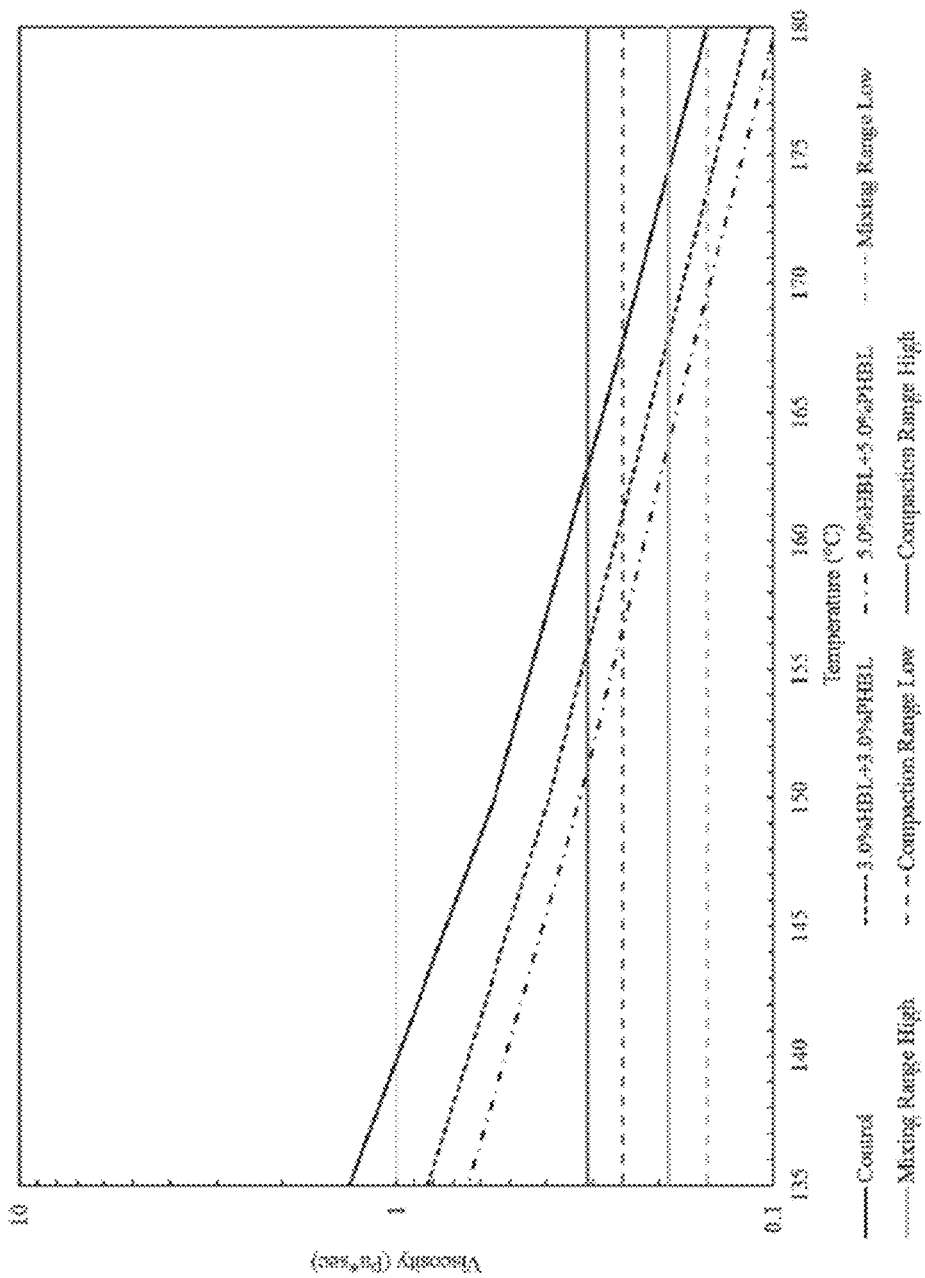
FIG. 9 shows mixing and compaction temperature range examples for tested combinations.

It is shown that HBL and PHBL in combination make the performance grade of VTB softer through both modeling and experimental results in Examples 4-9 supra. Additionally, it is shown in the rotational viscosity results in FIG. 9 that a reduction in mixing and compaction temperature ranges take place with increasing dosage combinations of HBL and PHBL. The rotational viscometer tests were performed at 20 rpm at four temperatures ranging between 120° C. and 180° C. The rotational viscometer is used for measuring pumpability of the binder and can be used to find the temperature ranges for mixing and compaction. The mixing and compaction ranges are located where viscosity readings measure 0.17±0.02 Pa*s and 0.28±0.03 Pa*s, respectively (Asphalt Institute, "Performance Graded Asphalt Binder Specification and Testing Superpave Series No. 1 (SP-1)," Lexington, KY. (2003), which is hereby incorporated by reference in its entirety). From these results, it is suggested that the mixing and compaction temperatures are reduced from 174° C. to 168° C., and 163° C. and from 163° C. to 156° C., and 151° C. when HBL and PHBL are used in combination at 3%+3% and 5%+5% for modification of VTB. According to Zapata, P. & Gambatese, J. A., "Energy Consumption of Asphalt and Reinforced Concrete Pavement Materials and Construction," J. Infrastruct. Syst. 11:9-20 (2005), which is hereby incorporated by reference in its entirety), 48% of energy consumption occurs during the drying and mixing of aggregates with asphalt binder, while 40% energy is consumed during the production of asphalt binder in petroleum refineries. Thus, the other 12% energy is consumed during the transport and laydown of asphalt concrete.

To estimate the effect of HBL and PHBL modification on VTB for use in the production of hot mix asphalt (HMA) a cost-benefit analysis was done to assess the impact to energy consumed during drying and mixing of aggregates with asphalt binder. To this effect a theoretical mix design was To evaluate the energy consumed during the mixing and drying process, five areas were examined: (1) energy required for heating aggregates—$E_{ha}$, (2) energy required for heating water—$E_{hw}$, (3) energy required for vaporizing water—$E_{vw}$, (4) energy required to heat steam—$E_{hs}$, and (5) energy required for heating asphalt binder—$E_{hb}$, based on past and current literature (Almeida-Costa et al., "Economic and Environmental Impact Study of Warm Mix Asphalt Compared to Hot Mix Asphalt," J. Clean. Prod. 112:2308-2317. Part 4. (2016); Romier et al., "Low-Energy Asphalt With Performance of Hot-Mix Asphalt," Transp. Res. Rec. J. Transp. Res. Board 101-112 (2006), which are hereby incorporated by reference in their entirety). Other researchers such as Hamzah et al., "Evaluation of the Potential of Sasobit® to Reduce Required Heat Energy and CO2 Emission in the Asphalt Industry," J. Clean. Prod. 18:1859-1865 (2010) and Jamshidi et al., "Selection of Reclaimed Asphalt Pavement Sources and Contents for Asphalt Mix Production Based on Asphalt Binder Rheological Properties, Fuel Requirements and Greenhouse Gas Emissions," J. Clean. Prod. 23:20-27 (2012), both of which are hereby incorporated by reference in their entirety) assumed that the aggregates were dry and had no excess moisture to begin with and thus areas 2, 3, and 4 were not considered in energy calculations. However, it has been shown historically that moisture content of aggregates plays a big role in production costs at asphalt mix plants. Just to start the removal process of moisture from aggregates means that the aggregates must be at least heated over 100° C., the boiling point of water, and to reach 160° C., 10 L of fuel is required for the removal of 5% moisture from 1 tonne of aggregates (Gillespie, I., "Quantifying the Energy Used in an Asphalt Coating Plant. Department of Mechanical and Aerospace Engineering," University of Strathclyde, United Kingdom (2012), which is hereby incorporated by reference in its entirety).

The following Equation (5 through 9) were used to determine the energy consumed during the five energy consumption areas:

$$E_{ha} = Q_a \times m_a \times (t_a - t_{amb}) \qquad (5)$$

$$E_{hw} = Q_w \times (h/100) \times m_a \times (373.2 - t_{amb}) \qquad (6)$$

$$E_{vw} = L \times (h/100) \times m_a \quad (7)$$

$$E_{hs} = Q_s \times (h/100) \times m_a \times (t_a - 373.2) \quad (8)$$

$$E_{hb} = Q_b \times m_b \times (t_b - t_{amb}) \quad (9)$$

Where all $E_x$ values are in Joules (J), Q is specific heat of a—aggregates, w—water, s—steam, and b—binder (J/kg$^{-1}$ K$^{-1}$), $m_a$ is mass of aggregates (kg), t is the heating temperature (K) for a—aggregates and b—binder, and $t_{amb}$ is the ambient temperature (K), L is the latent heat of water vaporizing (J/kg), and h is the moisture content of the aggregates (%). The ambient temperature is assumed to be 293.2 K (20° C.), the average temperature during the summer in the Midwestern Region of the United States. The following values for use with equation 5 through 9 are shown in Table 12 below, adapted from Almeida-Costa et al., "Economic and Environmental Impact Study of Warm Mix Asphalt Compared to Hot Mix Asphalt," *J. Clean. Prod.* 112:2308-2317. Part 4. (2016); Harder et al., "Energy and Environmental Gains of Warm and Half-Warm Asphalt Mix: Quantitative Approach," *In: Transportation Research Board 87th Annual Meeting* (2008); Cutnell et al., Physics, 10 ed. John Wiley & Sons, Inc., United States (2014); Romier et al., "Low-Energy Asphalt With Performance of Hot-Mix Asphalt," *Transp. Res. Rec. J. Transp. Res. Board* 101-112 (2006); and Waples et al., "A Review and Evaluation of Specific Heat Capacities of Rocks, *Minerals, and Subsurface Fluids. Part* 1: Minerals and Nonporous Rocks," *Nat. Resour. Res.* 13:97-122 (2004), all of which are hereby incorporated by reference in their entirety.

TABLE 12

General Values for Use in Calculating Heat Energy

| Parameter | Value | SI units |
|---|---|---|
| Ambient temperature | 293.2 | K |
| Specific heat of limestone | 880.0 | J/(kg K) |
| Specific heat of quartzite | 1013.0 | J/(kg K) |
| Specific heat of sand | 775.0 | J/(kg K) |
| Specific heat of water | 4185.0 | J/(kg K) |
| Specific heat of steam | 2020.0 | J/(kg K) |
| Specific heat of asphalt | 2093.4 | J/(kg K) |
| Latent heat of water vaporization | 2256.0 | kJ/kg |
| Moisture content of aggregates | 3.0 | % |
| Heating temperature of aggregates - VTB control | 436.2 | K |
| Heating temperature of aggregates - 3% HBL + 3% PHBL | 429.2 | K |
| Heating temperature of aggregates - 5% HBL + 5% PHBL | 424.2 | K |
| Heating temperature of asphalt - VTB control | 447.2 | K |

TABLE 12-continued

General Values for Use in Calculating Heat Energy

| Parameter | Value | SI units |
|---|---|---|
| Heating temperature of asphalt - 3% HBL + 3% PHBL | 441.2 | K |
| Heating temperature of asphalt - 5% HBL + 5% PHBL | 436.2 | K |

Using equation 5 through 9 the total heat energy required to produce 1 tonne of mix was determined for the control VTB, 3% HBL+3% PHBL, and 5% HBL+5% PHBL groups as shown in Table 13. Energy reductions of 3.24% and 5.59% were seen, due to the use of lower production temperatures.

TABLE 13

Heat Energy Required to Produce 1 Tonne of Mix

| | Heat energy required (J) | | |
|---|---|---|---|
| Parameter | Control | 3% HBL + 3% PHBL | 5% HBL + 5% PHBL |
| Aggregtes heating | 1.20E+08 | 1.14E+08 | 1.10E+08 |
| Water heating | 9.25E+06 | 9.52E+06 | 9.52E+06 |
| Water vaporization | 6.42E+07 | 6.42E+07 | 6.42E+07 |
| Steam heating | 3.62E+06 | 3.22E+06 | 2.93E+07 |
| Asphalt heating | 1.68E+07 | 1.61E+07 | 1.56E+07 |
| Total heating | 2.14E+08 | 2.07E+08 | 2.02E+08 |
| % reduction | | 3.24% | 5.59% |

The last step of the cost-benefit analysis is the examination of the effect of lower production temperatures on fuel quantities, prices and emissions. As stated earlier, the price for coal is $40.20/tonne, diesel is $0.63/litre, and natural gas is $0.13/m3 (Conti et al., "Annual Energy Outlook 2012 with Projections to 2035. United States of America Department of Energy," Office of Integrated and International Energy Analysis. (2012), which is hereby incorporated by reference in its entirety). Using the heat energy conversion coefficients and emissions produced per unit fuel used shown in Table 14, the values shown in FIGS. 11A-11B and 12A-12D (Deru, M. P. & Torcellini, P. A., "Source Energy and Emission Factors for Energy Use in Buildings. National Renewable Energy Laboratory Golden, CO (2007) and Manual, E. S., "Energy Statistics Division of the International Energy Agency (IEA) in Co-operation with the Statistical Office of the European Communities (Eurostat)," Paris, France (2005), which are hereby incorporated by reference in their entirety) were determined. Although these reductions in energy, fuel quantities and prices, as well as emissions may seem small (3.24%, and 5.59%), they are still savings and reducing the exposure of the environment to emissions.

TABLE 14

Emissions Per Unit Fuel Used & Heat Energy Conversion Coefficients

| Fuel type | $CO_2$ | $NO_X$ | $SO_X$ | CO | Unit | Coefficient |
|---|---|---|---|---|---|---|
| Coal (kg/t) | 2630 | 5.75 | 1.66 | 2.89 | Tonne/MJ | 0.0000395 |
| Diesel (kg/l) | 2.73 | 2.58E−03 | 4.09E−03 | 6.48E−04 | l/MJ | 0.0255877 |
| Natural gas (kg/m$^3$) | 1.96 | 1.78E−06 | 1.01E−08 | 1.50E−06 | m$^2$/MJ | 0.0265590 |

Example 11—Environmental Concerns and Benefits

Reproducibility of results with VTB from different sources—VTB are already used in asphalt binder, but are primarily used as a blend agent, and are not used directly without blending softer asphalt binders for paving roadways. This invention provides a method for creating VTB materials at paving grades without the need to blend with other asphalt materials. This is beneficial environmentally because it improves the utility of a co-product while increasing the percentage of bio-renewable products used in the binder thereby replacing a purely petroleum-based binder with a VTB-LO blend. The study achieved pavement performance grades with various dosage combination of linseed-based materials to create models for estimating dosages to attain certain performance grades. This process can be easily repeated using the same linseed derived materials with VTB derived from other sources and other vegetable feedstocks for producing heat bodied and partially hydrogenated heat bodied oils.

The study showed that bio-renewable linseed oil combinations were helping achieve the value-added performance grade of the binder. The reason for this is postulated in other research findings that it is possible to convert heavier asphaltenes into maltenes through hydrogenation reactions (Xu et al., "Hydro-Treatment of Athabasca Vacuum Tower Bottoms in Supercritical Toluene With Microporous Activated Carbons and Metal-Carbon Composite," *Fuel* 88:2097-2105 (2009), which is hereby incorporated by reference in its entirety). Thus, because one of the linseed derived materials is hydrogenated heat bodied linseed oil used for creating the dosage material combinations a reaction could be occurring during the blending process (conversion of asphaltenes to maltenes). All VTBs have much larger amounts of heavy asphaltenes due to the refining process that strips the heavier oil products of their lighter oil components. Due to this, it is possible to reproduce this process of rejuvenating VTB from other sources. There might be slight changes in the chemical makeup of VTBs from different sources, but the main task of rejuvenating a heavily "aged" asphalt binder is to convert asphaltenes to maltenes to achieve an acceptable ratio of asphaltenes/maltenes for performance graded binder.

Environmental footprint through sustainable reuse of materials—Most VTB produced during refining are used as blend agents in asphalt. However, some, the bottom material of VTB is landfilled because it is too hard to pump and use. This material is labeled as non-hazardous solid waste. Problems can occur in landfills with VTBs because of rising temperatures. When temperatures rise, VTB becomes softer and more flowable. Add on top of this the stress felt by VTB due to being under layers of other material in a landfill, VTBs could be pushed out of the landfill transforming a nonhazardous material into a hazardous material (Han, J. & Lin, C., "GeoFlorida 2010. In: A Feasibility Study on Reducing Flowability of Vacuum Tower Bottoms Using Aggregate," pp. 2787-2793 (2010), which is hereby incorporated by reference in its entirety). Past researchers have examined the use of mixing aggregates with VTBs before landfilling to prevent these problems. However, this approach has so far not been put into practice in the field (Han, J. & Lin, C., "GeoFlorida 2010. In: A Feasibility Study on Reducing Flowability of Vacuum Tower Bottoms Using Aggregate," pp. 2787-2793 (2010), which is hereby incorporated by reference in its entirety). It is felt that through the method shown in this study much more VTB can be prevented from being landfilled.

Even though asphalt binder is inert and insoluble in water, asphaltic materials like pavements and roofing shingles are subject to runoff from rainfall events (Brandt et al., "Aqueous Leaching of Polycyclic Aromatic Hydrocarbons From Bitumen and Asphalt," Water Res. 35, 4200e4207 (2001) and Kriech, A. J., "Evaluation of Hot Mix Asphalt for Leachability," Heritage Research Group, Indianapolis, Indiana. (1990), which are hereby incorporated by reference in their entirety). There have been reports of heavy metal contamination in highway runoff water and in soils nears roadways (Lau et al., "Characteristics of Highway Stormwater Runoff in Los Angeles: Metals and Polycyclic Aromatic Hydrocarbons," *Water Environ. Res.* 81:308-318 (2009); Pagotto et al., "Comparison of the Hydraulic Behaviour and the Quality of Highway Runoff Water According to the Type of Pavement," *Water Res.* 34:4446-4454 (2000); Warren et al., "Heavy metal levels in atmospheric particulates, roadside dust and soil along a major urban highway. *Sci. Total Environ.* 59:253-256 (1987), which are hereby incorporated by reference in their entirety). However, it has been shown that the heavy metal contamination comes from vehicles and not from asphalt pavements (Cooper et al., "The Impact of Runoff from Asphaltic Products on Stream Communities in California," Federal Highway Administration, California State Department of Transportation Final Report FHWA. CA/TL-96/24 (1996) Birgisdottir et al., "Leaching of PAHs From Hot Mix Asphalt Pavements," *Environ. Eng. Sci.* 24:1409-1422 (2007), which are hereby incorporated by reference in their entirety) studied the leachability of 16 polyaromatic hydrocarbons (PAH)s designated by the U.S. Environmental Protection Agency (EPA) of concern, and used the results to model long term leaching of PAHs from asphalt roadways. They found that when studying the leaching of PAHs in asphalt pavement, the same diffusion coefficient could be used for the 16 PAHs. It was also seen through long-term modeling (25 years) that the level of all 16 PAHs were found to be much lower than the soil quality criteria of 1.5 mg kg_1 in Denmark. From their results they concluded that if the level of PAHs is above the criteria it is not due to leaching from an asphalt pavement (Birgisdottir et al., "Leaching of PAHs From Hot Mix Asphalt Pavements," *Environ. Eng. Sc.* 24:1409-1422 (2007), which is hereby incorporated by reference in its entirety). Research by Legret et al. "Leaching of Heavy Metals and Polycyclic Aromatic Hydrocarbons From Reclaimed Asphalt Pavement," Water Res. 39:3675-3685 (2005), which is hereby incorporated by reference in its entirety, found that leaching of heavy metals in both virgin asphalt pavements and recycled asphalt pavements (RAP) were well below drinking water limits. However, it was found that leaching of PAHs from RAP was much higher than for virgin asphalt pavement (Legret et al. "Leaching of Heavy Metals and Polycyclic Aromatic Hydrocarbons From Reclaimed Asphalt Pavement," *Water Res.* 39:3675-3685 (2005), which is hereby incorporated by reference in its entirety).

VTB is not RAP, but is material akin to virgin asphalt binder, but a lot stiffer. It is believed that VTB would act the same as virgin asphalt binder in a pavement and leaching of heavy metals and PAHs would be below drinking water limits in nearby soils and groundwater. The main point of this study is that instead of using VTB as a blend agent with Superpave performance graded asphalt binder, full reuse and substitution can be done through complete rejuvenation. This means production of higher value products such as gasoline and specialty chemicals could be increased, due to the fact that higher amounts of VTB could be rejuvenated back into a good performance graded asphalt binder for use in paving roadways.

Costs implications—VTB is a low-value material due to limited applications in paving because of poor performance at low temperatures due to its stiff properties; price range is around $120 to $180 per ton of liquid VTB, while asphalt binder (even with the current low oil prices) range from $300 to $350 per ton of liquid asphalt. The cost of VTB modification using linseed based materials such as HBO and PHBO in dosages at 4.5% and 4.5% would drive the cost of VTB up to the range from $290 to $345 per ton of modified liquid VTB in the current market and pending further research. This dosage combination transforms this VTB from PG 76-10 to PG 64-22. The economics for performing the linseed modification would be further incentivized if neat asphalt prices rise.

Example 12—Conclusions and Recommendations

The findings of this study show that HBL and PHBL can be used in combination as rejuvenators for VTB and have the potential to change the original binder grade from 76-10 to PG 70-22 and PG 64-22 binder grades. The testing plan included an extensive binder testing plan to fully evaluate the potential of the two BDM and to determine optimal dosage levels for each material. Binder testing showed how each BDM impacted rheological properties.

The DSR test results verify that maintaining a high temperature grade of 70° C. and 64° C. is possible. The bending beam rheometer tests show that to achieve a low temperature grade of −22° C., at least 3% of HBL and 3% PHBL must be used in combination. From the analysis using the prediction equation, it was found that there must be both BDMs blended with the VTB to achieve a −22° C. low temperature grade. The data gathered from testing was successfully used to create linear multiple regression models with adjusted coefficients of determination greater than 90% for predicting RTFO DSR, and BBR results.

It is recommended that further testing take place using the same experimental plan, but with linseed based materials from different source locations with different chemistry. Another step would be to cross materials together from different source locations to estimate optimum dosage levels for the rejuvenators to achieve a PG 64-22, and PG 70-22 binder grade. This would help identify whether smaller dosages could be used to achieve the same impact on VTB rheological performance. It would also be beneficial to evaluate other vegetable oil sources as well in the same manner as that done for the linseed based materials.

Example 13—Further Experimental Materials and Methods

Vacuum tower bottoms are a very stiff form of asphalt binder that usually grade out at performance grades (PG) 76-10, 82-10, or 82-16. For this example, one source of vacuum tower bottoms from an Illinois refinery with a penetration grade of 20-30 and a performance grade (PG) of PG 76-10 was used. Two bio-derived materials from linseed oil were used in this research work—Heat Bodied Linseed Oil (HBO), and Partially Hydrogenated Heat Bodied Linseed Oil (PHBO) for the creation of two groups, while a bio-derived commercial modifier (CM) currently in the market was used in the creation of two more groups for comparison purposes. The properties for HBO and PHBO are shown in Table 1 above.

The amount of rejuvenator was determined through an extensive dosage study using the HBO and PHBO materials with the same source VTB material in past work. Looking at the critical high and low temperatures it is seen that the rejuvenator combination of HBO and PHBO perform similarly to the commercial rejuvenator CM at similar dosages as shown in Table 15.

TABLE 15

Performance Grades (PG) of Control and Rejuvenator Groups

| Group Name | Critical High Temp (° C.) | Critical Low Temp (° C.) | PG Grade |
|---|---|---|---|
| Control | 80.5 | −14.05 | 76-10 |
| 3% HBO + 3% PHBO | 72.8 | −22 | 70-16 |
| 5% HBO + 5% PHBO | 68.4 | −25.97 | 64-22 |
| 6% CM | 69.86 | −22.66 | 64-22 |
| 10% CM | 63.03 | −26.46 | 58-22 |

A surface mix with a 10 million ESAL design level from the Iowa Department of Transportation (DOT) was used to construct bulk specific gravity specimens (height—115 mm, diameter—150 mm) and dynamic modulus specimens (height—150 mm, diameter—100 mm) with air voids at 7%±0.5% for five groups (includes the control VTB). The blended aggregate gradation and source information used for this mix design are shown in Table 16.

TABLE 16

Mix Design Gradation and Supplier Information

| Source Aggregate | | Martin Marietta (Ames) 12.5 mm Limestone | Martin Marietta (Ames) 9.5 mm Limestone | Old castle Materials Group (Johnston) Quartzite | Hallet (Ames) Natural Sand | Martin Marietta (Ames) Manuf. Sand | Martin Marietta (Ames) Agg Lime | Blend |
|---|---|---|---|---|---|---|---|---|
| U.S. Sieve | Sieve, mm | 29% % Passing | 16% % Passing | 15% % Passing | 13% % Passing | 15% % Passing | 12% % Passing | 100% % Passing |
| 3/4" | 19.0 | 100.0 | 100.0 | 100.0 | 100.0 | 100.0 | 100.0 | 100.0 |
| 1/2" | 12.5 | 79.7 | 100.0 | 100.0 | 100.0 | 100.0 | 100.0 | 94.1 |
| 3/8" | 9.5 | 65.8 | 90.1 | 71.5 | 100.0 | 100.0 | 100.0 | 84.2 |
| #4 | 4.75 | 37.2 | 20.5 | 5.1 | 96.8 | 95.2 | 99 | 53.6 |
| #8 | 2.36 | 18.1 | 2.1 | 2.2 | 64.2 | 65.5 | 97 | 35.7 |
| #16 | 1.18 | 12.5 | 0.7 | 2.0 | 33.7 | 36.3 | 75 | 22.9 |
| #30 | 0.60 | 9.5 | 0.4 | 1.9 | 11.4 | 17.4 | 53 | 13.6 |
| #50 | 0.30 | 7.5 | 0.3 | 1.9 | 0.9 | 6.5 | 38 | 8.2 |

TABLE 16-continued

Mix Design Gradation and Supplier Information

| Source Aggregate | | Martin Marietta (Ames) 12.5 mm Limestone | Martin Marietta (Ames) 9.5 mm Limestone | Old castle Materials Group (Johnston) Quartzite | Hallet (Ames) Natural Sand | Martin Marietta (Ames) Manuf. Sand | Martin Marietta (Ames) Agg Lime | Blend |
|---|---|---|---|---|---|---|---|---|
| U.S. Sieve | Sieve, mm | 29% % Passing | 16% % Passing | 15% % Passing | 13% % Passing | 15% % Passing | 12% % Passing | 100% % Passing |
| #100 | 0.15 | 6.2 | 0.3 | 1.5 | 0.1 | 1.9 | 29 | 5.8 |
| #200 | 0.075 | 5.2 | 0.3 | 1.2 | 0.0 | 0.8 | 22.3 | 4.5 |

Mix specimens were mixed and compacted at 155° C. after two hours of curing for a fixed mass to achieve 7%±0.5% air voids; bulk specific gravity specimens (height—115 mm, diameter—150 mm) and dynamic modulus specimens (height—150 mm, diameter—100 mm) using a Superpave gyratory compacter (SGC) according to AASHTO T 312 and air voids were measured according to AASHTO T 166 (AASHTO. T 166—"Bulk Specific Gravity of Compacted Hot Mix Asphalt (HMA) Using Saturated Surface-Dry Specimens," AASHTO T 166-11. Washington, DC: American Association of State Highway and Transportation Officials (2011) and AASHTO. T 312—"Preparing and Determining the Density of Hot Mix Asphalt (HMA) Specimens by Means of the Superpave Gyratory Compactor," AASHTO T 312-12. Washington, DC: American Association of State Highway and Transportation Officials (2012), both of which are hereby incorporated by reference in their entirety). Six semi-circular bend ("SCB") test specimens were produced from each $G_{mb}$ specimen with approximate dimensions of 25±2 mm in thickness, and 150±9 mm in diameter and notch length of 15±0.5 mm with the notch width being no wider than 1.5 mm. Each SCB specimen underwent preconditioning for two hours at −12° C. in the environmental chamber before testing.

Example 14—Mixture Testing Methods for Dynamic Modulus Test and Semi-Circular Bend Test Dynamic Modulus Test—The dynamic modulus test is a linear viscoelastic test used on asphalt mix specimens where the complex dynamic modulus |E*| is estimated by relating stress to strain at several temperatures with each temperature at several different frequencies. The complex dynamic modulus |E*| is a very important property, because it is used to represent a pavement's stiffness response under repeated traffic loading (several frequencies) (Brown et al., "Hot Mix Asphalt Materials, Mixture Design, and Construction," 3rd ed. Lanham, Md.: NAPA Research and Education Foundation (2009), which is hereby incorporated by reference in its entirety). Asphalt mix stiffness is very temperature dependent when loaded. Asphalt mix with lower strain is due to the stiffness being high under an applied stress. At high temperatures, stiffer mixtures are less prone to permanent deformation, but at low temperature are more prone to cracking (Brown et al., "Hot Mix Asphalt Materials, Mixture Design, and Construction," 3rd ed. Lanham, Md.: NAPA Research and Education Foundation (2009), which is hereby incorporated by reference in its entirety).

|E*| varies with both temperature and load frequency. This means that trying to compare results gained from testing at one temperature to results from another temperature is very difficult. To be able to make a comparison between results from different test temperatures, dynamic modulus master curves can be developed. They provide a direct means of viewing all the results gained from multiple test temperatures and frequencies in one visual representation (Christensen et al., "Interpretation of Dynamic Mechanical Test Data for Paving Grade Asphalt Cements (with discussion)," Journal of the Association of Asphalt Paving Technologists 61 (1992), which is hereby incorporated by reference in its entirety). According to research conducted by Li and Williams (Li et al., "A Practical Dynamic Modulus Testing Protocol," J. Test Eval. 40(1): 100-6 (2012) which is hereby incorporated by reference in its entirety), three test temperatures (4.4, 21.1, and 37.8° C.) could be used instead of five, because the results did not change the shape of final master curve developed. This was determined due to there being data from nine frequencies ranging from 25 Hz to 0.1 Hz instead of data from six frequencies ranging from 25 Hz to 0.1 Hz. For this research work |E*| master curves will be fitted using the sigmoidal function (Pellinen et al., "Stress Dependent Master Curve Construction for Dynamic (complex) Modulus (with discussion)," Journal of the Association of Asphalt Paving Technologists. 71 (2002), which is hereby incorporated by reference in its entirety). The number of specimens tested for each group was set at three. The mathematical expression of the sigmoidal function is shown in equations 10 through 12 (Pellinen et al., "Stress Dependent Master Curve Construction for Dynamic (complex) Modulus (with discussion)," Journal of the Association of Asphalt Paving Technologists. 71 (2002), which is hereby incorporated by reference in its entirety):

$$\log|E^*| = \delta + \frac{\alpha}{1 + e^{\beta + \gamma(\log t_r)}} \quad (10)$$

$$a(T) = \frac{t}{t_r} \quad (11)$$

$$\log(a(T_i)) = aT_i^2 + bT_i + c \quad (12)$$

$t_r$=Reduced time of loading at reference temperature (s);
δ, α, β, γ=Coefficients;
a(T)=Shift factor as a function of temperature;
t=Time of loading (s);
T=Temperature (° C.);
$a(T_i)$=Shift factor as a function of Temperature $T_i$;
a, b, c=Coefficients for shift factor.

The time-temperature superposition principle must be used to construct a complex dynamic modulus master curve using data gained from testing at several frequencies within several test temperatures through equations 10 through 12.

Semi-circular Bend Test—The semi-circular bend (SCB) test is a HMA fracture test used at low temperatures. Recently the SCB test has become more well known among researchers because specimen fabrication is simple and easily reproducible using both standard laboratory compacted or field cored asphalt concrete samples (Chong et al., "New Specimen for Fracture Toughness Determination for Rock and Other Materials," Int J Fract. 26(2):R59-R62 (1984); Krans et al., "Semi-Circular Bending Test: A Practical Crack Growth Test Using Asphalt Concrete Cores," RILEM PROCEEDINGS: CHAPMAN & HALL p. 123-32 (1996); and Marasteanu et al., "Low Temperature Fracture Test for Asphalt Mixtures," Fifth International RILEM Conference on Reflective Cracking in Pavements: RILEM Publications SARL p. 249-56 (2004), all of which are hereby incorporated by reference in their entirety). Within this test, two fracture modes can be studied—mode I or mode II. The fracture mode depends on initial notch orientation. Within this work, mode I fracture will be used for specimen preparation, testing, and analysis. Fracture energy ($G_f$), fracture toughness ($K_{IC}$), and stiffness ($\delta$) are the parameters determined using the SCB test results (Li et al., "Effect of Factors Affecting Fracture Energy of Asphalt Concrete at Low Temperature," Road Materials and Pavement Design 9 (sup 1):397-416 (2008); Li et al., "Evaluation of the Low Temperature Fracture Resistance of Asphalt Mixtures Using the Semi Circular Bend Test (with discussion)," Journal of the Association of Asphalt Paving Technologists 73 (2004); Li et al., "Using Semi Circular Bending Test to Evaluate Low Temperature Fracture Resistance for Asphalt Concrete," Exp Mech. 50(7):867-76 (2010); Lim et al., "Stress Intensity Factors for Semi-Circular Specimens Under Three-Point Bending," Engineering Fracture Mechanics 44(3): 363-82 (1993); Marasteanu et al., "National Pooled Fund Study—Phase II: Final Report—Investigations of Low Temperature Cracking in Asphalt Pavements," MN/RC 2012-23 (2012); and Teshale, E. Z., "Low-Temperature Fracture Behavior of Asphalt Concrete in Semi-Circular Bend Test," University of Minnesota (2012), all of which are hereby incorporated by reference in their entirety).

For this test, a vertical compressive load is applied at the top of each specimen so a constant crack mouth opening displacement (CMOD) of 0.0005 mm/s is achieved, as described in AASHTO TP 105-13. More details with regard to equipment, test setup, and specific test conditions for the SCB test are provided in AASHTO TP 105-13. The parameter fracture energy is determined as the area under load-CMOD curve, while toughness and stiffness are determined using load and load line displacement (LLD) results recorded for each tested specimen (American Association of State Highway and Transportation Officials, (AASHTO), "AASHTO. TP 105, "Determining the Fracture Energy of Asphalt Mixtures Using the Semicircular Bend Geometry (SCB), AASHTO TP 105-13," Washington, D.C. (2013) and Leng et al., "Effect of Reheating Plant Warm SMA on Its Fracture Potential," 7th RILEM International Conference on Cracking in Pavements: Springer, p. 1341-9 (2012), both of which are hereby incorporated by reference in their entirety). A linear variable differential transformer (LVDT) built into the actuator was used to record load line displacement (Marasteanu et al., "National Pooled Fund Study—Phase II: Final Report—Investigations of Low Temperature Cracking in Asphalt Pavements," MN/RC 2012-23 (2012), which is hereby incorporated by reference in its entirety.). For this test, at least three specimens were used from each group for testing at −12° C. and analysis. The results used for further analysis from the SCB test will be fracture energy ($G_f$).

Example 15—Discussion of Results for Dynamic Modulus Test and |E*| Master Curves Using the sigmoidal function master curves were created using results gained from testing three specimens from each of the five groups at three temperatures −4° C., 21° C., and 37° C., each at nine frequencies between 25 Hz and 0.1 Hz. The master curves are shown in FIG. 13A (temperature) and FIG. 13B (reduced frequency).

Figures 13A, 13B:
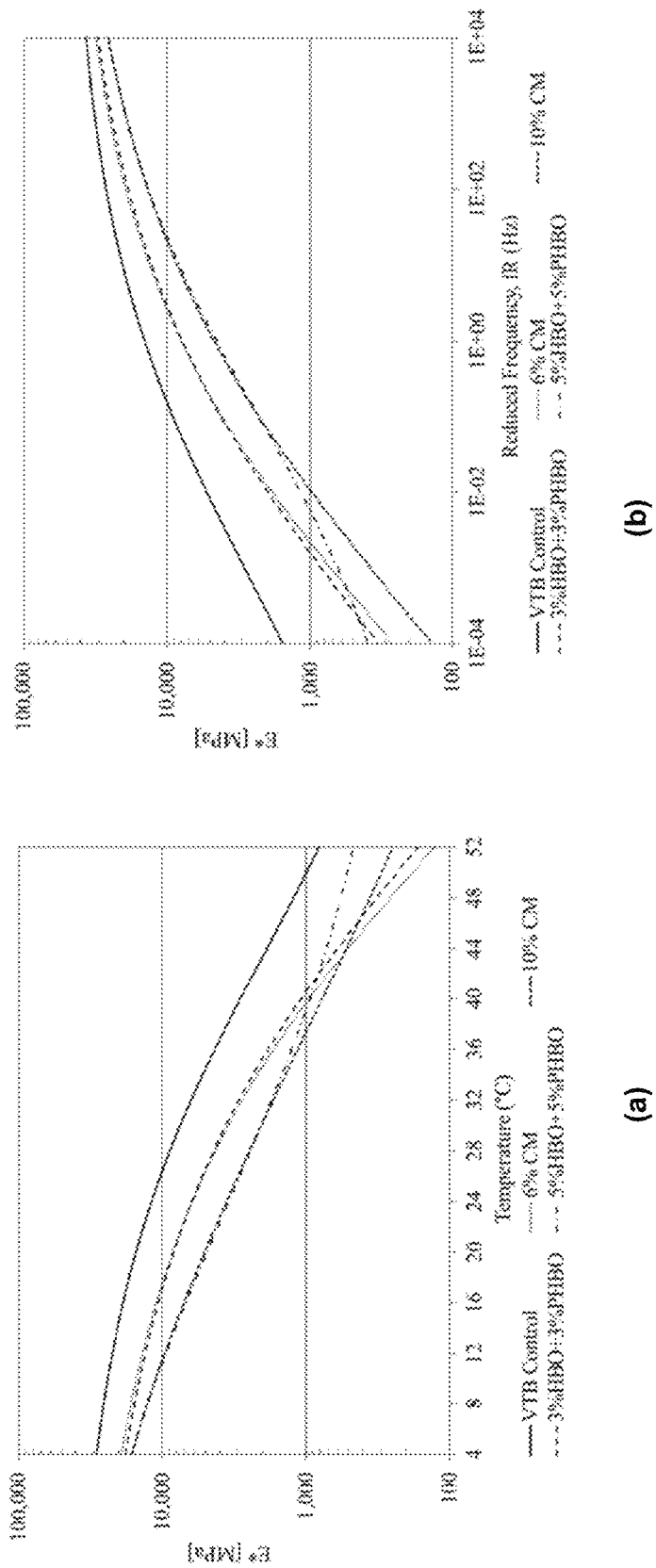
FIGS. 13A-13B show |E*| master curves for temperature (FIG. 13A) and reduced frequency (FIG. 13B).

From the results shown in FIG. 13A, as the temperature decreases, the groups diverge from one another with some showing lower dynamic modulus results than others. The groups 10% CM and 5% HBO+5% PHBO show the biggest decrease in their dynamic modulus results when compared to the VTB control group, while 6% CM and 3% HBO+3% PHBO show a slightly lower decrease in the dynamic modulus values than the aforementioned two groups when compared to the VTB control group. As the temperature increases there appears to be a slope shift for the group 5% HBO+5% PHBO as compared to the other three rejuvenator groups at 33° C., where the rate of stiffness decreasing gradually gets smaller. There might be an error due to extrapolation for the group 3% HBO+3% PHBO as the slope of the curve is very similar to the slope for the group 5% HBO+5% PHBO up until 33° C. Whereas the other groups with CM have a different slope that is more akin to the control, but shifted downward. These results could be interpreted to mean that HBO+PHBO decreases stiffness much more at lower temperatures than at higher temperatures as compared to the commercial rejuvenator CM. This could mean that HBO+PHBO widen the continuous grade range more than CM, and thus could be more valuable as a rejuvenator. The results do not appear different when examining dynamic modulus against reduced frequency as shown in FIG. 13B. This is also an indication that the rejuvenator HBO+PHBO is working and working better than CM. To further prove this statement statistical analysis must be done.

Figure 14:
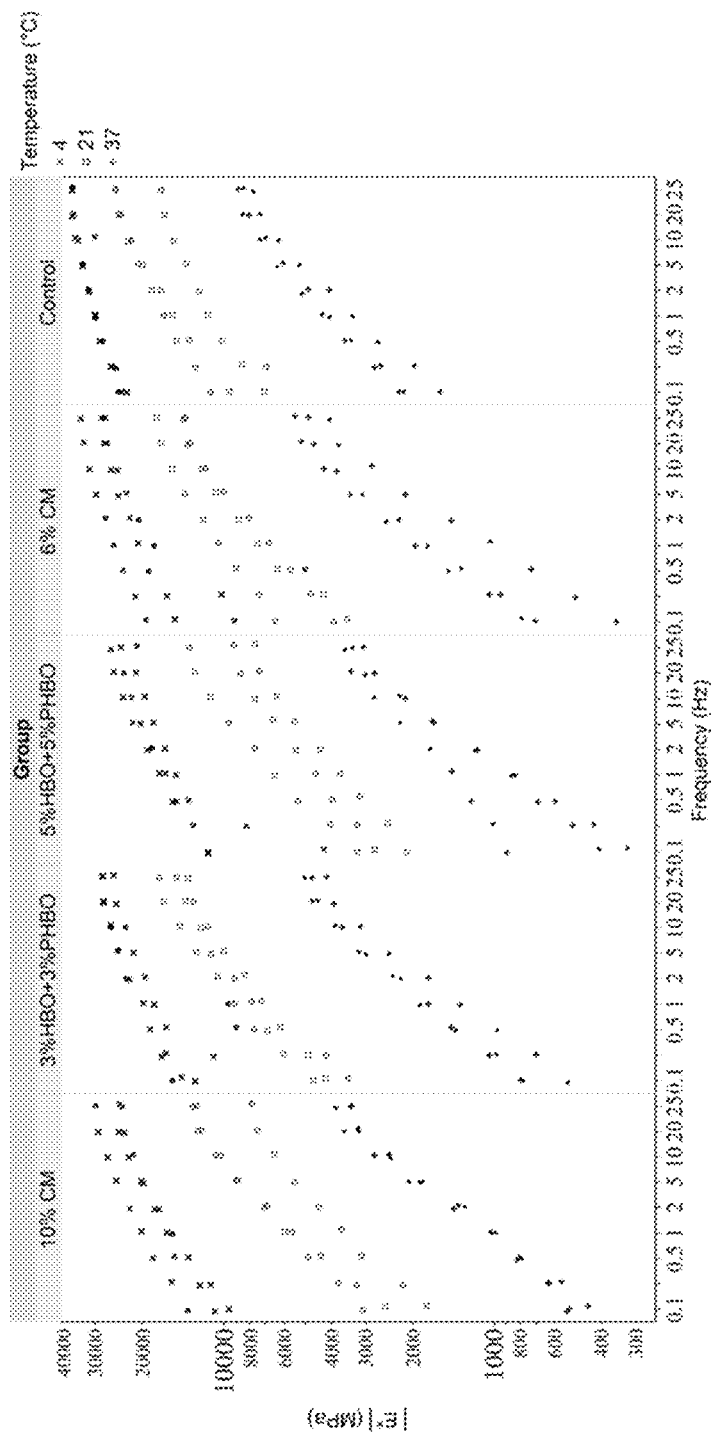
FIG. 14 shows measured E* data used in statistical analysis for each of the five test groups.

Statistical Analysis of |E*| Results—The measured dynamic modulus tested at the aforementioned three temperatures (° C.) and nine frequencies (Hz) for each of the five groups are shown in FIG. 14. The data trends indicate that dynamic modulus for all five groups increase with increasing frequency and decrease with decreasing temperature. All measured data from each individual specimen was used in statistical analysis (fifteen specimens worth of data at nine frequencies, and three temperatures). Anomalies were not parsed as there were none found during testing.

An analysis of variance ("ANOVA") using a split-plot/repeated measures ("SPRM") design was conducted to examine which factors affect the dynamic modulus values. For the SPRM design the whole plot factor examined was group—A, and the sub plot factors examined were frequency (Hz)—B, and temperature (° C.)—C. All the interactions between A, B, and C were examined. The ANOVA for the data shown in FIG. 14 is shown in Table 17. For a factor/interaction to be significant under status the p-value must be less than or equal to 0.05 (statistically significant source of variability at the 95% confidence level).

TABLE 17

ANOVA of E*, MPa using split plot repeated measure design

| Source | DF | SS | MS | F-value | p-value | Status |
|--------|----|----|----|---------|---------|--------|
| A | 4 | 4.04E+09 | 1.01E+09 | 19.43 | 0.0001 | Significant |
| B | 8 | 4.50E+09 | 5.62E+08 | 174.35 | <0.0001 | Significant |

TABLE 17-continued

ANOVA of E*, MPa using split plot repeated measure design

| Source | DF | SS | MS | F-value | p-value | Status |
|---|---|---|---|---|---|---|
| A*B | 32 | 7.24E+07 | 2.26E+06 | 0.70 | 0.8862 | Not-significant |
| C | 2 | 2.68E+10 | 1.34E+10 | 4149.72 | <0.0001 | Significant |
| A*C | 8 | 8.92E+08 | 1.11E+08 | 34.55 | <0.0001 | Significant |
| B*C | 16 | 8.90E+08 | 5.56E+07 | 17.24 | <0.0001 | Significant |
| A*B*C | 64 | 1.42E+08 | 2.22E+06 | 0.69 | 0.9632 | Not-significant |
| Specimen No. [A] & Random | 10 | 5.19E+08 | 5.19E+07 | 16.10 | <0.0001 | Significant |
| Error | 260 | 8.39E+08 | 3.23E+06 | | | |
| Total | 404 | 3.87E+11 | | | | |

*A = Group, B = Frequency (Hz), and C = Temperature (° C.).
*Note: DF—degrees of freedom, SS—sum of squares, MS—mean square.

From Table 17, the main factors of interest are if the groups are different from one another, and if the interaction between group and temperature is a significant source of variability. These are important when looking at the effect on performance from the modification of the control group with rejuvenators. Both of these factors are significant. To look more closely at the interaction between group and temperature, least square mean differences gained from the student's t-test are determined as shown in Table 18. When levels (groups) are not connected by the same letter, then this mean said levels are statistically significantly different according to a 95% confidence interval. This means that there is a 5% chance that the groups are not found to be different from one another. From the results, it is shown that the group 5% HBO+5% PHBO shows the best performance at 4° C. in terms of the influence of the rejuvenator and dosage on VTB. At 21° C., both groups 10% CM and 5% HBO+5% PHBO show the best performance, while, at 37° C., no differences are seen between the different rejuvenators/dosage level groups. The only difference at 37° C. is from the control VTB group which has the highest dynamic modulus value. From the dynamic modulus results, it can be said that the rejuvenator dosage combination 5% HBO+5% PHBO shows the biggest improvement with 10% CM close behind.

TABLE 18

Student's t least square means differences of E* results for A*C interaction

| Temperature (° C.) | Group Name | | | | |
|---|---|---|---|---|---|
| | Control | 6% CM | 10% CM | 3% HBO + 3% P HBO | 5% HBO + 5% P HBO |
| 4 | A | B | D | C | E |
| | (31,204.22) | (22,807.22) | (19,442.59) | (20,639.44) | (17,714.67) |
| 21 | F | G | H | G | H |
| | (16,247.3) | (10,080.3) | (6,708.333) | (9,806) | (6,319.63) |
| 37 | I | J | J | J | J |
| | (5,080.556) | (2,474.167) | (1,745.811) | (2,470.433) | (1,680.904) |

*Levels not connected by same letter are significantly different.

Figure 15:
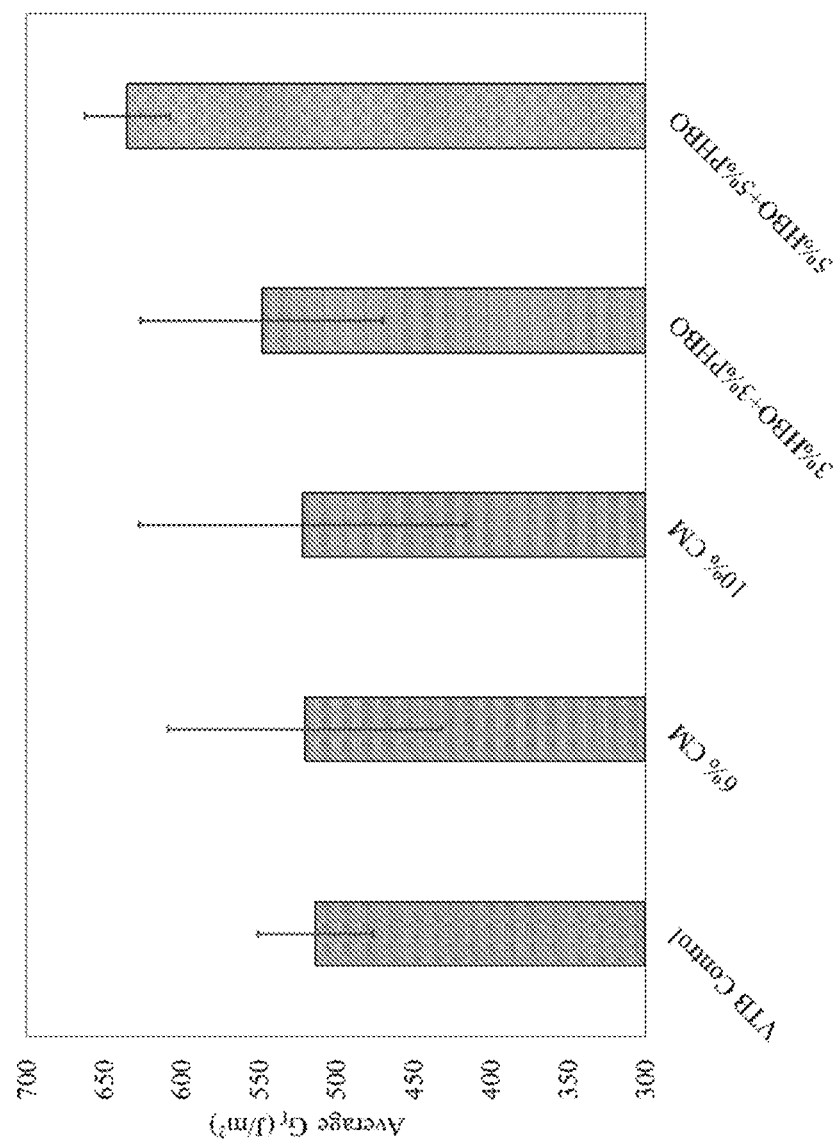
FIG. 15 shows average fracture energy ($G_f$) results (computed using at least three test specimens) at −12° C. for each test group.

Example 16—Discussion of Results for Semi-Circular Bend Test and Fracture Energy Results Average fracture energy ($G_f$) results (computed using at least three test specimens) at −12° C. for each group are shown in FIG. 15. The fracture energy results are shown in order from smallest to largest (bars shown for each group are 95% confidence intervals). From visual observation, it appears that the group 5% HBO+5% PHBO is different from the VTB control group according to the confidence intervals shown. The group 5% HBO+5% PHBO also has the highest fracture energy, thus, showing there is improvement in low temperature performance. It is clear that 6% CM, 10% CM, and 3% HBO+3% PHBO are not different from the control VTB group. However, it is not clear if these three groups are found to be different from the group 5% HBO+5% PHBO. For this, a more thorough statistical analysis is needed.

Statistical Analysis of Fracture Energy Results For the statistical analysis of fracture energy results, a randomized complete block (RCB) design was chosen to conduct an ANOVA, with the block factor being group. The results from the RCB designed ANOVA are shown in Table 19. Within this analysis, air voids was not a factor of interest as SCB specimens used in testing had air voids of 7%±0.5%. From Table 19, "group" is not a statistically significant source of variability. This means all the groups are not found to be statistically different from one another. As stated earlier, a source is only significant if the p-value is less than or equal to 0.05 according to a 95% confidence interval. However, FIG. 15 speaks differently and shows there are differences between some groups.

TABLE 19

ANOVA of $G_f$ (J/m$^2$)

| Source | DF | SS | MS | F-value | P-value | Status |
|---|---|---|---|---|---|---|
| Group | 4 | 32508.445 | 8127.11 | 1.7099 | 0.2122 | Not-significant |
| Error | 12 | 57035.421 | 4752.95 | | | |
| C. Total | 16 | 89543.866 | | | | |

* Note: DF—degrees of freedom, SS—sum of squares, MS—mean square.

Figure 16:
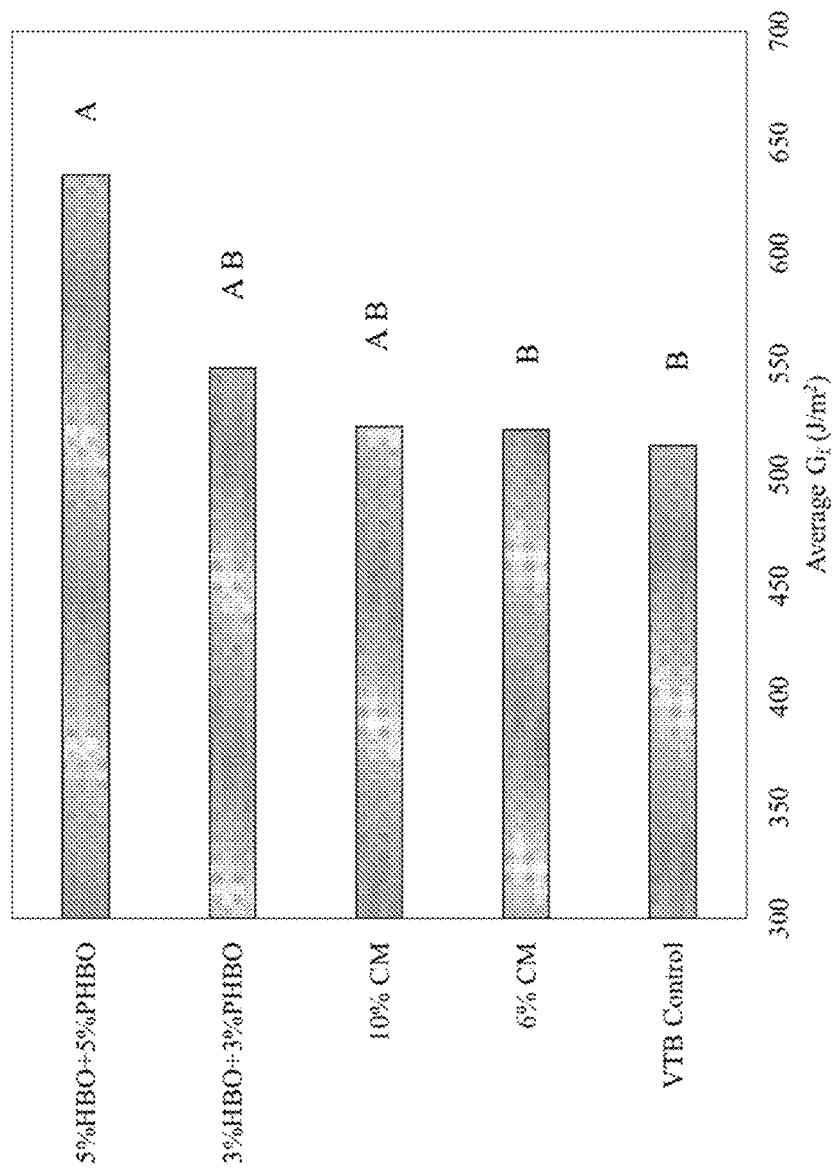
FIG. 16 shows results of a student's t least square means differences of $G_f$ results. Levels not connected by same letter are significantly different.

To look more closely at the differences between the groups in terms of fracture energy, a least square means plot was done using the Student's t-test for the factor group. This plot is shown in FIG. 16. Groups that are not connected by same letter are statistically significantly different from one another. From this plot, 5% HBO+5% PHBO is the only group statistically different from the control VTB group (letter "A"), while groups 3% HBO+3% PHBO and 10% CM were not found to be different from 5% HBO+5% PHBO. Even though both rejuvenators/rejuvenator combinations increased the fracture energy thus improving low temperature performance, 5% HBO+5% PHBO performed the best as it was found to be different than the control VTB group. Although the mix results statistics are conclusive, it is still hard to understand if a chemical and/or physical interaction is taking place between the VTB binder and the rejuvenator dosage combination 5% HBO+5% PHBO at low temperature. Subsequent research work dealing with analytical chemistry must be done to better understand what changes are occurring to the VTB binder for these effects to take place at low temperature.

Example 17—Conclusions

The findings from low temperature and intermediate temperature testing within this study show that a combination of HBO and PHBO can be successfully used as rejuvenator of VTB and perform equally or better than a commercial rejuvenator out in the current market. Through statistical analysis, it was shown that at low temperature HBO and PHBO at dosage rates of 5% by weight of the VTB binder combined improve performance significantly by lowering the stiffness and thus increasing fracture energy. At intermediate temperatures, it was shown that both rejuvenators at the two dosage levels reduced stiffness in the dynamic modulus test compared to the control VTB group, but were found to not be significantly different from one another.

It is recommended that further testing take place at two additional temperatures (0° C. and −24° C.) with the SCB test to examine fracture energy for the five groups. This would be beneficial and help to better understand how the rejuvenators impact mix performance at low temperature. Subsequently, it would be helpful if analytical chemical testing was done on the rejuvenators, and the VTB binder modified with said rejuvenators. It is also recommended that additional dosage rates and sources of VTB be examined for future mix testing and analysis.

Example 18—Evaluation of the Chemical Aspects of Hydrogenated and Non-Hydrogenated Linseed Oils Three molecular characterization techniques were completed on the modified vegetable oils [non-hydrogenated linseed oil ("HBL") and the hydrogenated linseed oil ("PHBL")]: (1) Fourier Transform Infrared Spectroscopy ("FTIR"), (2) Nuclear Magnetic Resonance ("NMR"), and (3) Size Exclusion Chromatography ("SEC").

Figure 17:
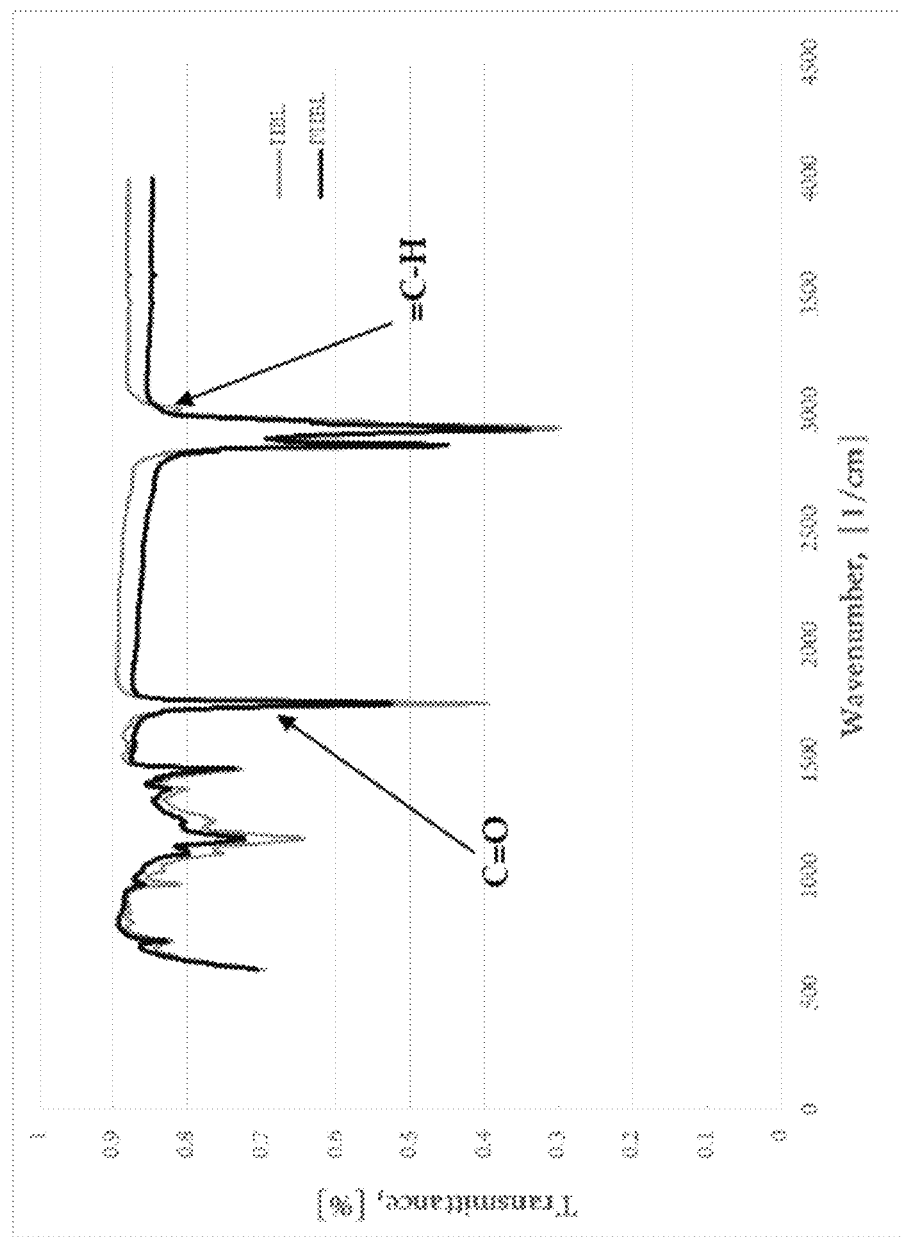
FIG. 17 shows an FTIR absorbance spectra of HBL and PHBL.

Fourier Transform Infrared Spectroscopy ("FTIR")—This technique is used to obtain the infrared absorbance frequency of the sample in order to assist in the assessment of its molecular structure. FIG. 17 shows FTIR absorbance spectra of HBL and PHBL. The FTIR absorbance spectra shows no visible change when comparing the hydrogenated sample to the non-hydrogenated part. However the (═C—H) stretch ≈3010 [1/cm] disappears from the HBL to the PHBL. No stretch is seen around the 1620-1280 [1/cm] range where alkenes would be expected to appear.

Figures 18A, 18B:
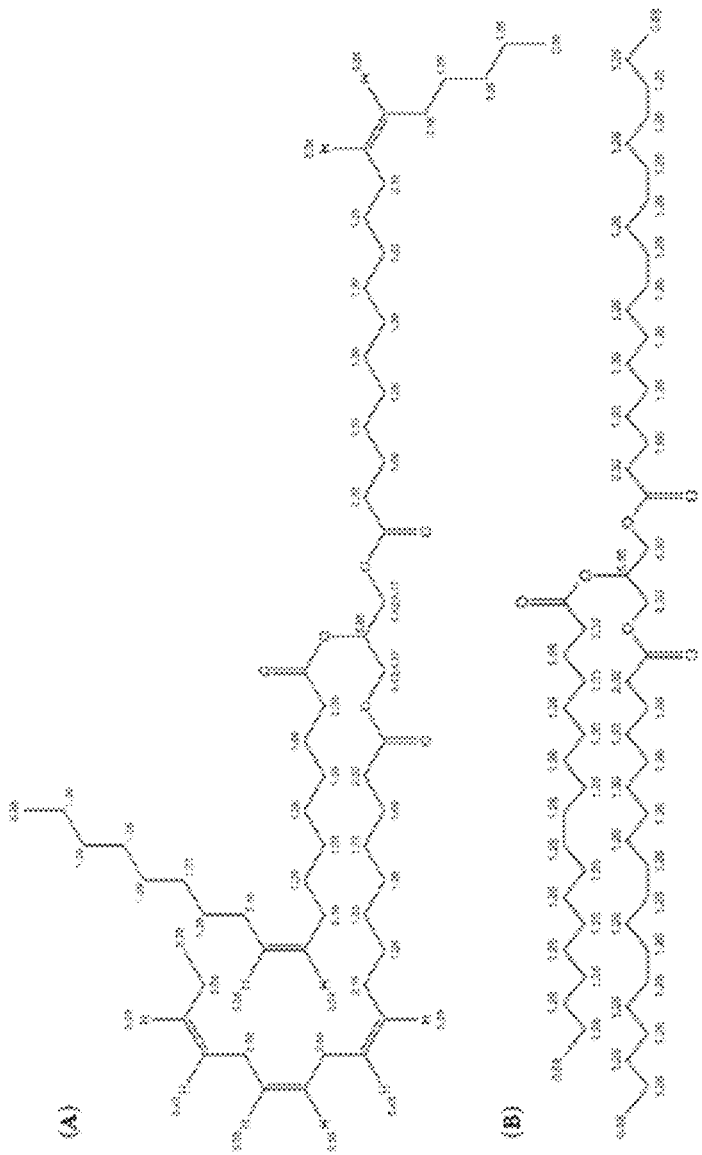
FIGS. 18A-18B show a representation of the molecular structure of HBL and PHBL along with the corresponding nuclei's NMR shift prediction of HBL (FIG. 18A) and PHB (FIG. 18B).
Figure 19:
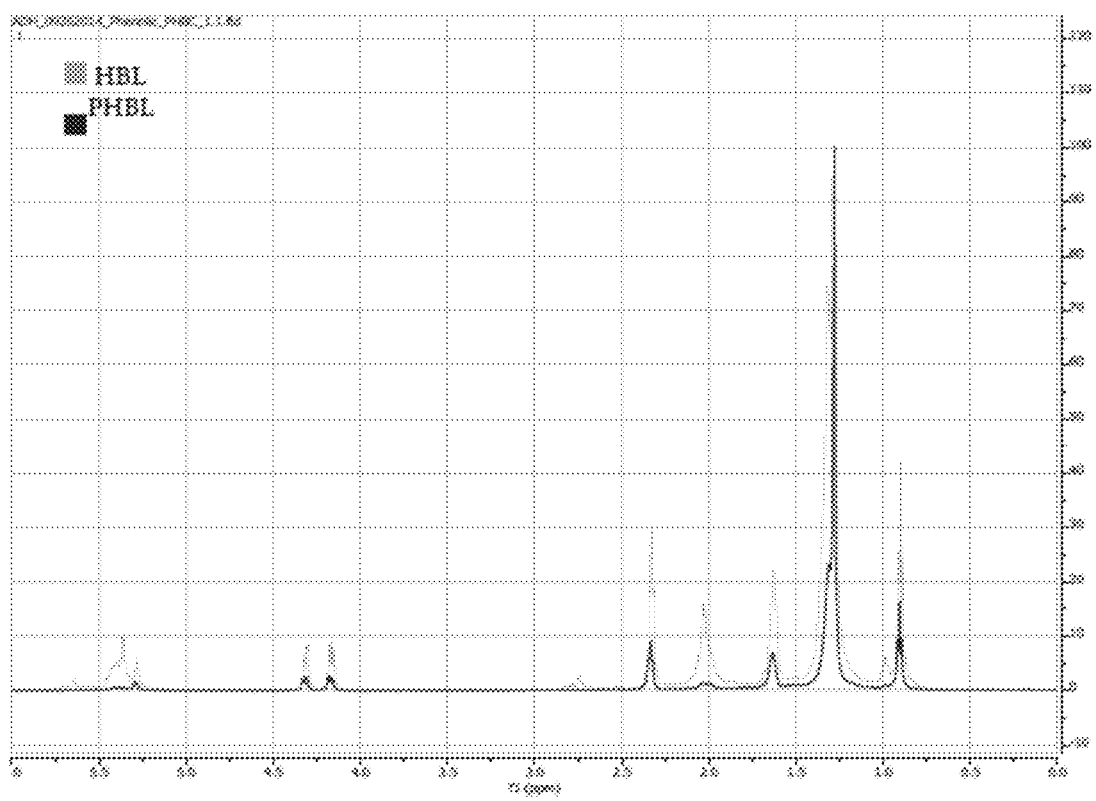
FIG. 19 shows the superimposed NMR of the HBL and PHBL samples, where the signal corresponding to the hydrogens in the carbon-carbon double bonds (5.38 ppm), the hydrogens before and after the carbon-carbon double bond (2.16 ppm) and the hydrogens between two carbon-carbon double bonds (2.80 ppm) decrease when comparing HBL to PHB.

Nuclear Magnetic Resonance ("NMR")—NMR is a technique used to study the structural composition of molecules. Atoms' nuclei when exposed to a magnetic field absorb and re-emit electromagnetic radiation depending on the chemical shift or Zeeman shift of the nuclei present in the sample. FIGS. 18A-18B show the molecular structure of HBL and PHBL along with the corresponding nuclei's NMR shift prediction of HBL (FIG. 18A) and PHBL (FIG. 18B). FIG. 19 shows the superimposed NMR of the two samples, where the signal corresponding to the hydrogens in the carbon-carbon double bonds (5.38 ppm), the hydrogens before and after the carbon-carbon double bond (2.16 ppm) and the hydrogens between two carbon-carbon double bonds (2.80 ppm) decrease when comparing HBL to PHBL.

Figure 20:
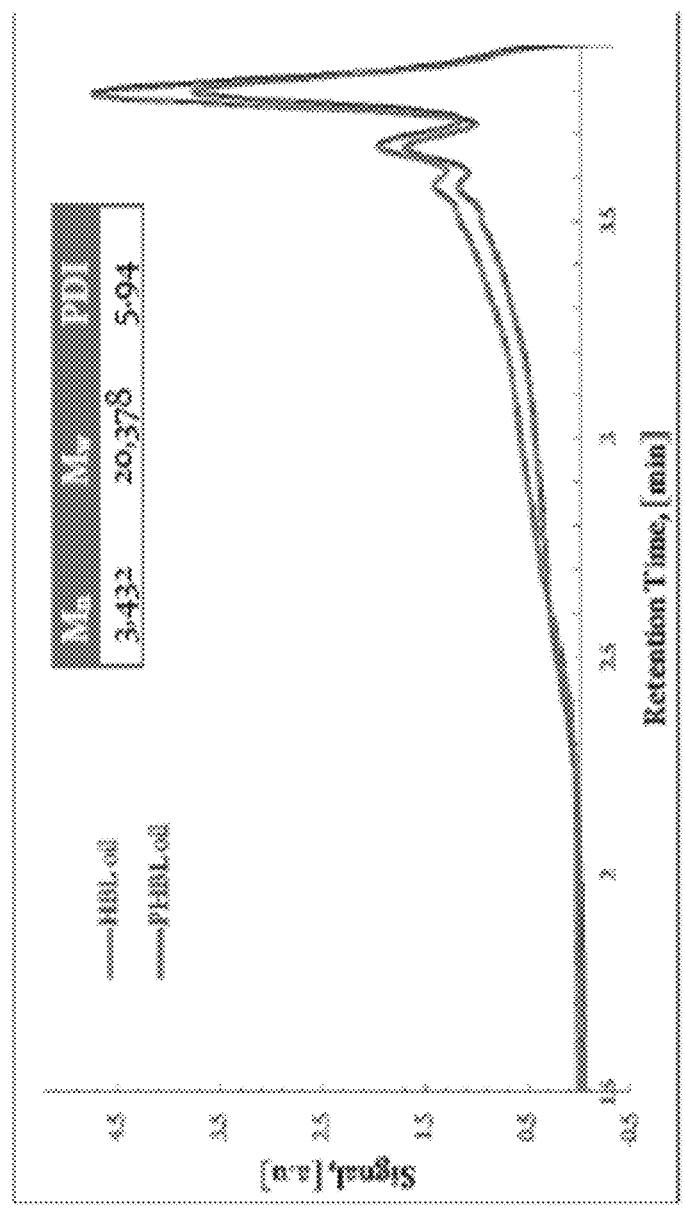
FIG. 20 is a size exclusion chromatography graph comparing HBL and PHBL samples.
Figure 21:
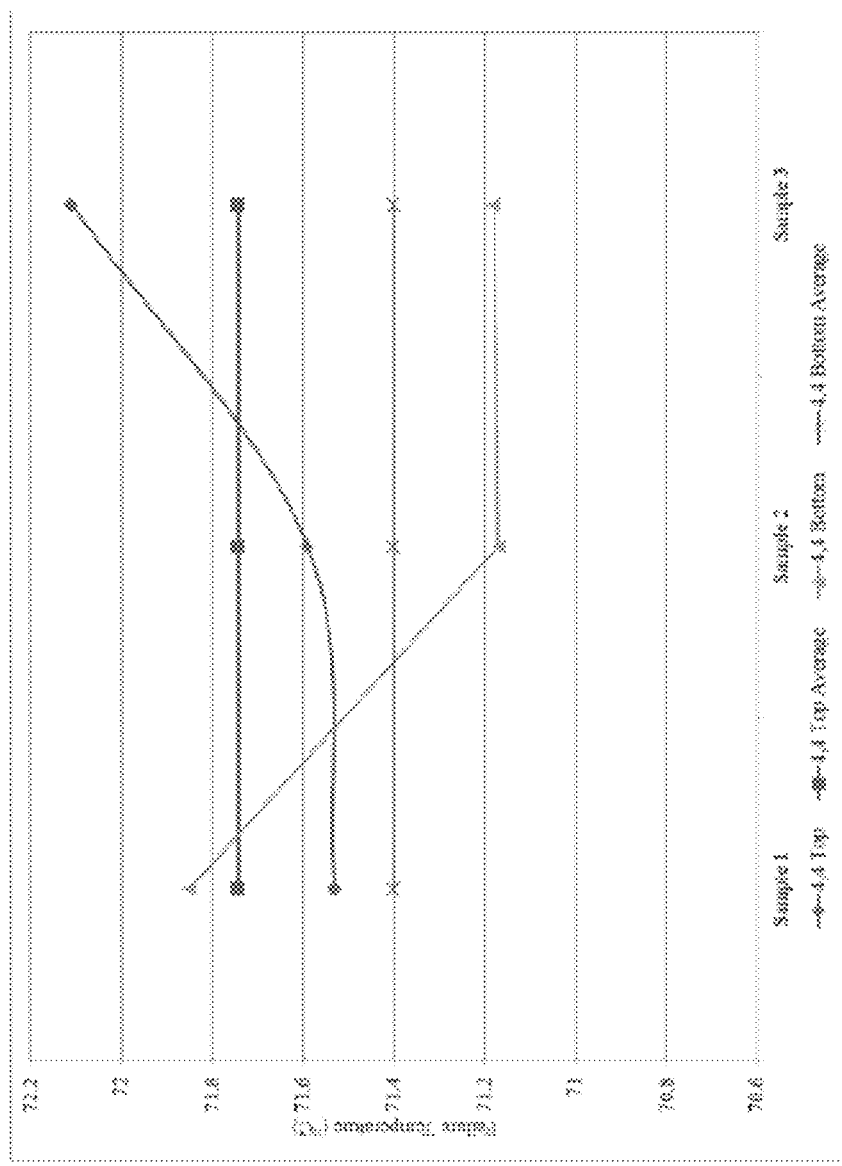
FIG. 21 depicts results of separation testing for 4% HBL+4% PHBL.
Figure 22:
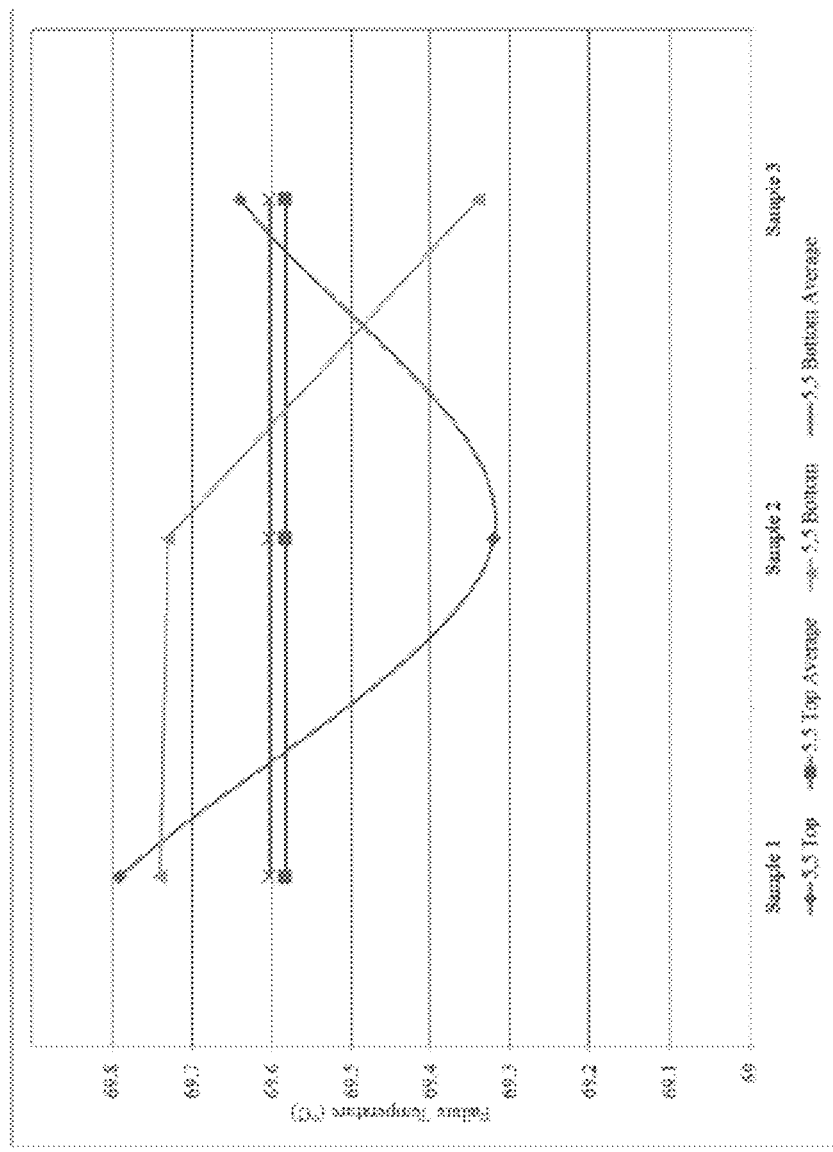
FIG. 22 depicts results of separation testing for 5% HBL+5% PHBL.
Figure 23:
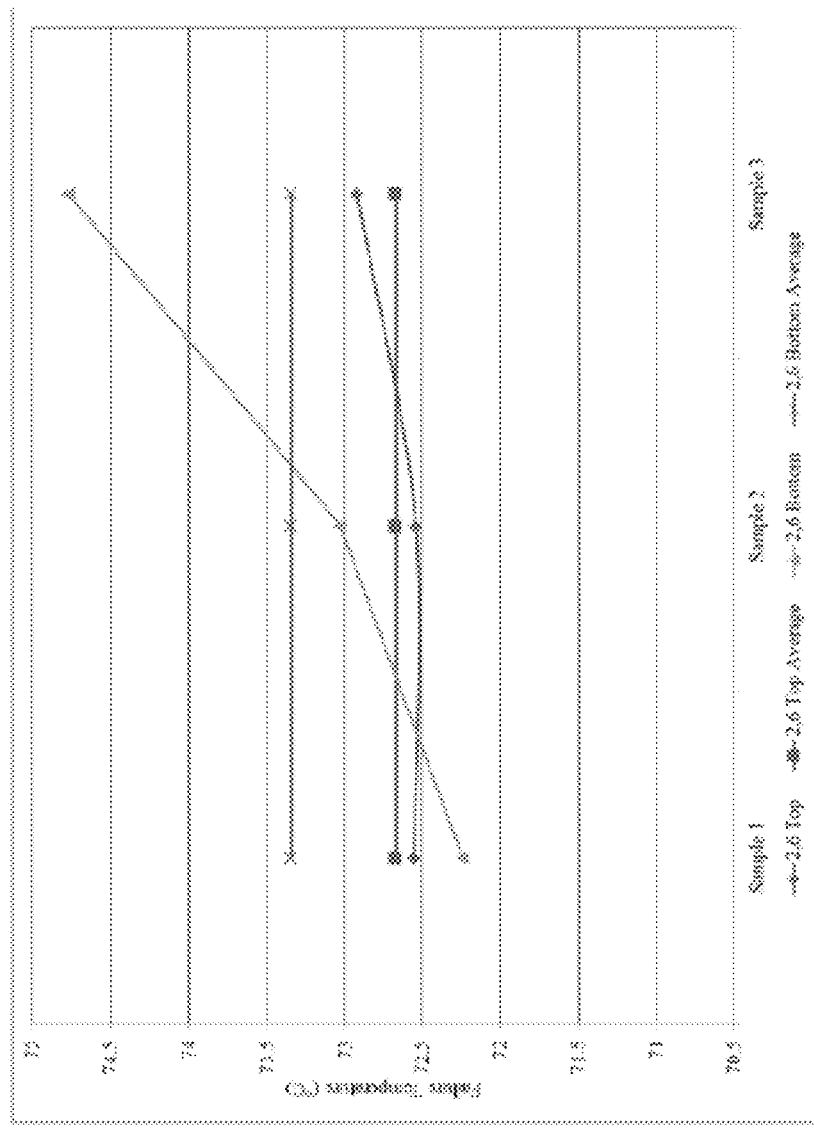
FIG. 23 depicts results of separation testing for 2% HBL+6% PHBL.
Figure 24:
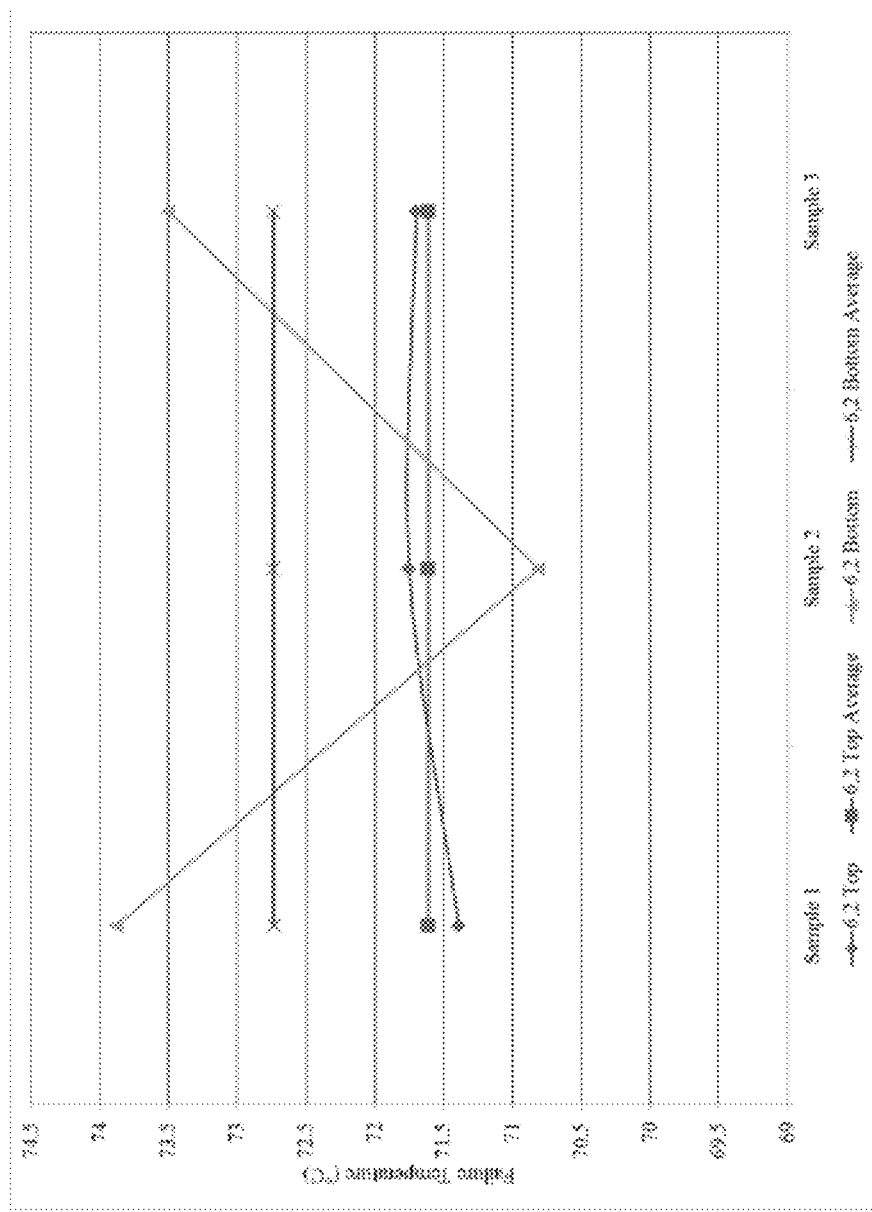
FIG. 24 depicts results of separation testing for 6% HBL+2% PHBL.

Size exclusion chromatography ("SEC")—SEC is a chromatographic technique utilized to calculate the molecular weight of the sample. FIG. 20 shows the SEC graph of HBL and PHBL samples and no apparent change in molecular weight can be seen.

Example 19—Mass Loss

Mass loss is an important consideration when determining a material's value for rejuvenating stiffer binders. The maximum acceptable mass loss for a Superpave binder is one percent loss during RTFO aging. For this study, the mass loss was not shown to be highly variable. The control binder showed relatively low mass loss as summarized in Table 20. There is no clear trend in the data that shows as dosage level increases for each combination's BDM, the mass loss increases.

TABLE 20

Mass Loss of PG 58-28 with/without bio-derived variants

| Additive | Average Mass Loss (%) |
| --- | --- |
| None | 0.16 |
| 3% HBL | 0.58 |
| 1.5% HBL + 1.5% PHBL | 0.27 |
| 3% PHBL | 0.41 |
| 1.5% PHBL | 0.60 |
| 1.5% HBL | 0.53 |
| 3% HBL + 3% PHBL | 0.42 |
| 1% PHBL | 0.32 |
| 1% HBL | 0.62 |
| 1% HBL + 1% PHBL | 0.55 |
| 1% HBL + 0.5% PHBL | 0.66 |
| 0.5% HBL + 1% PHBL | 0.56 |
| 2% HBL + 1% PHBL | 0.46 |
| 1% HBL + 2% PHBL | 0.50 |
| 4% HBL + 4% PHBL | 0.48 |
| 5% HBL + 5% PHBL | 0.39 |
| 2% HBL + 6% PHBL | 0.39 |
| 6% HBL + 2% PHBL | 0.61 |

Example 20—Separation Testing Results

The separation tests are performed on the binders containing 4% HBL+4% PHBL, 5% HBL+5% PHBL, 2% HBL+6% PHBL, and 6% HBL+2% PHBL by weight of the total binder. The separation testing was performed by placing VTB in metal cylindrical tubes, crimping the top of the tube closed and storing at 163° C. for 48 hours. After 48 hours, the tubes were carefully placed vertically in a freezer for four hours, after which the tubes were cut into thirds. For each tube, three DSR tests will be conducted on both the top and bottom thirds of the tubes. If separation is not identified at the higher dosage level combinations, it is reasonable to expect that lesser amounts will also not have separation issues. For comparing the separation tests, the temperature at which the binder failed in the DSR original binder test was chosen. Comparisons of the failure temperature for the top and bottom portions of each sample are shown for each of the VTB/BDM blends tested in FIGS. 21-24. The graphs for each of the VTB/BDM blends show the failure temperature for the top and bottom of each sample tested. The red lines show the average failure temperature for the top and the purple lines show the average for the bottom.

The test results show virtually no evidence of separation in the VTB/BDM blends for the 4% HBL+4% PHBL, 5% HBL+5% PHBL, 2% HBL+6% PHBL, and 6% HBL+2% PHBL by weight of binder. The results presented in this section are applicable to the VTB blended with the two BDM using a shear mill at 3000 rpm for one hour at 150° C.±10° C. The top and bottom also show only slight differences. Separation between the BDM and the VTB in the blends is not shown to be a concern.

Example 21—Conclusions

The findings from low temperature and intermediate temperature testing within this study show that a combination of HBL and PHBL can be successfully used as rejuvenators of VTB and perform equally or better than a commercial rejuvenator out in the current market. Through statistical analysis it was shown that at low temperature HBL and PHBL at dosage rates of 5% by weight of the VTB binder combined improve performance significantly by lowering the stiffness and thus increasing fracture energy. At intermediate temperatures, it was shown that both rejuvenators reduced stiffness in the dynamic modulus test compared to the control VTB group, but were found to not be significantly different from one another.

From the above results, it can be concluded that the bio-derived materials via vegetable oil (HBL and PHBL) can be used as rejuvenators and/or fluxes of stiffer asphalt binders such as vacuum tower bottoms and have the potential to change the original binder performance grade from 76-10 to PG 70-22 and PG 64-22 binder grades. The testing plan included an extensive binder testing plan to fully evaluate the potential of the two vegetable derived materials and to determine optimal dosage levels for each material. Binder testing showed how each BDM impacted rheological properties. The main objectives were to address feasibility as well as potential concerns and benefits of using of the bio-derived materials as a rejuvenator and/or flux.

The binder specific gravity testing showed little change with increasing dosage level of each of the two BDM which would not significantly impact mix volumetric calculations. Mass loss data showed little variability and usually increased once the BDM was added to the VTB. Yet the mass loss criterion of 1.0% was met for all the dosage combinations of the heated bodied linseed oil and partially hydrogenated heated bodied linseed oil. The VTB control group is very stiff as the viscosity at 135° C. is 1.204 Pa*s, while, at the highest dosage level combination of 5% HBL+ 5% PHBL, the viscosity at 135° C. is 0.652 Pa*s. This is almost a 50% drop in viscosity. The DSR test results verify that achieving a high temperature grade of PG 70 and 64 is possible, but only by using both HBL and PHBL in combinations of over 3% and 3%. The bending beam rheometer tests show that to achieve a low temperature PG grade of −22, 3% of HBL and 3% PHBL must be used in combination. From the analysis using the prediction equation, it was found that there must be both materials blended with the VTB to achieve a −22 low temperature grade. The data gathered from testing was successfully used to create linear multiple regression models with coefficient of determination greater than 90% for predicting viscosity, RTFO DSR, and BBR results. Overall, a dosage rate of at least 3.8% heated bodied linseed oil and 3.0% partially hydrogenated heated bodied linseed oil must be used for achieving a performance grade of 70-22 with the vacuum tower bottoms. To achieve a performance grade of a 64-22, a dosage rate of at least 4.7% heated bodied linseed oil and 6.5% partially hydrogenated heated bodied linseed oil should be used.

Example 22—Further Experimental Materials and Methods

Material Description—VTBs are a very stiff form of asphalt binder that typically have a performance grade (PG) of 76-10, 82-10, or 82-16. Within this invention, two non-commercial BDMs were used; Heat Bodied Linseed Oil (HBO), and Partially Hydrogenated Heat Bodied Linseed Oil (PHBO), while a commercially available bio-derived rejuvenator—commercial modifier (CM) derived from Tall oil was also used. The BDMs used are produced from locally grown materials in the Midwestern United States and are easy to come by, while the commercial modifier, CM is a popular rejuvenating agent for asphalt binders, and mixtures in the Midwestern United States. Past literature has shown that it is possible to convert heavier asphaltenes into maltenes through hydrogenation reactions (Xu et al., "Hydro-Treatment of Athabasca Vacuum Tower Bottoms in Supercritical Toluene With Microporous Activated Carbons and Metal-Carbon Composite," Fuel 88:2097-2105 (2009), which is hereby incorporated by reference in its entirety). It is thus felt that because one of the two linseed derived materials, part of the BDM combination is PHBO, this could cause a reversal of asphaltenes to maltenes during the blend process. All VTBs have much more asphaltenes than maltenes. Thus, this process could be repeated with other sources of VTB. However, one source of vacuum tower bottoms from an Illinois refinery with a penetration grade of 20-30 and a performance grade (PG) of PG 76-10 was used for the work embodied in this set of further examples due to local availability. The properties for the non-commercial BDMs, HBO, and PHBO are shown in Table 1, supra.

There is only 1 glass transition temperature ($T_g$) for HBO as it is an oily like liquid. However, there are 2 $T_g$s for PHBO as it is a wax type material and has two different phases at which the material changes in terms of the glass transition temperature. The melting temperature for PHBO is relevant because below the temperature of 42.92° C. there are big differences between viscosities of HBO and PHBO. Once PHBO is at 45° C. the viscosity results drop dramatically and by 65° C. are lower than viscosity results for HBO. The two materials are added at the same time to VTB during blending. HBO is poured in like a liquid while PHBO is scooped out of a can and put in the VTB before blending. Both HBO and PHBO have specific gravities similar to asphalt binder. For binder preparation, the BDMs HBO and PHBO, as well as a commercial rejuvenator CM were shear blended with VTB at 155° C.±5° C. at 3000 rpm for one hour using a Silverson shear mill. After all blending combinations were created, unaged materials were tested in the DSR. Subsequently, the materials were then short term aged in a RTFO and material was reserved for DSR testing. Remaining RTFO aged material was aged in a pressure aging vessel (PAV)—long term aging for subsequent testing in a DSR. Five groups were tested and examined; VTB control group, 3% HBO+3% PHBO, 5% HBO+5% PHBO, 6% CM, and 10% CM. All the rejuvenator materials were added to VTB by percent weight of the binder.

In past testing at Iowa State University, separation testing was done on VTB modified with the combination of HBO and PHBO as well as the commercial rejuvenator, CM at the same dosages as those used for this section of further examples. This testing was done in accordance with ASTM D7173-14 and unaged binder testing was done in accordance with AASHTO T 315-10. The timing between the different procedures for this current set of further examples was kept the same for the five binders in question, and the specimens all went through the same temperature regime. The specimen temperature testing regime is further explained below.

Binder Test and Analysis Methods—A Dynamic Shear Rheometer (DSR) was used to test three specimens from each group at each aging condition as shown in Table 21.

TABLE 21

Experimental Test Plan for DSR Use

| Description | Original | RTFO | PAV |
|---|---|---|---|
| Control | XXX | XXX | XXX |
| 3% HBO + 3% PHBO | XXX | XXX | XXX |
| 5% HBO + 5% PHBO | XXX | XXX | XXX |
| 6% CM | XXX | XXX | XXX |
| 10% CM | XXX | XXX | XXX |

Note:
X represents 1 specimen.

The DSR was used to test the specimens at multiple frequencies (23 frequencies ranging between 0.1 Hz and 10 Hz) and at several temperatures (20° C., 35° C., 50° C., 65° C., and 80° C.). Using the information gained from frequency sweeps across several temperatures $|G_b^*|$ master curves and black diagrams were developed (American Association of State Highway and Transportation Officials, (AASHTO). Determining the rheological properties of asphalt binder using a dynamic shear rheometer (DSR), In: T 315-10, Washington, DC., which is hereby incorporated by reference in its entirety).

The DSR tests were carried out with the same sample/specimen at different temperatures. The gap and the diameter for unaged, RTFO aged (short-term aged), and PAV aged (long-term aged) testing was 1 mm, and 25 mm at temperatures 50° C., 65° C. and 80° C., while at 20° C. and 35° C. the gap and diameter were held at 2 mm and 8 mm. The strain levels were kept constant at each temperature for the frequency sweep. However, at lower temperatures of 35° C. and 20° C., the strain was held at 1% strain, while at 50° C., 65° C., and 80° C., the % strain was held at 10%. These criteria were based on the requirements used for PG grading of an asphalt binder in a DSR. At low temperatures, 1% strain and 2 mm gap with 8 mm diameter are typically used due to fatigue cracking being examined, while at higher temperatures 10% strain and 1 mm gap with 25 mm diameter are more commonly used because rutting is examined at high temperatures.

Before testing began verification of strain rates needed to keep testing within the linear viscoelastic range was done. A strain sweep was run from 0.5% to 15% with logarithmic ramping for 10 rad/s frequency at each of the five temperatures (20°, 35° C., 50° C., 65° C., and 80° C.) was done using the VTB control group to determine the percent strain needed to stay in the linear viscoelastic range. The specimens tested at 50° C., 65° C., and 80° C. were done with a 25 mm parallel plate with 1 mm gap while the specimens tested at 20° C., and 35° C. were done using an 8 mm parallel plate with 2 mm gap. The percent strain rate determined was 1% for 20° C., and 35° C. were done using an 8 mm parallel plate with 2 mm gap, while the percent strain rate determined for 50° C., 65° C., and 80° C. were done with a 25 mm parallel plate with 1 mm gap was 10%.

Master Curves and Black Diagrams—Within this research a modified sigmoidal function developed by Marasteanu and Anderson (Marasteanu, M. & Anderson, D., "Improved Model for Bitumen Rheological Characterization," In: Eurobitume Workshop on Performance Related Properties for Bituminous Binders," Belgium: European Bitumen Association Brussels (1999), which is hereby incorporated by reference in its entirety) was used to construct binder shear complex modulus $|G_b^*|$ and phase angle ($\delta$) master curves. The mathematical expression of the modified sigmoidal function is shown in Equation (13) for log $|G_b^*|$. When constructing the phase angle master curve $|G_b^*|$ is substituted by $\delta$. Equations (14) and (15) represent the fitting of the shift factors through a second order polynomial function.

$$\log|G_b^*| = \delta + \frac{\alpha}{1 + e^{\beta+\gamma(\log f_r)}} \quad (13)$$

$$a(T) = \frac{f}{f_r} \quad (14)$$

$$\log(a(T_i)) = aT_i^2 + bT_i + c \quad (15)$$

where
$|G_b^*|$=binder shear complex modulus (Pa);
$f_r$=reduced frequency of loading at reference temperature (Hz);
$\delta$, $\alpha$, $\beta$, $\gamma$=coefficients;
a(T)=shift factor as a function of temperature;
f=frequency of loading (Hz);
T=temperature (° C.);
$a(T_i)$=shift factor as a function of Temperature $T_i$;
a, b, c=coefficients for shift factor.

To construct a master curve the principle of time-temperature superposition must be used with data gained from testing at several frequencies and temperatures in conjunction with Equations (13)-(15). A completed asphalt binder master curve is a representation of an asphalt binder's stiffness/phase angle behavior at the reference temperature over many more frequencies than were used for testing. It is also possible to determine shift factors for temperatures not used that are within the range of tested temperatures. This enables the construction of master curve of $|G_b^*|$ and $\delta$ against temperature. For this work a reference temperature of 50° C. will be used.

Black diagrams are very powerful in terms of identifying DSR data issues as they do not require shifting to create one curve from data measured at different test temperatures. In a Black diagram shifting does not occur due to the fact that phase angle is plotted against $|G_b^*|$ regardless of test temperature (Airey, G. D., "Use of Black Diagrams to Identify Inconsistencies in *Rheological Data. Road Mater Pavement Des.* 3:403-24 (2002); Marasteanu, M. & Anderson, D., "Techniques for Determining Errors in Asphalt Binder Rheological Data," *Transport Res. Rec.: J. Transport Res. Board* 1766:32-9 (2001); Ramond et al., "Exploring Qualitative Measures of Complex Modulus: Importance of Black Space," In: *Eurobitume Congress*, Brussels, Belgium, all of which are hereby incorporated by reference in their entirety). This also means that errors made in temperature measurement are not displayed in a Black diagram. Smooth Black diagram curves result when asphalt binder is characterized as being a thermo-rheological simple material tested in the linear region and errors do not occur during testing. However, if factors such as testing in the non-linear region, testing errors, and if the asphalt binder is not simply thermo-rheological, then the data sets from the different temperatures will show up as separate lines from one another (Marasteanu, M. & Anderson, D., "Techniques for Determining Errors in Asphalt Binder Rheological Data," *Transport Res. Rec.: J. Transport Res. Board* 1766:32-9 (2001); Ramond et al., "Exploring Qualitative Measures of Complex Modulus: Importance of Black Space," In: *Eurobitume Congress*, Brussels, Belgium, both of which are hereby incorporated by reference in their entirety). For the purpose of this portion of the invention, Black diagrams will be used to examine differences between the five groups within each aging category and between aging categories. They can be expressly used to show if the phase angle is changing positively, or negatively as well if the stiffness is decreasing or increasing.

Example 23—Discussion of Results and Analysis

Figure 29:
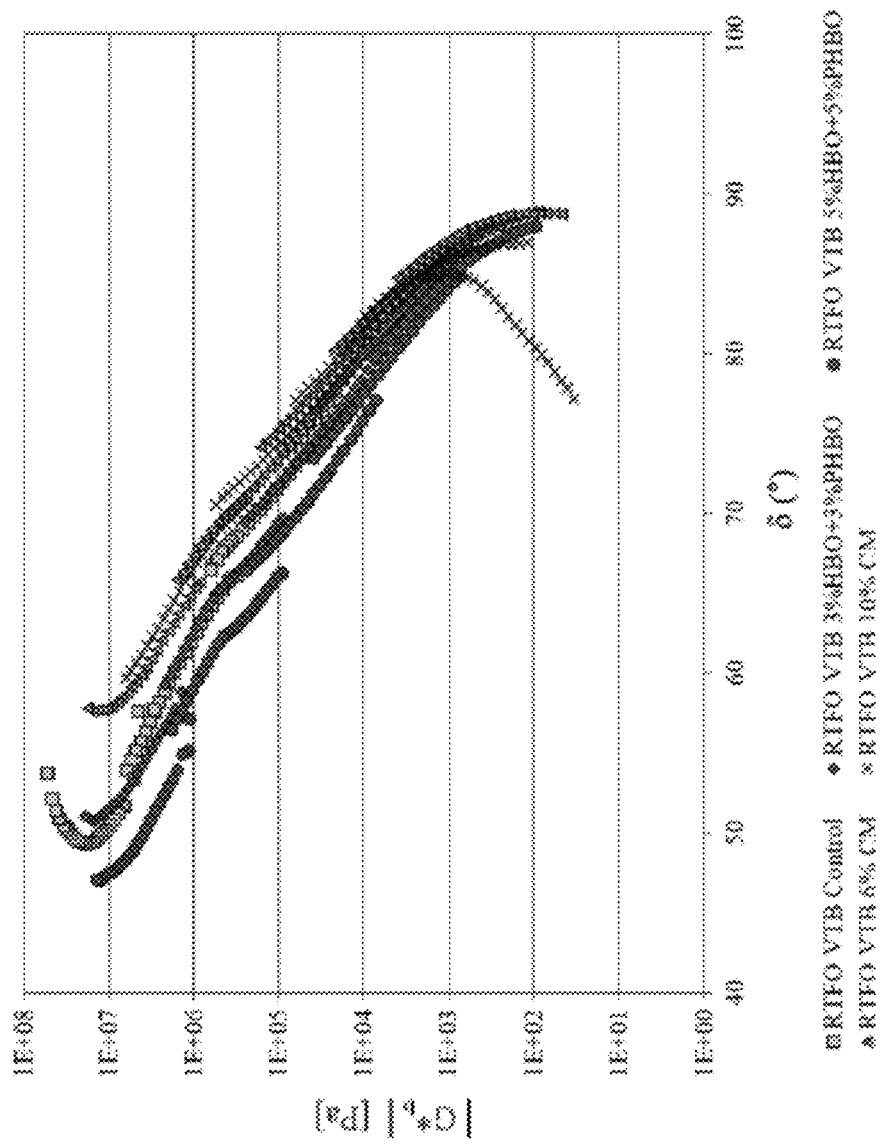
FIG. 29 shows average short-term aged black space diagrams.

Using the sigmoidal function, binder shear complex modulus ($|G_b^*|$) master curves were developed for three aging conditions (unaged, short-term aged, and long-term aged) using the results gained from testing three specimens from each of the five groups. The $|G_b^*|$ and δ master curves are shown in FIGS. 25A-25B, 27A-27B, and 30A-30B. Additionally the un-shifted data for each group at each aging condition was used to generate Black Space diagrams ($|G_b^*|$ vs. δ) as shown in FIGS. 26, 29, and 31.

Figure 25A:
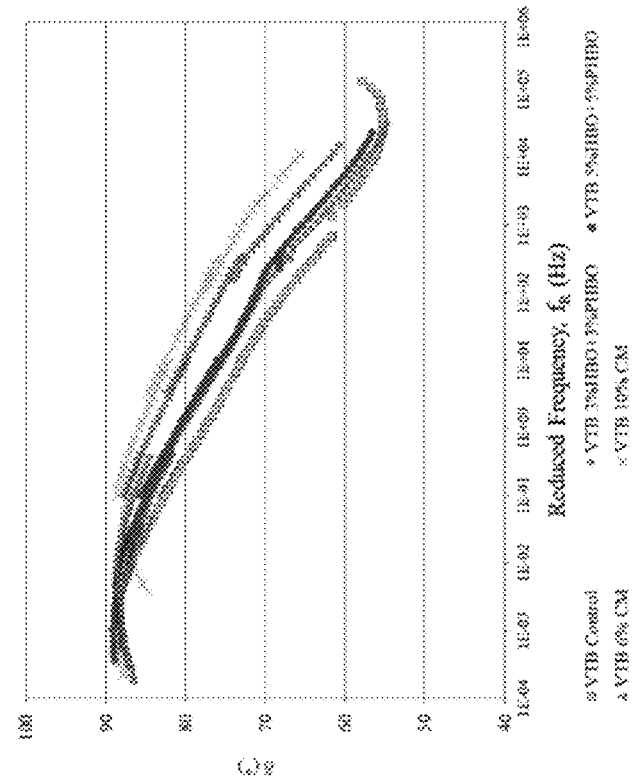
FIGS. 25A-25B shows average unaged |$G_b^*$| (FIG. 25A) and average unaged δ master curves (FIG. 25B).
Figure 26:
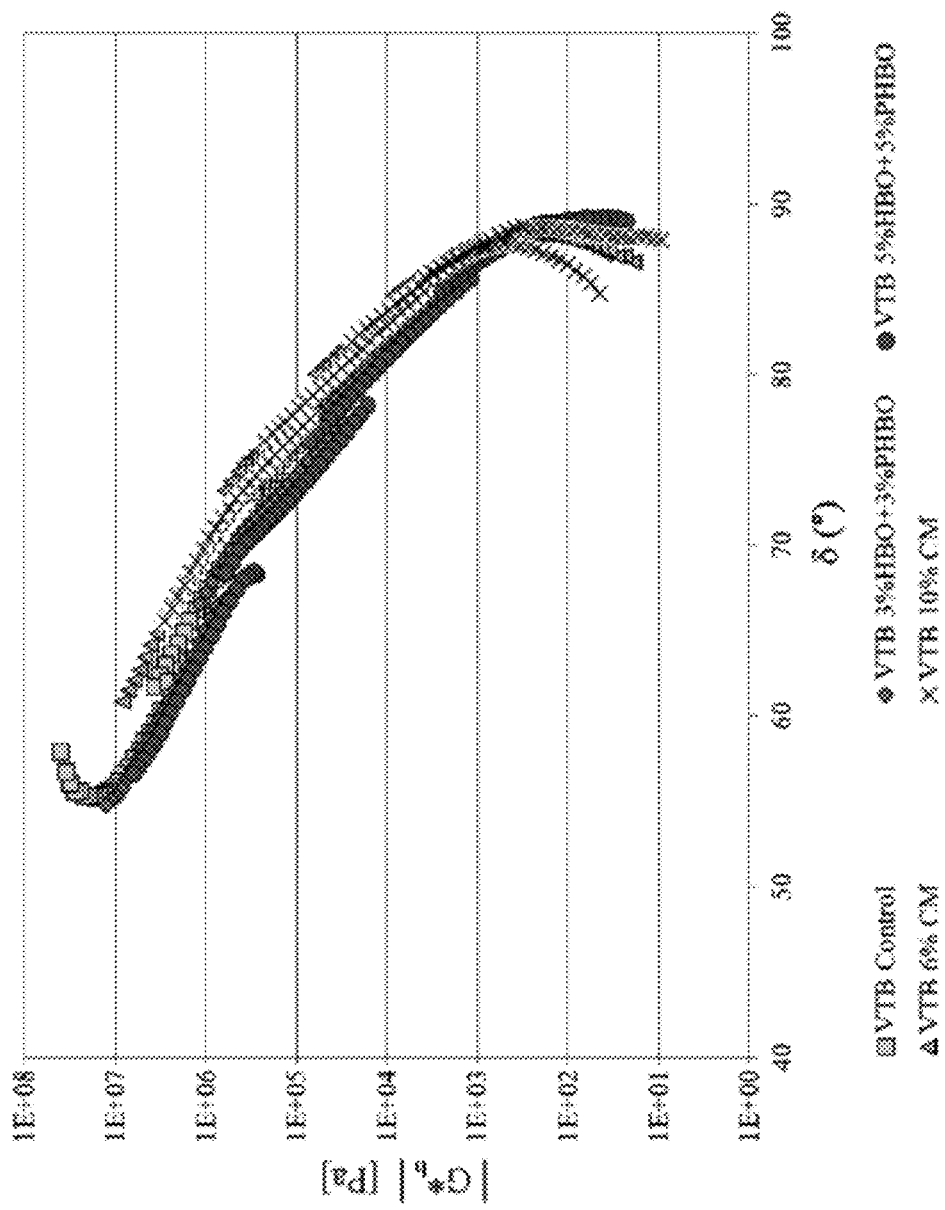
FIG. 26 shows average black space diagrams.

Unaged Results—From the unaged results shown in FIG. 25A for $|G_b^*|$ vs. Reduced Frequency all the rejuvenators at their various dosages appear to shift the VTB curve to the right downward, e.g. decrease the stiffness across all reduced frequencies. The group with the lowest unaged stiffness is the VTB modified with 10% CM. Visually, the VTB has the highest unaged stiffness across all reduced frequencies. What is interesting is that VTB modified with HBO+PHBO has similar unaged stiffness at higher reduced frequencies compared to VTB modified with CM while at lower reduced frequencies VTB modified with HBO+PHBO shows increased stiffness over that of CM. This shows that CM and HBO+PHBO have different effects on the viscoelastic nature of VTB, especially at lower reduced frequencies/high temperatures. Due to similar effects at low temperature on stiffness from both CM and HBO+PHBO, and the higher stiffness for HBO+PHBO at high temperatures, the temperature range could potentially be wider for the VTB modified with HBO+PHBO than for VTB modified with CM.

All the rejuvenators are shown to work, but some are more effective at reducing stiffness, such as 10% CM against the performance of 5% HBO+5% PHBO. CM might be better at reducing stiffness than HBO+PHBO over the whole length of the master curve, but might reduce the stiffness too greatly at high temperatures/low reduced frequencies, thus lowering the continuous grade range of the rejuvenated binder too much. Stiffness is only one aspect rejuvenators should affect in stiff binders, the other being the phase angle (to examine changes in viscoelasticity). The next visual inspection is of the phase angle master curve in FIG. 25B.

Figure 25B:
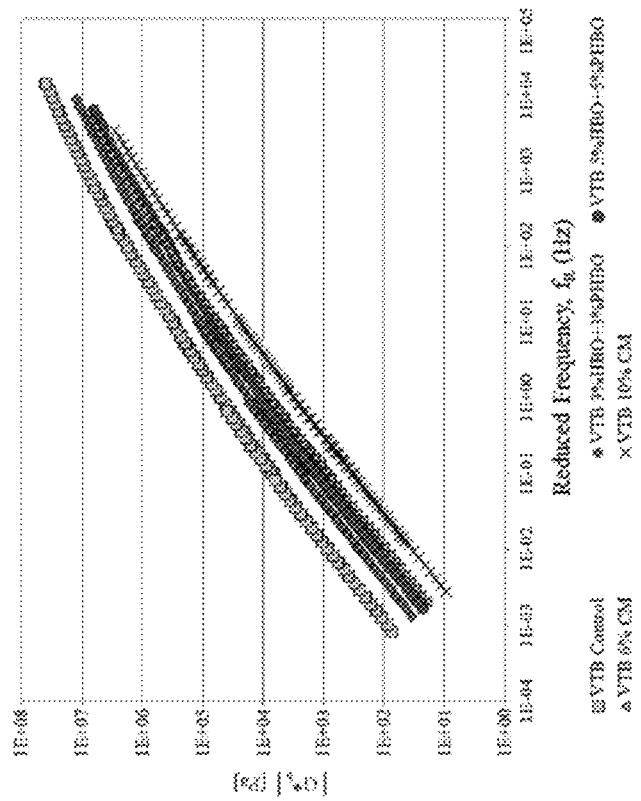

From the phase angle master curve shown in FIG. 25B, none of the rejuvenators have lower phase angles than the VTB control at higher reduced frequencies/low temperatures, while at the lowest reduced frequencies/highest temperatures all of the rejuvenators have similar results as that of the control. Visually, it can be seen that as the rejuvenator dosage increases, the phase angle increases with increased lowering of temperatures. This effect is more dramatic for CM than for HBO+PHBO. Even though it appears that phase angle values are higher as the temperature goes down for CM and HBO+PHBO, the effects are offset by a decrease in stiffness at low temperatures. Thus, the VTB material modified with CM and HBO+PHBO is exhibiting the properties of a rejuvenated binder. To look closer at the effect of the rejuvenators on phase angle when no shifting occurs the unaged results were also examined using Black Space diagrams in FIG. 26.

From the Black Space diagram shown in FIG. 26, it is not definitively clear what effect the rejuvenators are doing to the VTB at high temperatures. The location for data from high temperatures is from phase angle 85° to 90° and from $|G_b^*|$ 1000 Pa to 10 Pa. The VTB modified with 10% CM is slipping at high test temperatures due to the extreme softness of the modifier as illustrated by the reduced phase angle at low $|G_b^*|$ values. When looking at the low test temperature results, the phase angles 55-70° and $|G_b^*|$ of 40,300,000 Pa to 500,000 Pa show softening for all results for all the rejuvenator groups, however changes in phase angle are different between CM and HBO+PHBO. The rejuvenator CM softens the VTB, but increases the phase angle, thus increasing the viscous nature of the binder at low temperatures. The opposite is true for HBO+PHBO, it softens the VTB, and slightly decreases the phase angle, and thus makes the VTB more elastic in nature. Whether or not a rejuvenator works well cannot be decided simply from unaged data, but through examination of short-term aged, and long-term aged data along with statistical analysis as shown in preceding examples.

Figures 27A, 27B:
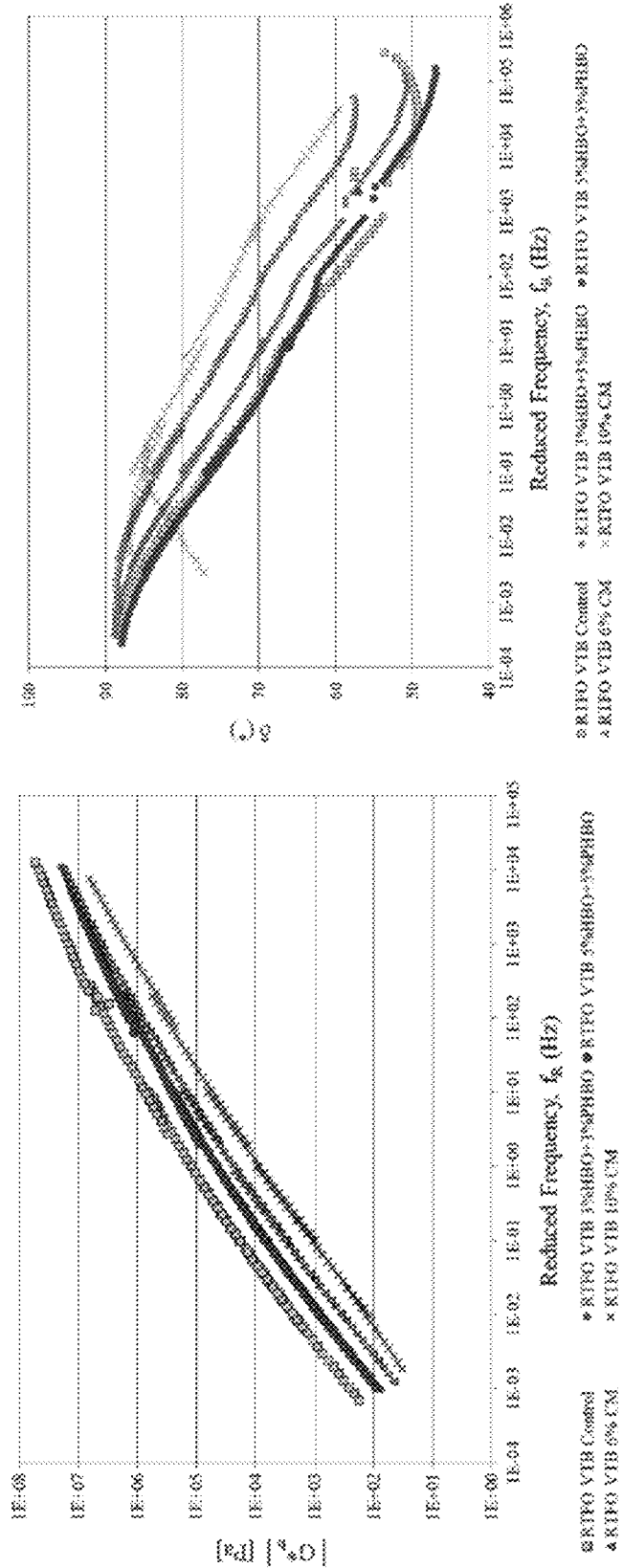
FIGS. 27A-27B depicts average short-term aged |$G_b^*$| (FIG. 27A) and average short-term aged δ master curves (FIG. 27B).
Figures 28A, 28B:
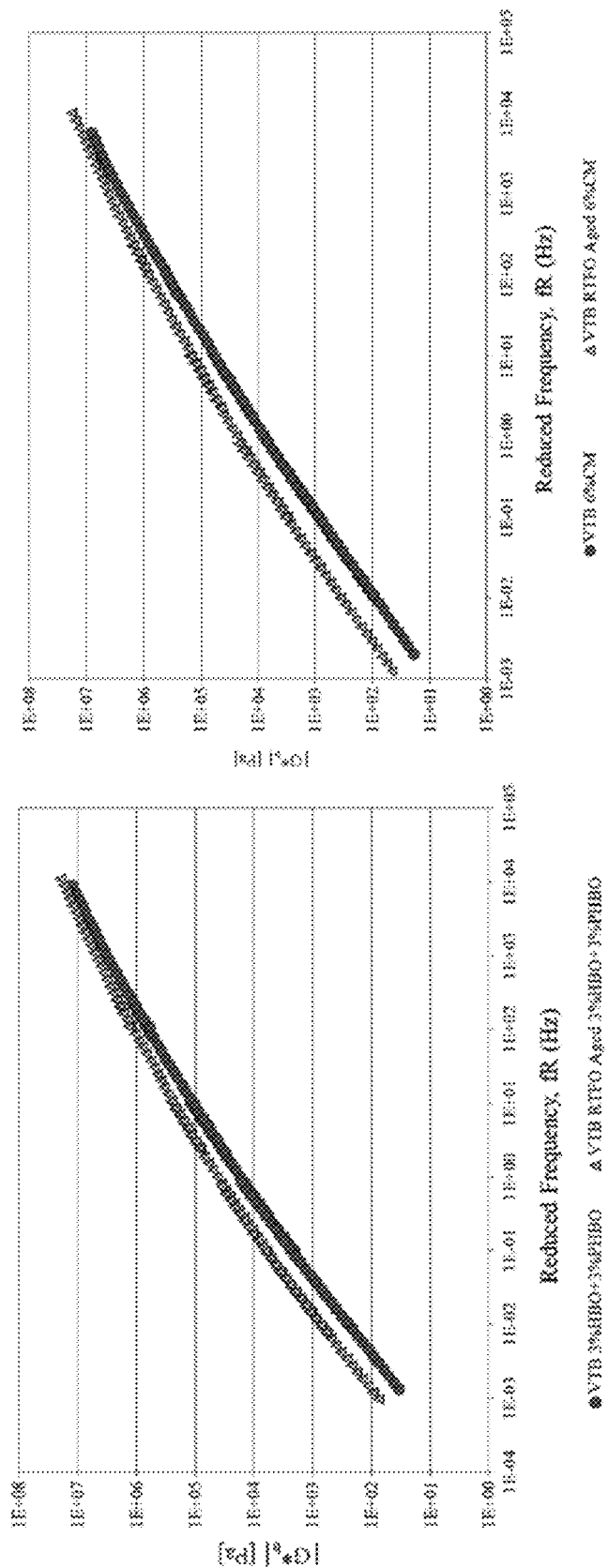
FIG. 28A-28B shows a comparison of unaged and short-term aged master curves for 3% HPB)+3% PHBO (FIG. 28A) and 6% CM (FIG. 28B).

RTFO (Short-Term) Aged Results—All of the rejuvenator groups shift the VTB control curve to the right downward, e.g. decrease the stiffness across all reduced frequencies in FIG. 27A for the short-term aged results. The same trend seen for the unaged data is not seen between the groups (6% CM, 3% HBO+3% PHBO, and 5% HBO+5% PHBO) for the short-term aged data. By comparing unaged to short-term aged results there is a slight stiffening of all the rejuvenator groups with short-term aging. This slight stiffening between unaged and short-term aged materials is shown in FIGS. 28A-28B for 3% HBO+3% PHBO, and 6% CM. It should be noted that the VTB control group only stiffens with short-term aging at the low frequency/high temperature side of the master curve plot, but not at the high frequency/low temperature side of the plot. As seen for the unaged results VTB modified with 10% CM shows the lowest stiffness for short-term aged results. Visually, it may seem there is only a slight stiffening due to short-term aging, but it is possible changes are much more dramatic. This is because results are presented in log-log scale. To more closely examine how big of an effect short-term aging had on stiffness, percent difference values were determined from the measured data as shown in Table 22.

TABLE 22

$|G_b^*|$ % Difference Between Rejuvenators and Control for Unaged and Short-Term Aged Binders

| | DSR unaged | | DSR RTFO | |
|---|---|---|---|---|
| Name | $|G_b^*|$, kPa | % Diff from control | $|G_b^*|$, kPa | % Diff from control |
| Control | 3.09E+03 | 0.00 | 4.69E+03 | 0.00 |
| 3% HBO + 3% PHBO | 9.10E+02 | −70.53 | 1.57E+03 | −66.54 |
| 5% HBO + 5% PHBO | 4.58E+02 | −85.18 | 1.23E+03 | −73.73 |
| 6% CM | 5.43E+02 | −82.42 | 1.29E+03 | −72.48 |

As can be seen from the results, the effect from short-term aging is quite significant on stiffness. The changes are similar when using either BDMs or CM as a rejuvenator. Master curve plots only show the softening effect of the rejuvenators on the VTB, not the effects to the viscoelastic nature of the VTB.

The second visual inspection for master curve results is the phase angle master curve in FIG. 27B. In FIG. 27B, the majority of rejuvenators have phase angle results above the control VTB, except for the 5% HBO+5% PHBO modified VTB. The 5% HBO+5% PHBO modified VTB has phase angle results overlapping with the control VTB. The turn in the VTB control curve at the higher reduced frequencies and the twist of the 10% CM curve at low reduced frequencies are due to the material being too stiff (fracture occurring), and the material being too soft. For the rejuvenator CM the same trend is occurring as happened in FIG. 25B, when the rejuvenator dosage increases, the phase angle increases with increased lowering of temperatures. This effect is indicative of the greater difference between the storage and relaxation modulus for CM modified VTB than for HBO+PHBO modified VTB. For closer inspection of the effects from rejuvenator addition and dosage level on phase angle results Black Space diagrams are used as shown in FIG. 29.

From the Black Space diagram using short-term aged results, it still not clear if any effect is happening at high temperatures as shown from the range of phase angle 85° to 90° and from $|G_b^*|$ 1000 Pa to 15 Pa. However, it can be seen that even with short-term aging, the VTB modified with 10% CM is still too soft to test at higher temperatures as shown by the slipping in the test results at 80° C. when no slipping is seen at 65° C. When looking at the results from lower test temperatures, 20° C., 35° C., and 50° C. increasing combination dosage of HBO+PHBO has a beneficial effect on both the phase angle and $|G_b^*|$, through a decrease in phase angle up to 4° and a decrease in stiffness of up to 8,000,000 Pa. Increasing dosage of the commercial rejuvenator CM has the opposite effect on phase angle, but still decreases stiffness in short-term aged VTB. It increases the phase angle by as much as 100 at the lowest temperature 20° C., which means the modified VTB becomes much more viscous at low temperature. This observation seen in the short-term aged results agrees with the results seen in the unaged results for the commercial rejuvenator CM.

Figure 30A:
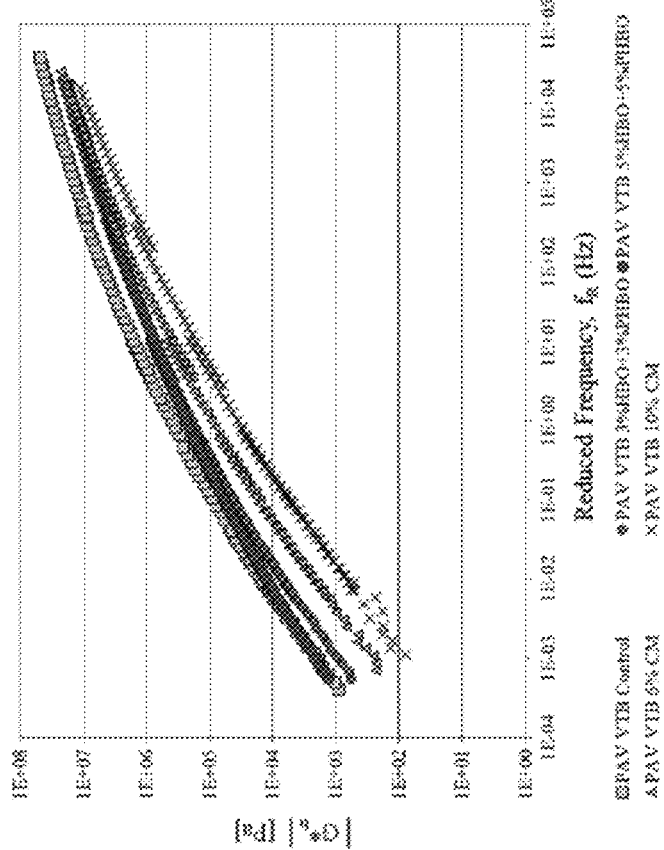
FIGS. 30A-30B show average long-term aged |$G_b^*$| (FIG. 30A) and average long-term aged δ master curves (FIG. 30B).
Figure 31:
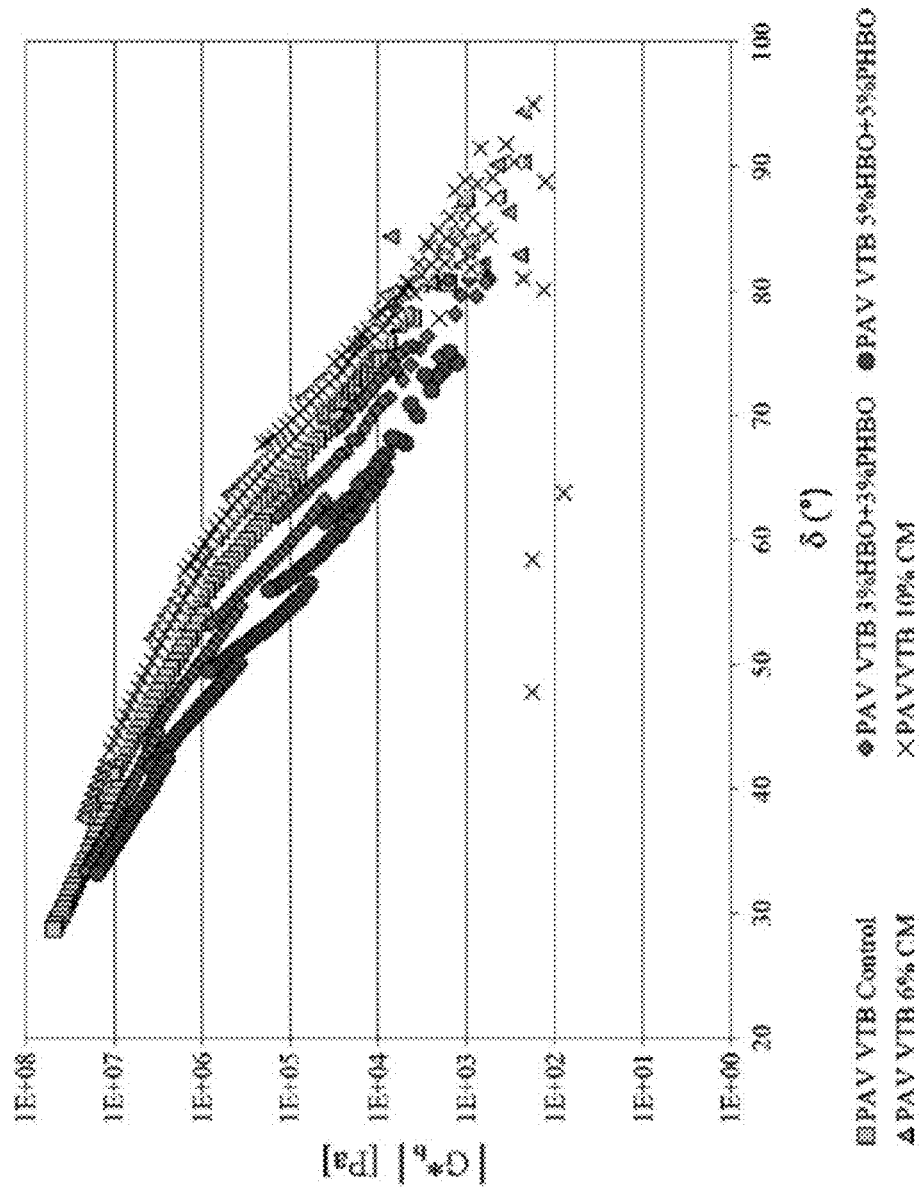
FIG. 31 depicts average long-term aged black space diagrams.

PAV (Long-Term) Aged Results—The four rejuvenator groups shift the VTB control curve to the right downward, e.g. decrease the stiffness more at higher reduced frequencies than at lower reduced frequencies as shown in FIG. 30A for the long-term aged results. Higher frequencies relate to lower test temperatures. However, the two rejuvenator groups with the commercial rejuvenator CM decrease stiffness immensely at lower frequencies/higher temperatures, while the two rejuvenator groups with HBO+PHBO have slightly lower stiffness at low frequencies/high temperatures when compared to the VTB control group. The two rejuvenator groups HBO+PHBO cause a slope shift from low to high frequencies (high to low temperatures) that rotates the curve downward towards the right while leaving the left portion of the curve unchanged. This means HBO+PHBO spread the grade range further from critical high to critical low temperature, while CM does not change the spread of the grade range, but rather shifts it downward overall at both critical high and critical low temperatures.

From this plot when comparing to previous plots in FIGS. 25A and 27A, aging is seen to have more of an effect on VTB modified with rejuvenators when short-term aging occurs rather than long-term aging. The effects of PAV (long-term) aging against that of no aging on the stiffness are shown in Table 23 through percent difference values.

TABLE 23

$|G_b^*|$ % Difference Between Rejuvenators and Control For Unaged and Long-Term Aged Binders, and PG Grades

| | DSR unaged | | DSR PAV | | | |
|---|---|---|---|---|---|---|
| Name | $|G_b^*|$, kPa | % Diff from control | $|G_b^*|$, kPa | % Diff from control | Continuous grade (° C.) | PG grade |
| Control | 3.09E+03 | 0.00 | 6.05E+03 | 0.00 | 80.5-14.1 | 76-10 |
| 3% HBO + 3% PHBO | 9.10E+02 | −70.53 | 2.47E+03 | −59.19 | 72.8-22.0 | 70-16 |
| 5% HBO + 5% PHBO | 4.58E+02 | −85.18 | 1.98E+03 | −67.31 | 68.4-26.0 | 64-22 |
| 6% CM | 5.43E+02 | −82.42 | 2.27E+03 | −6242 | 69.9-22.7 | 64-22 |
| 10% CM | 1.73E+02 | −94.40 | 9.82E+02 | −83.77 | 63.0-26.5 | 58-22 |

Additionally PG grades are shown for the five binders. From the results it can be seen that CM has a substantial effect on the high temperature PG, and could cause rutting problems. The percent difference results between long-term aged and unaged show the same trends as short-term aged to unaged difference results, however the percent difference values are slightly lower. These results clearly show that short-term aging has more of an effect on stiffness.

Figure 30B:
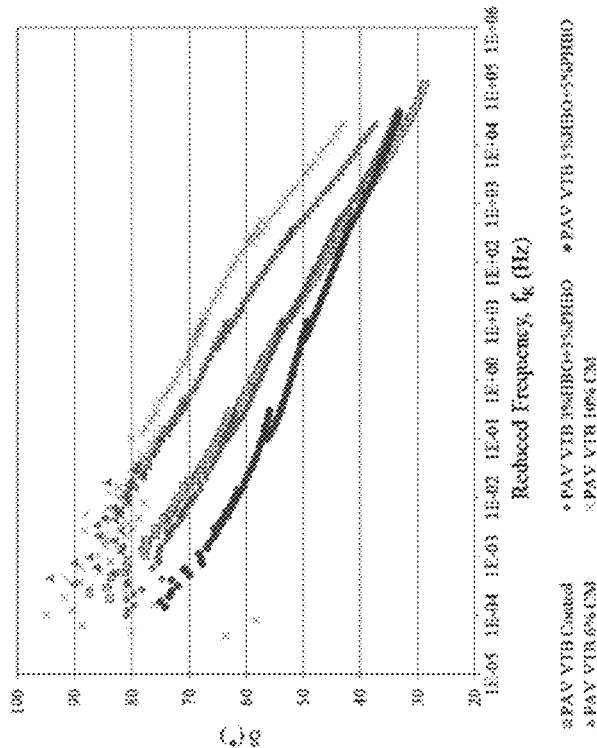

The average phase angle master curve results are shown in FIG. 30B. There are many discontinuities in the low reduced frequency/high phase angle domain of the plot. The trends for HBO+PHBO are very different from that of CM when compared to the control VTB. Groups with HBO+PHBO have lower phase angle results at lower reduced frequencies/higher temperatures while CM groups have the reverse compared to the control. The rejuvenator CM shows trends that are similar to the VTB control but are shifted up. This is not the case for HBO+PHBO, as it seems that there is a slope shift in the y-direction around one point (between 1E+03 and 1E+04 in reduced frequency). By comparing these results to those seen in FIG. 27B, it seems that HBO+PHBO lessening the effect of aging on the phase angle while CM is increasing the negative effect of aging on the phase angle at high temperatures/low reduced frequencies. To get a closer inspection on the effects of the rejuvenators on VTB after long-term aging without relying on shifting, a Black Space diagram was constructed as shown in FIG. 31.

At high temperatures, the Black Space diagram of long-term aged results in FIG. 31 shows that the rejuvenator groups using HBO+PHBO decrease the stiffness and phase angle from the results of the VTB control group, while CM does not decrease phase angle, but decreases stiffness to the point that slipping occurs during testing at 80° C. At low temperatures, HBO+PHBO decreases the stiffness, but not the phase angle. On the other hand, the rejuvenator CM decreases stiffness, and increases phase angle at low temperature. By looking at the lower temperature side of the plot, 20° C. and 35° C. (between phase angles 280 and 50°) if the rejuvenator causes the curve to be below the VTB control curve it can be inferred that there is increased elasticity of the binder at low and intermediate temperatures. However, if a rejuvenator causes the curve to be above the VTB control curve in this range of phase angles, then it can be there is increased viscosity at intermediate and low temperatures. Further statistical analysis is needed to quantify the results shown from the three aging conditions of the 4 rejuvenators groups and VTB control group.

Comparison of Aging and Other Effects Statistical Analysis—For the statistical analysis of the δ and |G$_b$*| results two separate analyses of variances (ANOVA)s were conducted to examine how the factors group name (rejuvenator), temperature, frequency, and age and their interactions affect performance. The statistical design used is a split plot repeated measured (SPRM) design. The whole plots are the modified VTB groups (group name), or five rejuvenator groups, and the whole plot treatment factor is age (3 aging conditions).

The split plots are the specimens within each of the treated whole plots (thus forty-five specimens in total). The split plot treatment factors are frequency and temperature. Randomization comes from varying the order of testing for the forty-five specimens used. The most important and interesting results (significant results) are described below.

Figure 32:
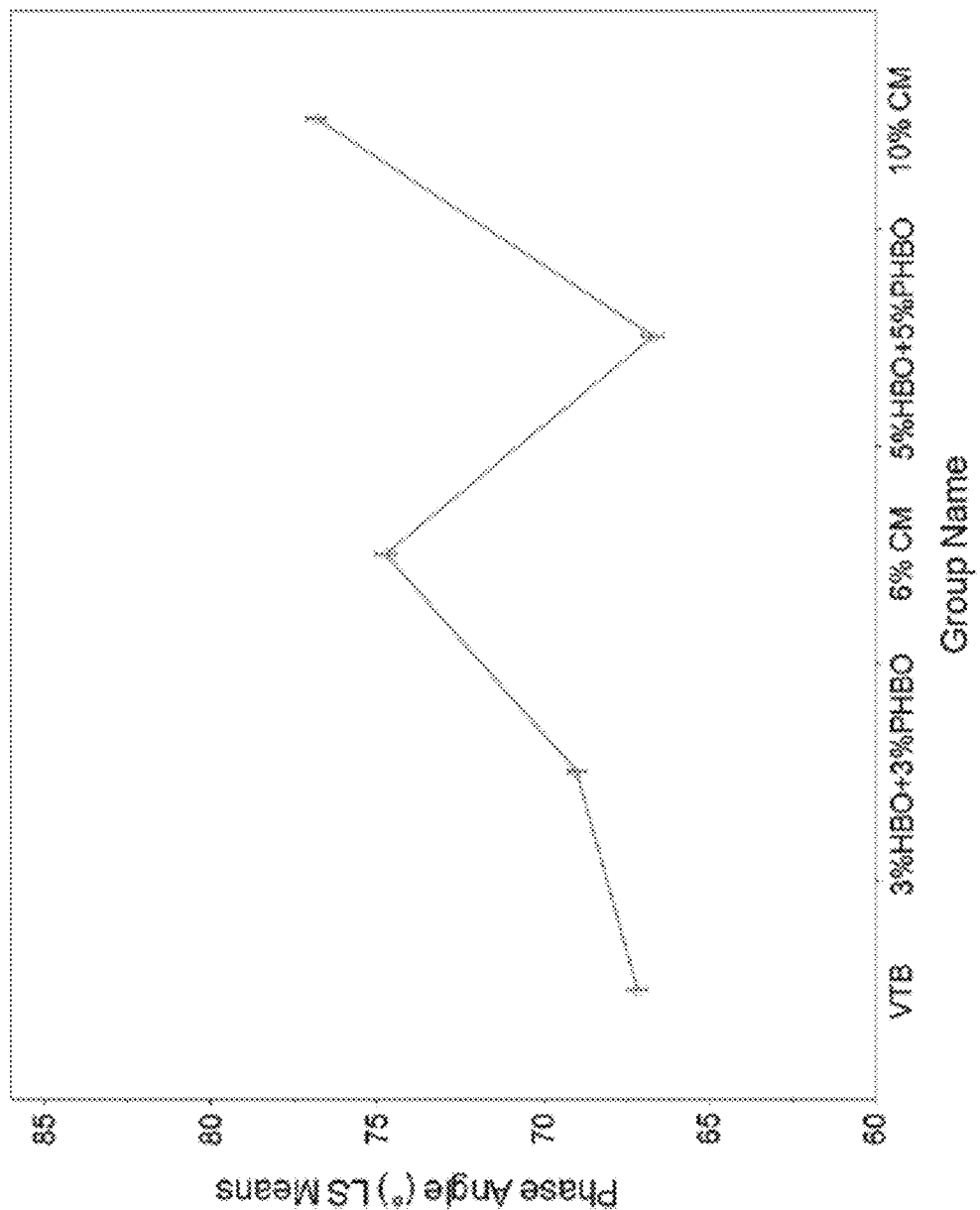
FIG. 32 represents a least square means plot by group name for phase angle (δ, °).

Phase Angle Results—FIG. 32 shows a plot of least square means values of phase angle with standard error bars for each binder tested. Due to the bars signifying standard error in each direction, it is not clear which groups are different from one another in terms of phase angle. However, it can be seen that when VTB is modified with the commercial rejuvenator CM, phase angle increases, thus implying increase in viscous nature of the binder. It is hard to tell if the rejuvenator HBO+PHBO increases or decreases the phase angle enough to change the nature of the VTB binder. To better examine if there is differences between the groups a Tukey honestly significant difference ("HSD") least square means difference test was done, where the results are shown in Table 24.

TABLE 24

Tukey HSD Least Square Means Difference of δ (°) For Group Name

| Level | | | | Least Sq mean |
|---|---|---|---|---|
| 10% CM | A | | | 76.84 |
| 6% CM | | B | | 74.77 |
| 3% HBO + 3% PHBO | | | C | 69.03 |
| VTB | | | D | 67.20 |
| 5% HBO + 5% PHBO | | | D | 66.72 |

Note:
Levels not connected by same letter are significantly different.

Levels that are not connected by the same letter are significantly different according to a 95% confidence interval. From the results shown, the group 5% HBO+5% PHBO is not different from the VTB control group in terms of phase angle performance. The other three rejuvenator groups (3% HBO+3% PHBO, 6% CM, and 10% CM) are significantly different from both the VTB control group and the 5% HBO+5% PHBO group. These three groups are also shown to be different from one another with 10% CM having the highest phase angle, and 3% HBO+3% PHBO having the lowest phase angle of the three aforementioned. This table of the differences gives a clearer picture of which rejuvenator groups are increasing the phase angle and thus increasing the viscous nature of the VTB binder, with 10% CM creating the biggest increase to viscous nature. This result for CM also is in agreement with FIGS. 26, 29, and 31 described above.

Figure 33:
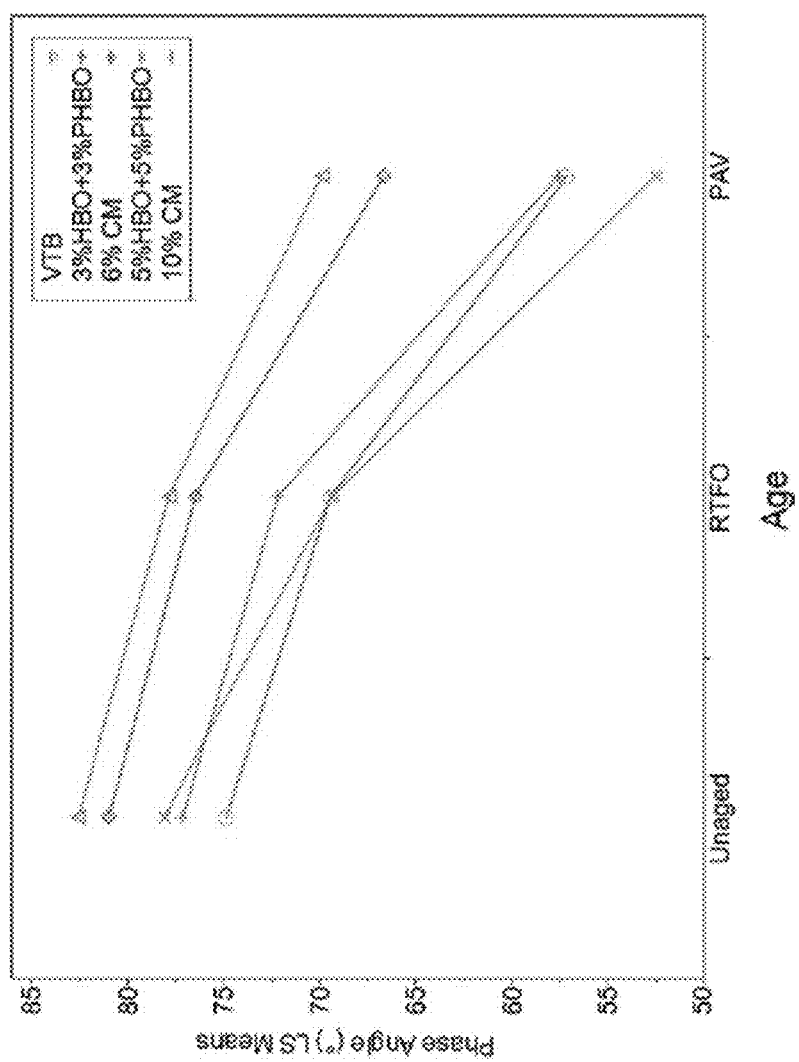
FIG. 33 depicts δ least square means plot for interaction group by age.

Shown below in FIG. 33 is the least squares means plot for the interaction between Group Name and Age for phase angle. Clearly, aging is shown to impact changes in phase angle for the four rejuvenator groups when compared to changes in the VTB control group. From the results shown, the rejuvenator CM across all three aging conditions has much higher phase angle than the VTB control group, whereas the rejuvenator group 5% HBO+5% PHBO shows the biggest drop in phase angle across the aging conditions from Unaged to PAV aged. The rejuvenator CM appears to just shift the phase curves upward, but does not change the slopes between the aging conditions like that of HBO+ PHBO. It appears that HBO+PHBO is rheologically changing the viscoelastic nature of VTB with prolonged aging. It is clear there are differences between groups within each age and differences due to aging within each group, but it is not known if the differences are statistically significant without running a Tukey HSD test.

To see if the differences between groups based on different aging are significant a Tukey HSD test was done using least square mean differences as shown in Table 25.

TABLE 25

δ Tukey HSD Lease Square Means Difference for Interaction Group Name by Age

| Level | | | | | | | | | | Least sq mean |
|---|---|---|---|---|---|---|---|---|---|---|
| 10% CM, unaged | A | | | | | | | | | 82.65 |
| 6% CM, unaged | | B | | | | | | | | 81.03 |
| 5% HBO + 5% PHBO, unaged | | | C | | | | | | | 78.16 |
| 10% CM, RTFO | | | C | | | | | | | 77.93 |
| 3% HBO + 3% PHBO, unaged | | | C | D | | | | | | 77.21 |
| 6% CM, RTFO | | | | D | | | | | | 76.54 |
| VTB, unaged | | | | | E | | | | | 74.93 |
| 3% HBO + 3% PHBO, RTFO | | | | | | F | | | | 72.25 |
| 10% CM, PAV | | | | | | | G | | | 69.95 |
| VTB, RTFO | | | | | | | G | | | 69.48 |
| 5% HBO + 5% PHBO, RTFO | | | | | | | G | | | 69.44 |
| 6% CM, PAV | | | | | | | | H | | 66.74 |
| 3% HBO + 3% PHBO, PAV | | | | | | | | | I | 57.63 |
| VTB, PAV | | | | | | | | | I | 57.20 |
| 5% HBO + 5% PHBO, PAV | | | | | | | | | J | 52.56 |

Note:
Levels not connected by same letter are, significantly different.

Figure 34:
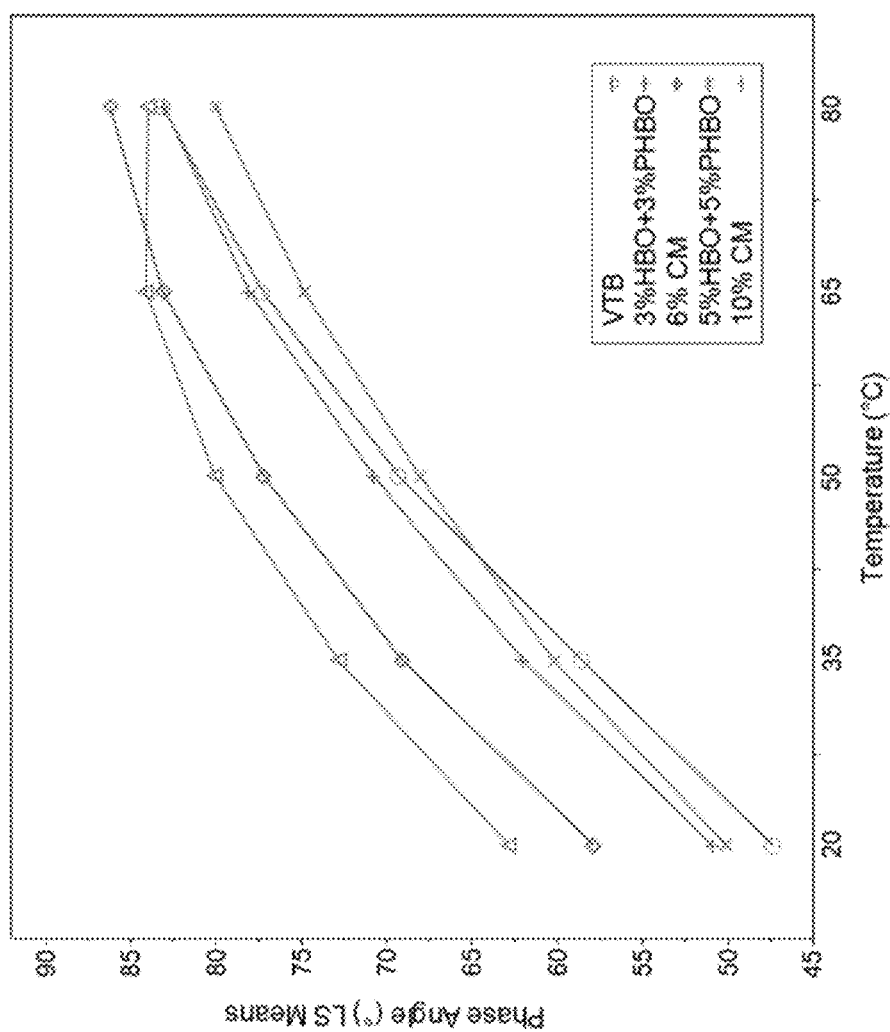
FIG. 34 shows a δ least square means plot for interaction group name by temperature.

The most interesting information on unaged groups shown in Table 25 is that all four rejuvenator groups are significantly different than the VTB control group with their phase angles being higher on average. However, the HBO+PHBO groups were found to not be different from one another in terms of phase angle. It was also seen that CM made the VTB the most viscous when unaged. When looking at the short-term aged results, nothing really changes trend wise from the unaged results other than the fact that 5% HBO+5% PHBO is now found to be statistically the same as the control VTB group, while the others are statistically different from the VTB control group and 5% HBO+5% PHBO group. The trend that shows for RTFO aged results appears again in the PAV aged (long-term aged) results, but is shown to be more drastic than before. Now 5% HBO+5% PHBO has the lowest phase angle and is statistically different from the VTB control group, while 3% HBO+3% PHBO was not found to be different from the control group. CM is still different than the VTB control group, but has much larger phase angle values in the range of 66.7° up to 70°, while the VTB control group's phase angle result is 57.2°. These results mean that HBO+PHBO are changing the VTB to become more elastic with aging, while CM is changing the VTB to become more viscous with aging. Further proof of these results are shown when looking at the least square means plot for the interaction between Group Name and Temperature as shown in FIG. 34.

Figure 35:
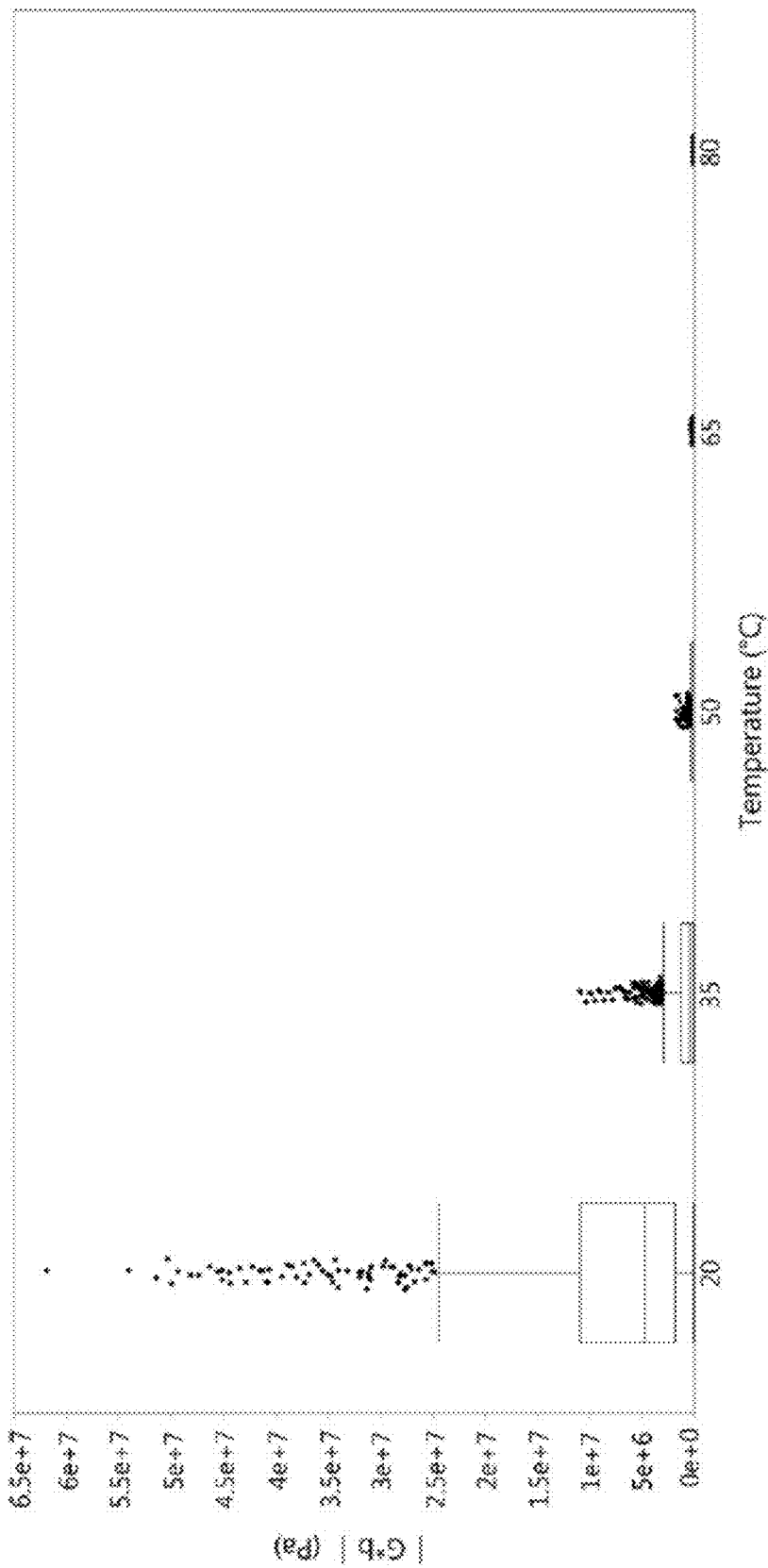
FIG. 35 is a distribution comparison for groups at different stages of aging using unmodified data.
Figure 36:
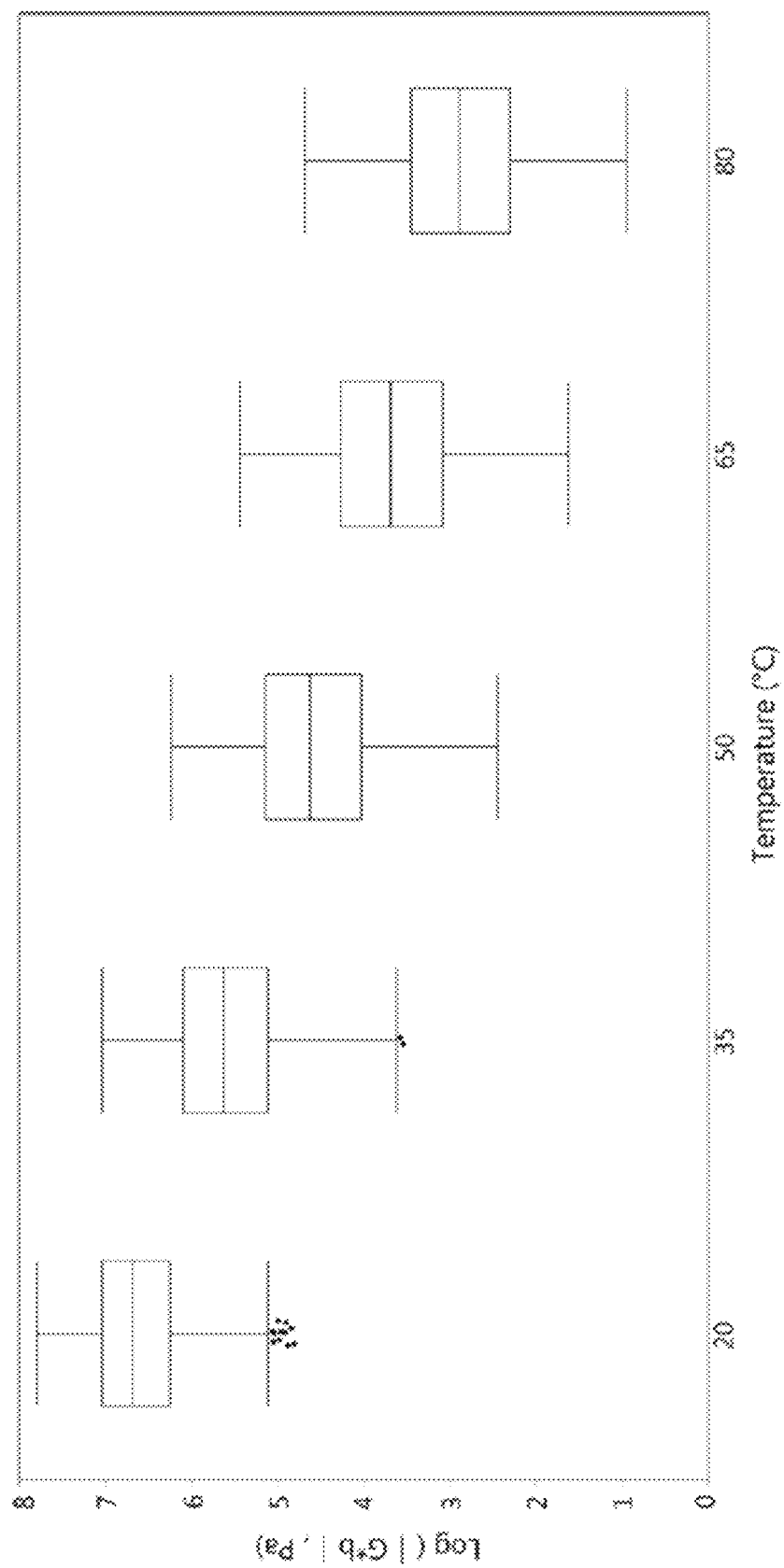
FIG. 36 is a distribution comparison for groups at different stages of aging using log 10 transformed data.

Complex Shear Modulus $|G_b^*|$ Results—To examine the effects of the factors and their interactions on the complex shear modulus $|G_b^*|$, f from use of HBO+PHBO and CM as rejuvenators, a full statistical analysis using an ANOVA table was done. Before an ANOVA can be done, the spread of the data must be examined to see if the variance across all temperatures follows the rule of normality. This spread of data is shown in FIG. 35. From the results shown, the rule of normality is not met, thus data transformation can be done to see if the rule of normality is met for variance of data across temperatures. The data was transformed using Log 10 and is shown in FIG. 36. Using a Log 10 transformation on the data makes the rule of normality be met for the variance across the temperatures. Therefore, Log 10 transformed data will be used for creating the ANOVA.

Figure 37:
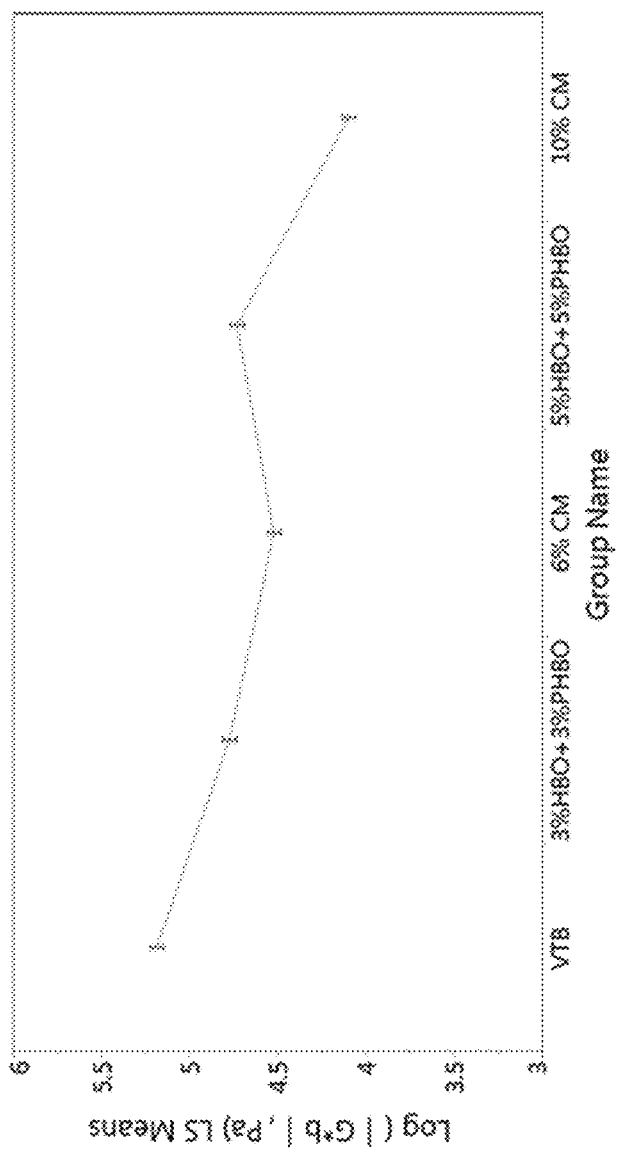
FIG. 37 depicts a least square means plot by group name for log 10|$G_b^*$|.

FIG. 37 displays a plot of least square means values of log 10$|G_b^*|$ with standard error bars for the factor Group Name. Because the bars in each direction is standard error, it is difficult to tell which groups are different from one another statistically in terms of log 10$|G_b^*|$. It is clear from the plot that all the rejuvenator groups decrease the shear complex modulus $|G_b^*|$, with CM decreasing it the most (making $|G_b^*|$ an order of magnitude smaller). Due to statistical differences not being displayed clearly in FIG. 37, a Tukey honestly significant difference (HSD) least square means difference test was done as shown in Table 26.

TABLE 26

Tukey HSD Least Square Means Difference of log10 $|G_b^*|$ for Group Name

| Level | | | Least sq mean |
|---|---|---|---|
| VTB | A | | 5.19 |
| 3% HBO + 3% PHBO | | B | 4.77 |
| 5% HBO + 5% PHBO | | B | 4.73 |

TABLE 26-continued

Tukey HSD Least Square Means Difference of log10 $|G_b^*|$ for Group Name

| Level | | | Least sq mean |
|---|---|---|---|
| 6% CM | | C D | 4.52 |
| 10% CM | | D | 4.10 |

When levels are not connected with the same letter, this means these groups are statistically significantly different from one another according to a 95% confidence interval. From the results shown in Table 26, both HBO+PHBO groups were not found to be different from one another, but both were found to be different than the control VTB group. The biggest differences were seen between 10% CM and the other four groups as well as 6% CM and the HBO+PHBO and VTB control groups. 10% CM was found to be the least stiff with 6% CM closely following, but both were found to be different from one another. The Tukey HSD test of least squares means is in agreement with the results shown in FIGS. 25A, 27A, and 30A.

Figure 38:
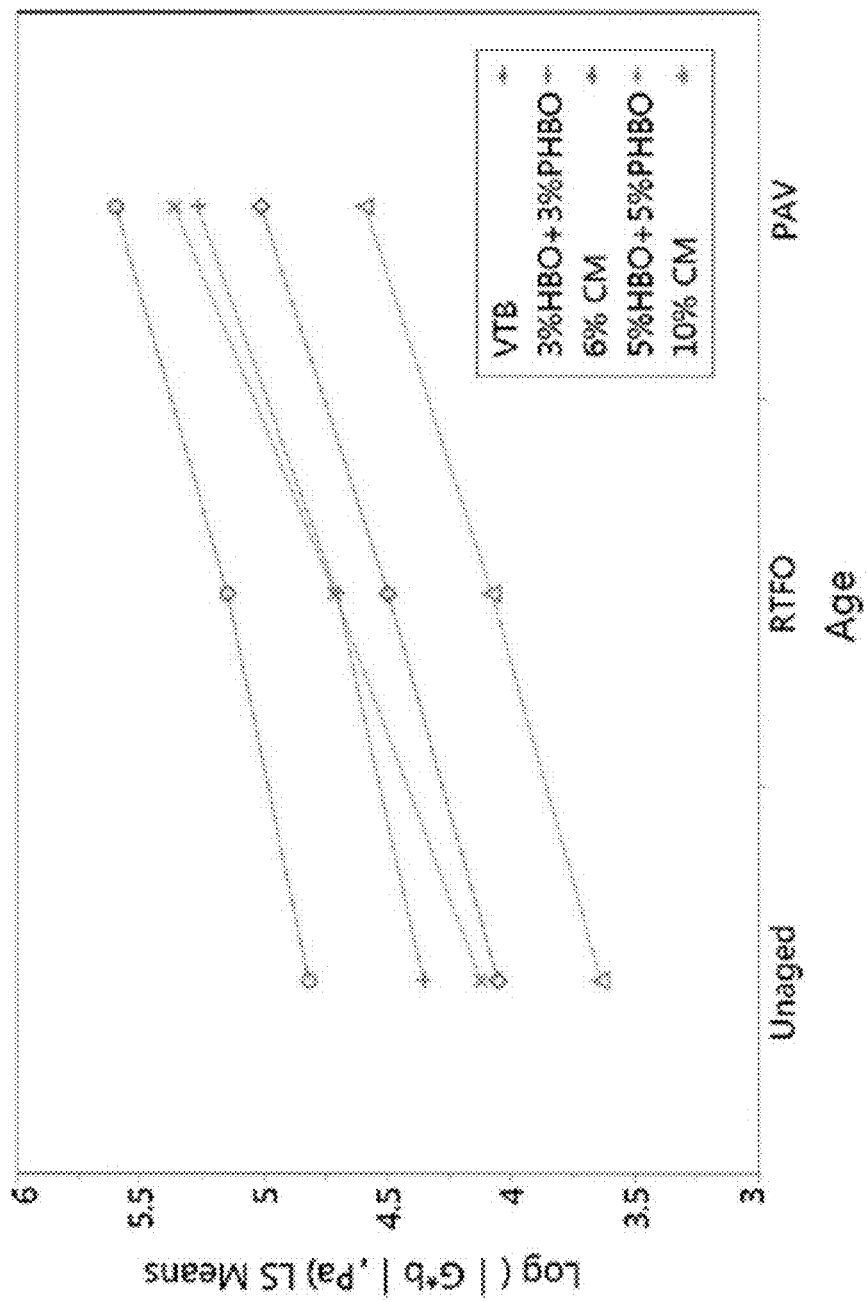
FIG. 38 is a log 10|$G_b^*$| least square means plot for interaction group name by age.

To examine the interaction between Group Name and Age visually a least square means plot of log 10$|G_b^*|$ results is shown in FIG. 38. From the plot, it is observed that aging affects the group 5% HBO+5% PHBO more so than the other rejuvenator groups as its line of values does not follow the same trend as the other three rejuvenator groups and VTB control group. Aging is shown to have more of a drastic increase on stiffness when 5% HBO+5% PHBO are used. It is clear from FIG. 38 that the rejuvenator CM decreases stiffness with increasing dosage the most across all three aging conditions. Statistical analysis will give a better story and explain if there are true differences between groups within each age and differences due to aging within each group. To do this a Tukey HSD test was done as shown in FIG. 40.

| Level | | | | | | Least Sq Mean |
|---|---|---|---|---|---|---|
| VTB, PAV | A | | | | | 5.60 |
| 5% HBO + 5% PHBO, PAV | | B | | | | 5.36 |
| 3% HBO + 3% PHBO, PAV | | B | C | | | 5.27 |
| VTB, RTFO | | | C | D | | 5.15 |
| 6% CM, PAV | | | | D | | 5.01 |
| VTB, Unaged | | | | | E | 4.82 |
| 5% HBO + 5% PHBO, RTFO | | | | | E F | 4.71 |
| 3% HBO + 3% PHBO, RTFO | | | | | E F | 4.70 |
| 10% CM, PAV | | | | | F G | 4.59 |
| 6% CM, RTFO | | | | | G H | 4.50 |
| 3% HBO + 3% PHBO, Unaged | | | | | H | 4.35 |
| 5% HBO + 5%PHBO, Unaged | | | | | I | 4.12 |
| 10% CM, RTFO | | | | | I | 4.08 |
| 6% CM, Unaged | | | | | I | 4.05 |
| 10% CM, Unaged | | | | | J | 3.63 |

To truly see if differences exist between groups within each aging condition and within a group using different aging conditions a Tukey HSD test was done using least square mean differences as shown in FIG. 40. For all three aging conditions, the four rejuvenator groups were found to be statistically significantly different from the control VTB group. Within the short-term aged (RTFO) and long-term aged (PAV) conditions, the two HBO+PHBO rejuvenator groups were not found to be different from one another. For the unaged conditions they were found to be different from one another. The rejuvenator groups using CM were found to be different from one another within each aging condition as well as different from the other two rejuvenator groups using HBO+PHBO within each aging condition. The results in FIG. 40 agree with the results shown in FIG. 38 as the groups using the rejuvenator HBO+PHBO are shown to increase the stiffness closer to the stiffness of the VTB control group with increased aging. These results show that all the rejuvenators do soften the VTB, but are affected differently by aging. The results might appear differently when looking at the interaction between binder type and temperature.

Figure 39:
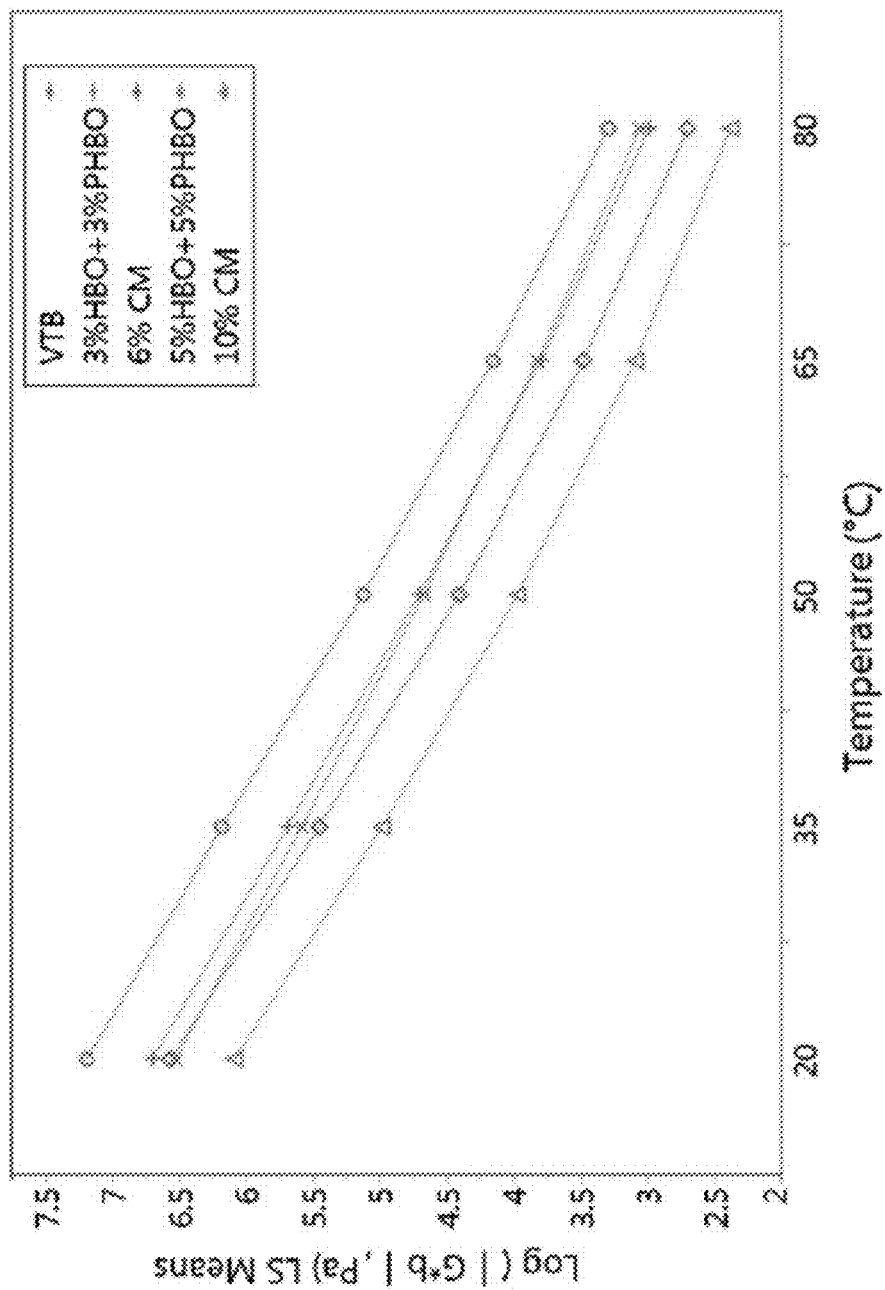
FIG. 39 depicts a log 10|$G_b^*$| least square means plot for interaction group name by temperature.

To examine visually the interaction between binder type and temperature a least square means plot was created and shown in FIG. 39. From the plot, the rejuvenator CM reduces the stiffness with increasing dosage, but does not change the slope of the trend from high to low temperatures. When examining HBO+PHBO, especially the group 5% HBO+5% PHBO, at higher temperatures this group's stiffness is very close to the stiffness of the VTB control group. As the temperature goes down the slope of the line changes and it appears that 5% HBO+5% PHBO softens much more drastically at lower temperatures. What this shows is that HBO+PHBO keeps the VTB modified binder relatively stiff at high temperatures, therefore keeping the high temperature grade close to the VTB's original high temperature grade while at low temperatures softens the binder much more and improves the low temperature performance grade. The change in the slope of the stiffness is a significant finding showing that the combination of the HBO, a lower molecular weight additive, and PHBO, an additive more similar to wax molecular weight will help to reduce stiffness at intermediate temperatures.

Example 24—Conclusion

The findings from running frequency sweeps from 20° C. up to 80° C. using a dynamic shear rheometer on unaged, short-term aged, and long-term aged material, show that the BDM combination derived from linseed oil (HBO+PHBO) when used as a rejuvenator of VTB works differently than the commercial rejuvenator CM, but still acts as a rejuvenator at all three aging conditions as does the rejuvenator CM in terms of stiffness (G*). This is not the case for phase angle when examining the performance of CM at the three aging conditions. The rejuvenator CM appears to make the VTB more viscous in nature (based on phase angle results). When examining the phase angle performance of HBO+PHBO with temperatures changes and changes in aging, it appears that HBO+PHBO decreases the phase angle with more aging at lower temperatures, while holding the phase angle steady at higher temperatures. This means that the VTB modified with HBO+PHBO is becoming more elastic at lower temperatures and with more aging.

The rejuvenator HBO+PHBO softens VTB more at low temperatures than at high temperatures, while CM gives an overall shift downward in stiffness from high to low temperatures. The impact from testing temperature could be hidden when looking at the differences between the groups at their respective aging conditions as a greater number of high test temperatures were used. This does not take away that it is more likely that HBO+PHBO provides a wider continuous grade range than the rejuvenator CM purely from the stiffness results. When taking into account the changes to phase angle and stiffness with aging and temperature, it appears that both HBO+PHBO and CM are acting like rejuvenators in that both are improving the low temperature performance. However, it is observed that BDMs HBO+PHBO perform better than CM as both phase angle and stiffness decrease at low temperatures while only stiffness decreases at low temperature for CM. It is recommended that in the future analytical chemical testing take place such as mass spectrometry on specimens from each of the aged conditions so that the effects seen physically and rheologically in the results of this paper can be further explained by examining changes in chemistry of the compounds at the molecular level.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A method of producing an asphalt product comprising:
 providing an asphalt binder, wherein the binder is a vacuum tower distillation bottom;
 providing a bio-oil blend comprising a mixture of a non-hydrogenated bio-oil and a partially hydrogenated bio-oil; and
 mixing the asphalt binder with the bio-oil blend under conditions effective to produce an improved asphalt product having a shear stiffness of 0.20 kPa to 11,000 kPa at a temperature ranging from 25° C. to 85° C. and/or a viscosity of 0.15 Pa·s to 1.50 Pa·s at a temperature ranging from 120° C. to 165° C.

2. The method of claim 1, wherein the asphalt product has a shear stiffness of 0.20 kPa to 11,000 kPa at a temperature ranging from 25° C. to 85° C.

3. The method of claim 1, wherein the asphalt product has a viscosity of 0.15 Pa·s to 1.50 Pa·s at a temperature ranging from 120° C. to 165° C.

4. The method of claim 1, wherein the asphalt product has a shear stiffness of 0.20 kPa to 11,000 kPa at a temperature ranging from 25° C. to 85° C. and a viscosity of 0.15 Pa·s to 1.50 Pa·s at a temperature ranging from 120° C. to 165° C.

5. The method of claim 1, wherein the asphalt product comprises from 0.1 to 10.0 wt. % of the bio-oil blend.

6. The method of claim 1, wherein the bio-oil is from an oil derived from a source selected from the group consisting of fish, animal, vegetable, synthetic and genetically-modified plant oils, and mixtures thereof.

7. The method of claim 6, wherein the bio-oil is a vegetable oil from a vegetable source selected from the group consisting of high erucic acid rapeseed, soybean, safflower, canola, castor, sunflower, palm, and linseed oil.

8. The method of claim 1, wherein the bio-oil blend is a mixture of heat-bodied linseed oil (HBL) and partially hydrogenated heat-bodied linseed oil (PHBL).

9. The method of claim 7, wherein the linseed oil is a partially hydrogenated heat-bodied linseed oil (PHBL).

10. The method of claim 1, wherein the asphalt product has a specific gravity of 1.019-1.052.

11. The method of claim 1 further comprising:
blending a mineral aggregate with said improved asphalt product.

12. The method of claim 11, wherein the mineral aggregate is selected from the group consisting of sand, gravel, limestone, quartzite, and crushed stone.

13. The method of claim 1, wherein the asphalt product is in the form of asphalt concrete.

14. The method of claim 1, wherein the asphalt product is in the form of an asphalt mixture.

15. The method of claim 14, wherein the asphalt mixture comprises:
a fiberglass; and
a mineral aggregate including at least one of lime dust and granular ceramic material.

16. The method of claim 1, wherein the asphalt binder further comprises a carboxyl additive.

17. The method of claim 1, wherein the asphalt binder further comprises a styrene-butadiene type polymer.

18. The method of claim 1, wherein the mixing is carried out in a high speed shear mill at 150° C. to 160° C.

19. A method of applying an asphalt product to a surface, said method comprising:
(a) providing an asphalt binder, wherein the binder is a vacuum tower distillation bottom;
(b) providing a bio-oil blend comprising a mixture of a non-hydrogenated bio-oil and a partially hydrogenated bio-oil;
(c) mixing the asphalt binder with the bio-oil blend under conditions effective to produce an improved asphalt product having a shear stiffness of 0.20 kPa to 11,000 kPa at a temperature ranging from 25° C. to 85° C. and/or a viscosity of 0.15 Pa·s to 1.50 Pa·s at a temperature ranging from 120° C. to 165° C.;
(d) heating the improved asphalt product to a temperature of 145° C. to 155° C.;
(e) coating mineral aggregate with the heated asphalt product to produce an asphalt material which has improved rheological properties compared to that of an asphalt material absent the bio-derived material;
(f) applying the heated asphalt material to a surface to be paved to form an applied paving material; and
(g) compacting the applied paving material.

20. A method of producing an asphalt product comprising:
providing an asphalt binder;
providing a bio-oil blend comprising a mixture of a non-hydrogenated heat bodied bio-oil and a partially hydrogenated heat bodied bio-oil; and
mixing the asphalt binder with the bio-oil blend under conditions effective to produce an improved asphalt product having a shear stiffness of 0.20 kPa to 11,000 kPa at a temperature ranging from 25° C. to 85° C. and/or a viscosity of 0.15 Pa·s to 1.50 Pa·s at a temperature ranging from 120° C. to 165° C.

21. The method of claim 20, wherein the asphalt product has a shear stiffness of 0.20 kPa to 11,000 kPa at a temperature ranging from 25° C. to 85° C.

22. The method of claim 20, wherein the asphalt product has a viscosity of 0.15 Pa·s to 1.50 Pa·s at a temperature ranging from 120° C. to 165° C.

23. The method of claim 20, wherein the asphalt product has a shear stiffness of 0.20 kPa to 11,000 kPa at a temperature ranging from 25° C. to 85° C. and a viscosity of 0.15 Pa·s to 1.50 Pa·s at a temperature ranging from 120° C. to 165° C.

24. The method of claim 20, wherein the asphalt product comprises from 0.1 to 10.0 wt. % of the bio-oil blend.

25. The method of claim 20, wherein the bio-oil is from an oil derived from a source selected from the group consisting of fish, animal, vegetable, synthetic and genetically-modified plant oils, and mixtures thereof.

26. The method of claim 25, wherein the bio-oil is a vegetable oil from a vegetable source selected from the group consisting of high erucic acid rapeseed, soybean, safflower, canola, castor, sunflower, palm, and linseed oil.

27. The method of claim 20, wherein the bio-oil blend is a mixture of heat-bodied linseed oil (HBL) and partially hydrogenated heat-bodied linseed oil (PHBL).

28. The method of claim 20, wherein the asphalt product has a specific gravity of 1.019-1.052.

29. The method of claim 20 further comprising:
blending a mineral aggregate with said improved asphalt product.

30. The method of claim 20, wherein the asphalt product is in the form of asphalt concrete.

31. The method of claim 20, wherein the asphalt product is in the form of an asphalt mixture.

32. The method of claim 31, wherein the asphalt mixture comprises:
a fiberglass; and
a mineral aggregate including at least one of lime dust and granular ceramic material.

33. The method of claim 20, wherein the asphalt binder further comprises a carboxyl additive.

34. The method of claim 20, wherein the asphalt binder further comprises a styrene-butadiene type polymer.

35. The method of claim 20, wherein the mixing is carried out in a high speed shear mill at 150° C. to 160° C.

36. A method of applying an asphalt product to a surface, said method comprising:
(a) providing an asphalt binder;
(b) providing a bio-oil blend comprising a mixture of a non-hydrogenated heat bodied bio-oil and a partially hydrogenated heat bodied bio-oil;
(c) mixing the asphalt binder with the bio-oil blend under conditions effective to produce an improved asphalt product having a shear stiffness of 0.20 kPa to 11,000 kPa at a temperature ranging from 25° C. to 85° C. and/or a viscosity of 0.15 Pa·s to 1.50 Pa·s at a temperature ranging from 120° C. to 165° C.;
(d) heating the improved asphalt product to a temperature of 145° C. to 155° C.;
(e) coating mineral aggregate with the heated asphalt product to produce an asphalt material which has improved rheological properties compared to that of an asphalt material absent the bio-derived material;
(f) applying the heated asphalt material to a surface to be paved to form an applied paving material; and
(g) compacting the applied paving material.

* * * * *